(12) United States Patent
Prideaux et al.

(10) Patent No.: US 12,552,686 B1
(45) Date of Patent: Feb. 17, 2026

(54) SYSTEMS AND METHODS FOR PRODUCTION OF POTABLE WATER BY RECYCLING PROCESSED WASTEWATER STREAMS

(71) Applicants: Barton Prideaux, Austin, TX (US); Warren Cody Armstrong, Port Aransas, TX (US)

(72) Inventors: Barton Prideaux, Austin, TX (US); Warren Cody Armstrong, Port Aransas, TX (US)

(73) Assignee: Mulberry River Environmental LLC, Austin, TX (US)

( * ) Notice: Subject to any disclaimer, the term of this patent is extended or adjusted under 35 U.S.C. 154(b) by 0 days.

(21) Appl. No.: 19/231,950

(22) Filed: Jun. 9, 2025

Related U.S. Application Data

(60) Provisional application No. 63/717,442, filed on Nov. 7, 2024.

(51) Int. Cl.
| | | |
|---|---|---|
| C02F 1/00 | (2023.01) |
| B01D 24/48 | (2006.01) |
| C02F 9/00 | (2023.01) |
| G05B 13/02 | (2006.01) |
| C02F 1/32 | (2023.01) |
| C02F 1/52 | (2023.01) |
| C02F 101/10 | (2006.01) |
| C02F 101/16 | (2006.01) |
| C02F 101/32 | (2006.01) |
| C02F 103/22 | (2006.01) |

(52) U.S. Cl.
CPC .............. *C02F 1/008* (2013.01); *B01D 24/48* (2013.01); *C02F 9/00* (2013.01); *G05B 13/027* (2013.01); *B01D 2101/02* (2013.01); *B01D 2101/04* (2013.01); *C02F 1/004* (2013.01); *C02F 1/325* (2013.01); *C02F 1/5209* (2013.01); *C02F 2101/105* (2013.01); *C02F 2101/16* (2013.01); *C02F 2101/32* (2013.01); *C02F 2103/22* (2013.01); *C02F 2209/003* (2013.01); *C02F 2209/006* (2013.01); *C02F 2209/40* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 7,666,318 B1 * | 2/2010 | Lehtinen | ............... | B01J 20/0277 95/107 |
| 7,754,090 B1 * | 7/2010 | Berg | ...................... | C02F 1/325 210/748.01 |

(Continued)

*Primary Examiner* — Richard C Gurtowski

(57) ABSTRACT

A system for processing wastewater streams to produce potable water includes a coagulant component that receives a wastewater stream, the coagulation component configured to produce flocculations from residual solids present in the waste water stream; a multi-stage mechanical filter configured to remove the flocculations from the wastewater stream; a disinfection component that receives filtered waste water and disinfects the filtered waste water; and a water distribution and storage component configured to store disinfected water, as potable water, and to maintain the stored disinfected water as potable water and further configured to distribute the potable water to one or more destinations.

14 Claims, 34 Drawing Sheets

(56) References Cited

U.S. PATENT DOCUMENTS

| | | | | |
|---|---|---|---|---|
| 2004/0262233 | A1* | 12/2004 | Yano | G01N 21/643 |
| | | | | 210/745 |
| 2005/0139530 | A1* | 6/2005 | Heiss | C02F 9/00 |
| | | | | 210/257.2 |
| 2017/0081220 | A1* | 3/2017 | Taylor | C02F 1/463 |
| 2023/0346996 | A1* | 11/2023 | Banerjee | A61L 2/10 |
| 2025/0117757 | A1* | 4/2025 | Butterworth | G06Q 10/20 |

* cited by examiner

```
def gather_sensor_data():
    return {                                                    1003A
        "TSS": read_tss_sensor(),
        "flow rate": read_flow_meter(),
        "stirrer_speed" : read_stirrer_speed(), }
def format_prompt(sensor_data):
    prompt= f"""
    Sensor readings:
    -TSS: {sensor_data['TSS']} mg/L
    -Flow rate: {sensor_data['flow_rate']} m³/h
    -Stirrer speed: {sensor_data['stirrer_speed']} RPM Goal:
    Reduce TSS below 10mg/L. Recommend control actions.
    """
    return prompt def call_llm(prompt):
    # Example API call
    response = ai.Completion.create(
        engine="ai_nw",
        prompt=prompt,
        max_tokens=200
    )
    return response['choices'][0]['text']
```

FIG. 11A

SYSTEMS AND METHODS FOR PRODUCTION OF POTABLE WATER BY RECYCLING PROCESSED WASTEWATER STREAMS

RELATED APPLICATIONS

This application claims the benefit of U.S. Provisional Patent Application 63/717,442, filed Nov. 7, 2024, entitled "Systems and Methods for Production of Potable Water by Recycling Processed Wastewater Streams." This application also relates to U.S. patent application Ser. No. 19/231,896, filed on even date herewith and entitled "Systems and Methods for Adaptive Processing of Waste Streams," which in turn claims priority to U.S. Provisional Patent Application 63/658,886, filed Jun. 12, 2024 and entitled "Systems and Methods for Adaptive Processing of Waste Streams."

BACKGROUND

Potable water is water suitable for human consumption; e.g., drinking water. Many natural sources of fresh water (e.g., rivers and lakes) are not potable. The World Health Organization (WHO) states that for water to be classified as potable it must satisfy certain chemical, physical, radiological and microbiological requirements: First, to be potable, water cannot contain any detectable disease-causing organisms including bacteria, viruses, protozoa or parasites, which are known to cause infections such as cholera, dysentery, hepatitis A, and giardiasis. Second, potable water cannot exceed specified levels of organic and inorganic chemicals such as pesticides, heavy metals such as lead or arsenic, disinfection by-products, petrochemicals, or other toxins. Third, potable water cannot contain radioactive substances exceeding safe limits. Fourth, potable water cannot have an abnormal color, smell, cloudiness or taste that would deter people from drinking the water. Moreover, potable water standards are set locally based on scientific risk assessments; for example, the U.S. Environmental Protection Agency (EPA) enforces 91 contaminant regulations under the Safe Drinking Water Act in order to designate water as potable, and such qualifying water is safe for all domestic uses including drinking, cooking, bathing and cleaning.

Water that does not satisfy the safety requirements for human consumption is classified as non-potable. The risks from ingesting non-potable water can be severe or even fatal in extreme cases. Non-potable water may contain water-borne bacteria such as *E. coli, Salmonella*, and *Vibrio cholerae*, which may cause potentially fatal diarrheal diseases. Non-potable water may contain viruses such as norovirus, hepatitis A, and rotavirus, which spread through contaminated water into food supplies. Non-potable water may contain parasites such as *Cryptosporidium, Giardia* and *Entamoeba histolytica*. Non-potable water may contain toxic chemicals such as lead, mercury, nitrates, and pesticides, which have cumulative health effects when ingested over time, including organ damage, cancer, reproductive issues and developmental disorders. Non-potable water may have a high mineral content that leaves residue on skin and hair after bathing, causing irritation and dryness. Sources of non-potable water include surface water-rivers, lakes, streams; groundwater contaminated naturally or by pollution; improperly treated recycled graywater or wastewater; seawater; and industrial process water.

As used herein, "waste stream" means any source of liquid or solid waste, or a mixture of liquid and solid waste. "Wastewater" means a liquid waste stream, primarily water, possibly with some trace solids to suspended solids. "Sludge" means a semi-solid slurry that can be produced from a range of industrial processes, including the processes described herein.

Of particular relevance to the herein disclosed systems and methods are industrial processes that use "clean" water and produce wastewater streams. The produced wastewater streams may pose environmental and human health hazards if not properly treated, stored, handled, disposed of, and possibly recycled.

One such industrial process can be found in the meat processing industry. Meat processing facilities (otherwise known as Meat and Poultry Products (MPP) facilities) use water extensively for preparing food sources (e.g., fish, poultry, cattle, sheep, or pig carcasses) for human consumptions. The same MPP facilities use water for sanitizing, disinfecting, and thoroughly cleaning equipment used in meat processing operations. For example, a large quantity of water is needed to remove hair or feathers from animal carcasses, and Federal regulations require a complete cleaning and sanitation after every processing shift at a MPP facility, with the cleanup generally using considerably more water than the actual food processing. Thus, current MPP facilities use large quantities of water که, after such use, contains processing residue, and that further, may facilitate growth of potentially harmful microorganisms such that wastewater streams resulting from meat processing and subsequent plant clean up may pose environmental hazards if not properly treated and handled.

Furthermore, all types of MPP facilities generate wastewater with similar characteristics. These waste streams contain high levels of total suspended solids (TSS), fats, oil, and grease (FOG), and other biologics, making disposal of waste stream components (wastewater, solids, and sludge) problematic. For example, some MPP facilities discharge their processed waste streams directly into municipal sewage plants while other MPP facilities discharge their waste streams directly into the environment, specifically into rivers and lakes. Direct discharges to municipalities pose many problems to municipal sewage plants, including, for example the inconsistent nature of processing plant flows, which makes it difficult for sewage plant operators to anticipate and plan for high-load waste stream flows. While lakes and rivers are not typically potable water sources, disposal of MPP facility wastewater may cause the lakes and rivers to become more polluted, and in some circumstances, such direct discharges are prohibited by local and state governments.

The U.S. Environmental Protection Agency (EPA) does not explicitly prohibit the reuse of specific wastewater streams for potable reuse, but provides several regulations and guidelines that must be followed to ensure water safety. First, wastewater streams that contain toxic or hazardous waste are not suitable for potable reuse without extensive treatment to remove all harmful contaminants. This includes industrial wastewater streams with chemicals that could be difficult to remove with standard treatment technologies. Second, wastewater intended for reuse must meet strict standards for pathogen removal, chemical contaminant reduction, and the control of disinfection byproducts before it can be considered potable. The EPA's Safe Drinking Water Act (SDWA) sets standards for drinking water quality, including limits on microbial contaminants, chemical pollutants, and disinfectants. Third, the EPA does not specifically prohibit processing wastewater from meat and poultry processing facilities for potable reuse. However, these facilities generate wastewater that may contain high levels of organic material, fats, oils, and grease (FOG), as well as pathogens. The wastewater from these facilities must undergo extensive pretreatment to remove these contaminants before it can be processed for potable reuse. The treatment steps typically involve pretreatment processes such as screening, sedimentation, and dissolved air flotation (DAF) to remove solids, grease, and organic matter; biological treatment (e.g., activated sludge) to degrade organic contaminants; and advanced treatment technologies (e.g., RO, UV disinfection) to ensure that the water meets potable standards. Even were such a treatment regime technically feasible, some municipalities might opt not to use wastewater from such MPP facilities for potable reuse because of the complexities of the treatment process and potential public perception concerns.

The Safe Drinking Water Act (SDWA) the primary federal law ensuring the quality of drinking water in the U.S. The SDWA establishes Maximum Contaminant Levels (MCLs) for various pollutants, including microorganisms, disinfectants, organic chemicals, and heavy metals, that must be met to ensure treated water is safe for consumption. Key Requirements include (1) Maximum Contaminant Levels (MCLs): Treated water must meet specific limits for contaminants, such as lead, arsenic, coliform bacteria, and others. (2) Disinfection and Disinfection Byproducts: Treatment plants must ensure that disinfectants used in water treatment (e.g., chlorine) do not produce harmful byproducts like trihalomethanes (THMs) and haloacetic acids (HAAs). (3) Monitoring and Reporting: Water systems must regularly monitor water quality and report results to the EPA or state agencies.

The EPA published Guidelines for Water Reuse (EPA, 2012). These guidelines provide a framework for states and local agencies to develop water reuse programs, including potable reuse. The document includes guidelines for both indirect potable reuse (IPR) and direct potable reuse (DPR). Indirect Potable Reuse (IPR): Involves treating wastewater to a high standard and then blending it with natural water sources, such as rivers or aquifers, before it is treated again for drinking. Direct Potable Reuse (DPR): Involves treating wastewater to a high standard and directly introducing it into the drinking water supply without an environmental buffer. Key Requirements: (1) Advanced treatment processes such as reverse osmosis (RO), ultrafiltration (UF), advanced oxidation, and ultraviolet (UV) disinfection to remove pathogens, pharmaceuticals, and chemicals. (2) Multi-barrier treatment processes provide multiple layers of treatment and disinfection for safety. (3) Extensive monitoring of water quality throughout the treatment process. (4) Pathogen Controls to ensure removal of harmful microorganisms, including bacteria (e.g., *E. coli*), viruses, and protozoa. Technologies like membrane filtration, ultraviolet (UV) disinfection, and chlorination are used to meet this requirement. (5) Chemical Controls to ensure treated water is free from a variety of harmful chemicals, including nitrates, volatile organic compounds (VOCs), heavy metals, and emerging contaminants like pharmaceuticals and personal care products (PPCPs).

While some current MPP facility waste disposal systems and methods are intended to transform the waste streams into environmentally acceptable direct disposal; e.g., disposal in a river, some wastewater streams cannot be so transformed, and thus may require long-term waste storage. Current waste disposal systems often are purpose-built for a specific waste disposal operation, and are not readily adaptable to other waste streams. Current waste disposal systems are expensive to implement, expensive to operate, and expensive to maintain. State and Federal regulations evolve, placing more stringent requirements on waste disposal, and current waste disposal systems may not be acceptable in the future without expensive modifications. Current waste disposal systems are manpower-intensive and may produce undesirable working conditions. Long-term waste storage solutions are expensive to implement and maintain, often requiring frequent monitoring and environmental reporting. Leaks from long-term waste storage tanks has been known to harm the environment, and in some instances, have made local areas around the tanks uninhabitable for humans, and caused serious long-term, and sometime fatal, illnesses.

Current waste disposal systems, even while meeting environmental disposal regulations for a part of a waste stream, may be left with a portion of the waste stream that cannot be disposed of in the environment. This remainder portion must be retained in an environmentally-acceptable storage facility; such a facility is expensive to maintain and operate, and is subject to the environmental risks noted above. Furthermore, current wastewater streams typically are not processed to provide potable water for use in post meat-processing cleanup. As a result, meat processing typically results in at least two wastewater streams that are potentially environmentally hazardous.

FIG. 1 illustrates a current (prior art) waste disposal system 10. System 10 represents the essential components of many current waste disposal systems. Such current waste disposal systems are used, for example, to dispose of processed liquid resulting from processing poultry for human consumption. System 10 includes settling tanks 13 and 15, although one tank or more tanks could be employed based on the expected waste stream to be processed. Each tank 13 and 15 receives a liquid/solid (L/S) mixture. In FIG. 1, tank 13 includes a skimmer 12 that is employed to skim solids and foam off a liquid surface and a scrapper 14 employed to scrape solids that have settled from the liquid to a tank bottom. The skimmed and scraped materials may be transferred to solids storage tank 17. The solids then may be transferred to long term storage 20 or for disposal. Liquid from tank 15, after skimming and scrapping, may be transferred to holding (liquid storage) tank 19, and various chemicals may be added to the stored liquid to make the stored liquid acceptable for storage or environmental disposal. For example, once the chemistry is adjusted, the liquid may be disposed of using liquid disposal system 30 for discharge of the liquid into a nearby river.

Waste disposal system 10 suffers from all the technological and operational challenges, drawbacks, and problems enumerated above. Perhaps most notable among these drawbacks is the direct discharge of processed liquids to the environment by disposal in a nearby river (the need for such a convenient environmental dumping solution may explain why many MPP facilities are sited along rivers). However, disposal of such waste streams directly into the environment (i.e., into rivers, lakes, or oceans) eventually may be prohibited, and current MPP facilities may be required to implement wastewater treatment systems that make the wastewater streams more ecologically friendly.

SUMMARY

Disclosed herein are systems, sub-systems, devices, components, and structures (collectively, "recycling systems"), and corresponding methods for recycling processed wastewater streams. The recycling systems are configured, and the methods executed, to make recycled processed wastewater streams acceptable for uses as described herein such that the wastewater streams need not be disposed of in waste storage facilities. The herein disclosed recycling systems and corresponding methods overcome technical and operational deficiencies inherent in current waste disposal systems. The herein disclosed recycling systems may be used in conjunction with waste disposal systems that are directed to disposal of wastes from processing animals, including fish, birds, mammals, and reptiles, and any other form of edible or nonedible animal. In a specific example, the recycling systems are directed to recycling waste streams from animal processing used to produce food products for human or animal consumption. In another specific example, the recycling systems are directed to recycling waste streams from animal processing for uses other than making food products for human or animal consumption. The recycling systems make efficient waste disposal possible, are adaptable to multiple waste streams, may be largely automated, can be adapted to new environmental regulations, and provide a safe and comfortable environment for workers. The recycling systems minimize residual waste materials by converting portions of the processed waste stream for alternative, environmentally-friendly uses, and recycling other portions of the processed waste stream. The recycling systems may be adapted for use with waste producing systems other than animal processing. The recycling systems are structured, and the methods executed to make the recycled processed wastewater streams acceptable for use as potable water, as well as for direct discharge to the environment.

An example waste disposal system may be used to process waste streams generated by food processing companies such a fish, poultry, cattle, pigs, and other meat producers (i.e., a MPP facility). Taking the more specific example of poultry processing (i.e., providing packaged food items from poultry such as chickens and turkeys), an example MPP facility may employ a food processing system that generates one or more waste streams. The waste streams generally include liquids (e.g., processing water) and solids (typically poultry residue). The MPP facility may employ a waste disposal system that, in turn, may include a first stage waste processor, such as a clarifier, to remove certain solids in the waste stream so as to enable more efficient waste processing, one or more second stage waste processors, with each second stage waste processor including one or more centrifugal separators. In an aspect, the second stage waste processor, or an additional stage, may include one or more vertical decanters that operate in some respects similar to one principle of operation of the clarifier, namely that solids will eventually settle out of (or in some cases rise to the top of) a liquid volume. Some examples of a vertical decanter may include internal rotating elements to enhance the separation process. In the second stage, the centrifugal separators may include one or more centrifugal decanters. When two or more centrifugal decanters are employed, the centrifugal decanters may operate in parallel or in series. The centrifugal decanters may be two-phase or three-phase separators. The centrifugal separators also may include one or more two-phase or three-phase centrifuges. The one or more centrifuges may operate in series or in parallel with the centrifugal decanters, or with a vertical decanter. In some aspects of operation, the waste stream may be processed without a need for the centrifuges. Similarly, the centrifugal decanters may not be required in some operational scenarios. Thus, the waste disposal system is designed to flexibly employ or bypass certain components based on a sensed composition of the waste stream as the waste stream is processed. The waste disposal system further includes components that operate to produce an environmentally-acceptable product from solid wastes separated from the waste stream, and to recycle the liquid (i.e., processed water) separated from the waste stream. In an aspect, the solids are used in the production of organic fertilizer while the processed water is returned to the food processing system or stored and possibly distributed outside the MPP facility. Thus, as used herein, a MPP facility may include a food processing system, a waste disposal system, and a recycling system. One skilled in the art will recognize that depending on the animal processed, and depending of the desired product from such processing, the waste disposal systems and the recycling systems may differ in some aspects. Nonetheless, the herein disclosed waste disposal systems and the herein disclosed recycling system generally are adaptable for any type of animal processing and for any type of processed animal product. Furthermore, the recycling systems may be used in other than food processing scenarios.

The herein disclosed systems and methods may be used procedures for processing wastewater into potable water, including through indirect potable reuse (IPR) and direct potable reuse (DPR). These systems may implement some or all the following treatment technologies/stages to ensure the safety and quality of the water including: (1) Microfiltration (MF) and Ultrafiltration (UF) These are membrane-based technologies used to remove suspended solids, bacteria, and some viruses from wastewater. Water is passed through membranes with tiny pores that filter out contaminants. (2) Reverse Osmosis (RO): RO removes dissolved salts, organic compounds, and microorganisms by forcing water through a semipermeable membrane. (3) Advanced Oxidation Processes (AOP): AOP involves using powerful oxidants like hydrogen peroxide, ozone, or UV light to break down organic pollutants and emerging contaminants, such as pharmaceuticals and endocrine disruptors, that may be present in wastewater. (4) UV Disinfection: Ultraviolet (UV) disinfection may be used to kill or inactivate microorganisms such as bacteria and viruses. (5) Chlorination: Chlorine may be used as a disinfectant to ensure that water remains safe from microbial contamination throughout the distribution system. (6) Managed Aquifer Recharge (MAR)/Groundwater Recharge: In indirect potable reuse, treated wastewater is sometimes injected into groundwater aquifers to be stored and naturally filtered before being withdrawn and treated again for potable use. (7) Multi-Barrier Approach: The herein disclosed systems use a multi-barrier approach, meaning multiple treatment steps (e.g., filtration, RO, and disinfection) are layered to ensure that water meets stringent safety standards.

An example recycling system may be configured and operated to make portions (e.g., water) of the waste streams acceptable for reuse in the food processing system of the MPP facility and/or for uses outside the MPP facility. The example recycling system for recycling wastewater streams to generate potable water includes a coagulant stage, a filter stage, a disinfection stage, and a storage/disinfection stage. In some aspects, one or more stages may be deleted from the recycling system. For example, in an aspect, the recycling system may be structured without the coagulant stage and/or without the filter stage. Alternately, the coagulant stage and the filter stage may be used to process certain wastewater streams and not others, depending on, for example, the total dissolved solids (TDS) in the wastewater stream. The recycling system may include instrumentation to measure intrastage and in-stage parameters, and provide readings to a computer-control system that executes a specially designed recycling control program stored on a non-transitory, computer-readable storage medium. Thus, the recycling system may be automated to some degree. In an aspect, the automation may include computer controlled servo motors to operate valves and pumps in and between the stages. Computer-controlled servo signals may be based on received parameter values. In another aspect, the recycling control program may include, or may access a large language model or similar artificial intelligence program, to more efficiently control the desired recycling operation. Furthermore, the large language model may include an expert-configured feedback loop to train, in real-time, the large language model. The expert-configured system may include a human expert-machine interface, an unsupervised machine learning component, a supervised machine learning component, and a reinforcement machine learning component, all of which enable, or execute to train the large language model to improve the large language model's operational directives to (1) improve efficiency of recycling operations, (2) adapt recycling operations based on the specific composition of each incoming wastewater stream, and (3) adapt wastewater recycling operations (within the limits of the existing recycling system components) to comply with changing regulations or other requirements for generation of potable water. In an aspect, the expert-configured recycling control program may further include a rules engine, a rules database, a natural language processor, and a machine learning engine. The natural language processor may allow the expert system to "read" and assimilate data (text, numerals, images) provided in documents accessible to the expert system. In an aspect, the computer system save data related to a batch or quantity of recycled potable water and upload these data to an immutable ledger so as to ensure/certify the integrity of the potable water and make that certification available to entities that may use the potable water.

The recycling systems and corresponding methods enable disinfecting of a target (e.g., one or more of an object, material, or matter) using disinfecting techniques such as, for example, ultraviolet (UV) light, reverse osmosis, nano-bubbling, and electro-chemical oxidation. As used herein, disinfecting and disinfection of the target means the ability to kill and/or destroy some or all infectious agent(s) at/on the target. Disinfecting may, but need not, include sterilization or sanitization. The herein disclosed disinfecting techniques are effective in retarding growth, destroying, and/or killing infectious agents. As used herein, "infectious agent" or "infectious agents" refers to any organism that causes disease in a host including, but not limited to, a virus, bacterium, bacteria, prion, fungus, parasite, and disease (e.g., toxoplasmosis). The recycling systems and corresponding methods also are configured to remove non-infectious agents such as non-infectious solids in the processed waste stream.

A system for processing wastewater streams to produce potable water includes a coagulant component that receives a wastewater stream, the coagulation component configured to produce flocculations from residual solids present in the waste water stream; a multi-stage mechanical filter configured to remove the flocculations from the wastewater stream; a disinfection component that receives filtered waste water and disinfects the filtered waste water; and a water distribution and storage component configured to store disinfected water, as potable water, and to maintain the stored disinfected water as potable water and further configured to distribute the potable water to one or more destinations.

The herein disclosed systems and methods for recycling wastewater from MPP facilities may employ advanced artificial intelligence systems to monitor and control wastewater recycling operations. The artificial intelligence systems may include trained models to assist in the monitor and control operations. One such model is a trained large language model. A large language model may be a neural network; in an example, the large language model is an artificial neural network (ANN). The ANN may be produced by a combination of unsupervised training, semi-supervised training, supervised training, and reinforcement training. Training of the ANN may be an ongoing operation. The ANN may be used purely for monitoring operation of the MMP wastewater recycling system, or may be employed in a semi-automated or fully automated control function. Thus, the large language model (LLM) (or ANN) may be implemented as part of an optimization solution for wastewater treatment operations of the wastewater recycling system. The LLM is able to process and analyze data, and moreover, may be combined with specialized industrial control systems and other machine learning models for direct operational control and optimization of the wastewater recycling system as follows: (1) Interpretation and Reporting: The LLM helps operators interpret sensor data, generate summaries, and create actionable reports based on daily operations. This may include identifying patterns in performance data or flagging unusual readings that could indicate issues. (2) Predictive Maintenance: Combined with other machine learning models that analyze historical sensor data, the LLM generates insights on when certain equipment might need maintenance, thereby helping reduce downtime and increasing operational efficiency. (3) Process Optimization Suggestions: By analyzing data and processing documents, the LLM may suggest operational adjustments. For example, the LLM may recommend adjusting chemical inputs, aeration levels, or sludge recycling rates to improve efficiency based on past data or industry standards. (4) Decision Support and Training: The LLM may assist plant operators with decision-making by offering step-by-step guidance for complex procedures or emergencies. The LLM may be used to create training materials and simulate various scenarios for training purposes. (5) Real-Time Communication Assistance: The LLM may act as an interface between operators and the plant's control systems, responding to queries in natural language and helping operators find information quickly without needing to go through complex control panels. (6) Documentation and Compliance: The LLM may generate and manage compliance documentation, helping ensure that operational changes and maintenance activities are well-documented and in line with environmental regulations. For uses in autonomous or semi-autonomous operation of the wastewater recycling system, the LLM may work in conjunction with specialized process control algorithms or other models that can handle time-sensitive decisions based on live sensor data and respond to the physical variables of the wastewater recycling system.

DESCRIPTION OF THE DRAWINGS

The detailed description refers to the following figures in which like numerals refer to like items, and in which:

FIG. 11A illustrates an example code sequence to generate a query answerable by a large language model;

DETAILED DESCRIPTION

Figure 1:
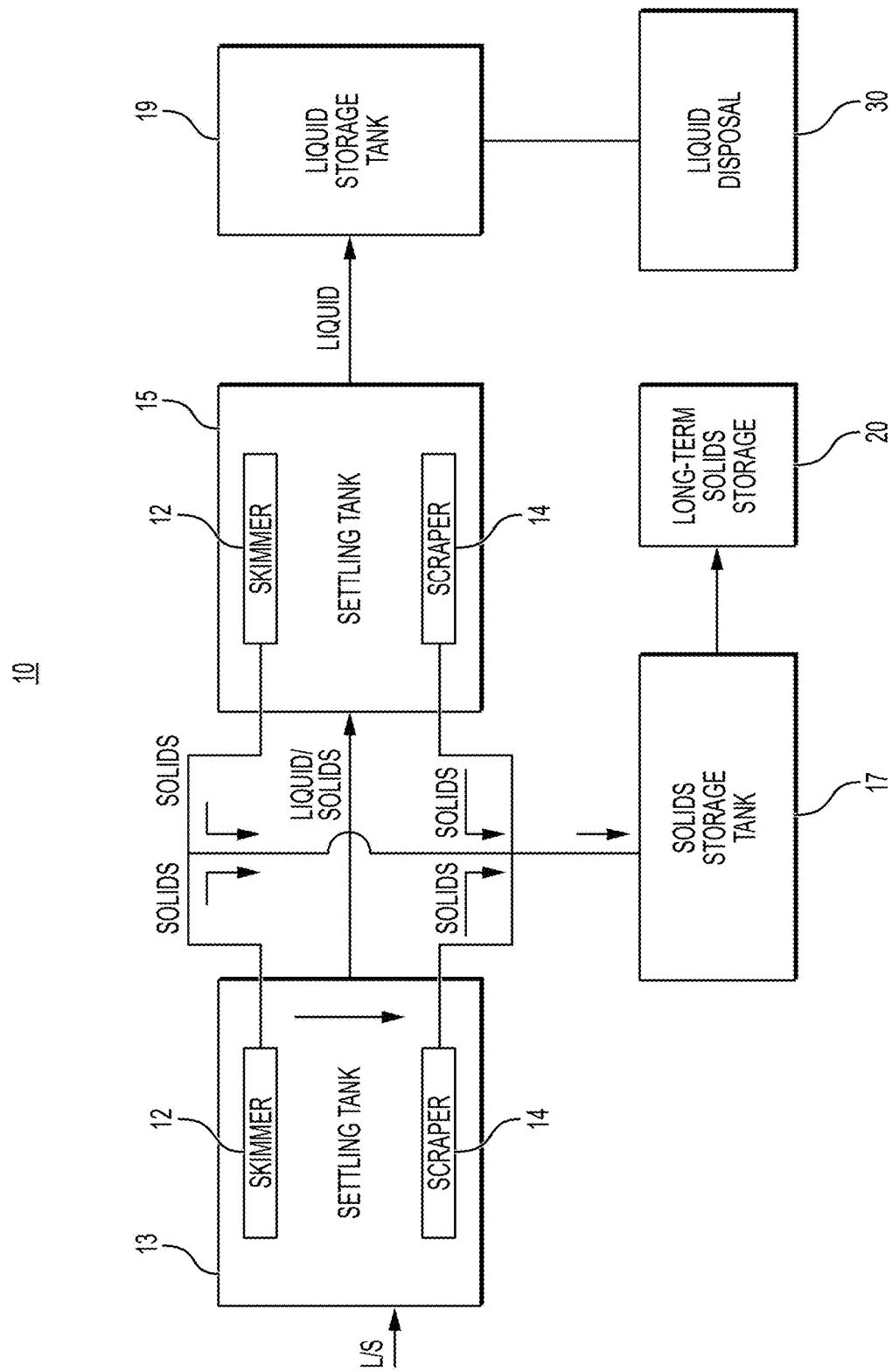
FIG. 1 illustrates a typical current (prior art) waste stream disposal system.

Meat and Poultry Products (MPP) facilities discharge pollutants into the nation's waters and into municipal waste treatment facilities. Pollutants found in MPP wastewater include oil and grease, organic material, including animal parts, salts, ammonia, and significant quantities of nutrients especially total nitrogen (TN) and total phosphorus (TP). The MPP industry is one of the largest sources of industrial nutrient pollution in the country. When too many nutrients, mainly nitrogen and phosphorus, enter surface waters (river, lakes, and streams) the nutrients can lead to a variety of problems, including harmful algal blooms. Such excess algae can reduce or deplete dissolved oxygen available to aquatic life and, in many instances, produce toxins that can harm people, animals, and aquatic life. Nutrient pollution is one of the most widespread and costly environmental problems impacting surface water quality.

To address these effects, The U.S. Environmental Protection Agency (EPA) has proposed a rule that would apply existing direct dischargers. The proposed rule contains three options. For existing direct dischargers, the EPA's preferred option would establish more stringent effluent limitations for nitrogen and, for the first time, limitations for phosphorus. The preferred option would also establish, for the first time, pretreatment standards (e.g., 40 CFR Part 403) for oil and grease, total suspended solids, and biochemical oxygen demand. The preferred regulatory option would apply to approximately 850 of the 5,000 MPP facilities nationwide. The proposal contains two additional options on which the EPA is requesting public comment. These options would apply numeric effluent limitations to additional direct and indirect dischargers. The two additional options would also establish pretreatment standards for nitrogen and phosphorus for some indirect discharging facilities included in the preferred option. In addition to the three options, the EPA is requesting comment on a provision that would require segregation and management of high-salt waste streams that are produced at some facilities, as well as the addition of *E. coli* bacteria as a regulated parameter for direct dischargers.

While the EPA's proposed rule is intended to minimize the effects of direct discharge, many of the current 850 MPP facilities that engage in direct discharge operate wastewater disposal systems that may not be capable of meeting the EPA standards without major retrofitting and costly capital upgrades. Other MPP facilities that are not direct dischargers still are faced with the technical challenge and economic cost of treatment, storage, and disposal of wastewater streams.

The deficiencies, drawbacks, technical and operational limitations, inefficiencies and other aspects affecting acceptability of current waste disposal and recycling systems is detailed herein. To address limitations of current waste disposal and recycling systems, disclosed herein are systems, and corresponding methods, that make possible efficient waste disposal, adapt to multiple different waste streams, support automated operation, are adaptive to changing environmental regulations, and provide a safe and comfortable environment for workers. Moreover, the herein disclosed waste disposal and recycling systems minimize residual waste materials by converting portions of a processed waste stream for alternate, environmentally-friendly uses, and by recycling other portions of the processed waste stream. To perform the conversion, the waste disposal systems may use the herein disclosed "recycling system." As noted herein, a "recycling system" includes systems, subsystems, devices, components, and structures (collectively, "recycling systems"), and corresponding methods for recycling processed wastewater streams.

One aspect of such recycling involves recycling wastewater streams to produce potable water. Such potable water may be reused at the MPP facility for ongoing food processing and for plant cleanup. Some potable water may be recycled outside the MPP facility. Another aspect of such recycling involves processing wastewater streams to produce water that is acceptable under current (and future) rules, regulations, laws, and guidelines for disposal to the environment (e.g., into surface water bodies such as lakes and rivers).

Figure 2A:
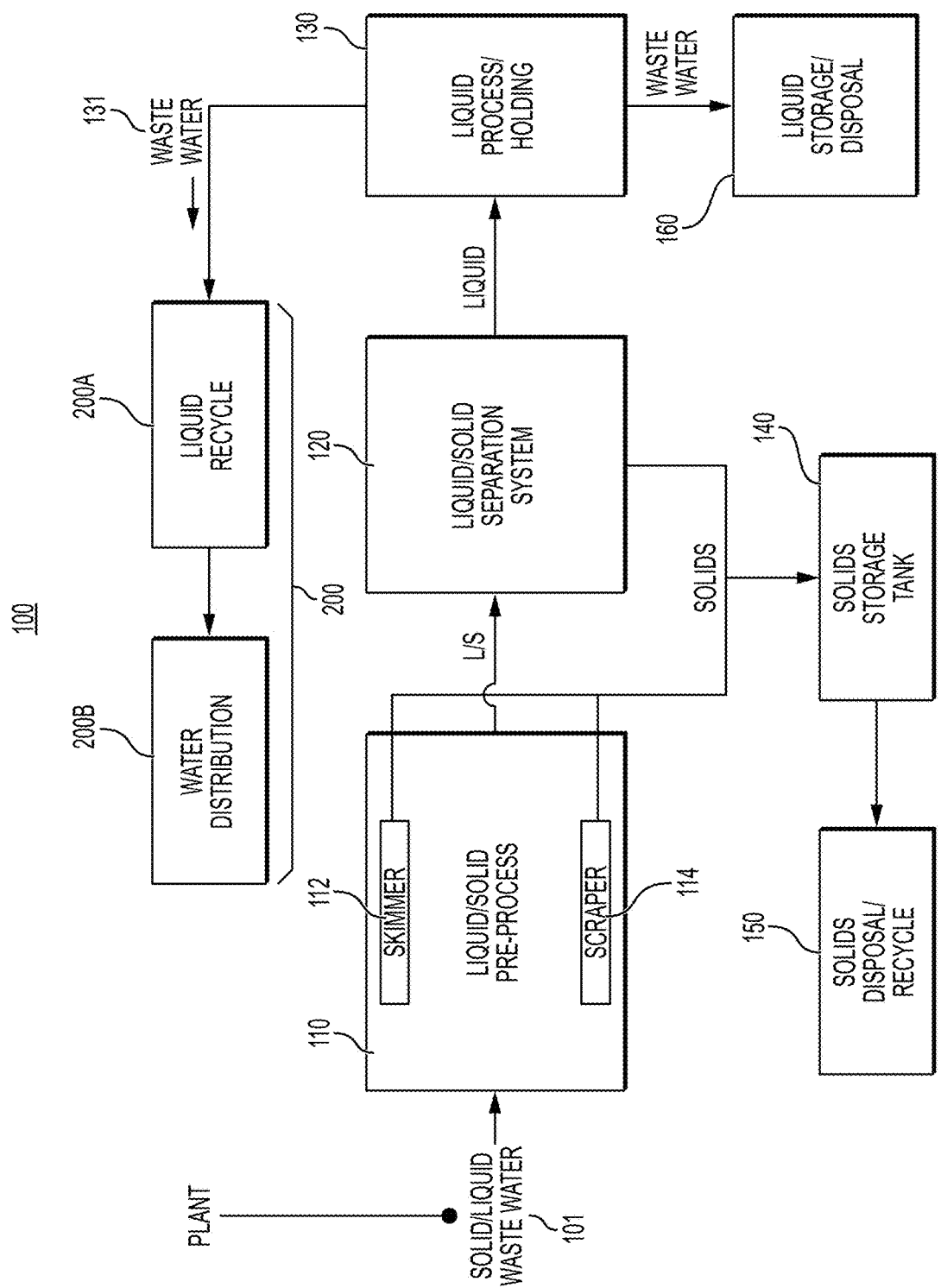
FIGS. 2A and 2B illustrate an example wastewater processing system that overcome limitations inherent in current waste disposal systems.

FIG. 2A is a block diagram illustrating an example improved waste disposal system for implementation by a MPP facility. In FIG. 2A, waste disposal system 100 includes multiple stages of waste processing beginning with waste stream separation. A first stage for waste stream separation receives a solid/liquid waste stream and operates to perform a solids/liquids separation process to remove certain solids, including solids that may not be safe to process in subsequent stages of the system 100. The waste stream may be pumped from a preceding holding tank, or directly from a product processing/manufacturing plant or facility. In an example, the product is human-edible food stuffs, and more particularly, packaged poultry such as chicken and turkey meat, and the waste stream includes the poultry remnants, which may be solids and liquids in another liquid such as water; i.e., wastewater. The consistency of this solid/liquid waste stream 101 may vary. Optional tank 110 receives the waste stream 101 and through a process of scrapping using scrapper 114 and skimming using skimmer 112, some solids are removed from the liquid/solid mixture.

The removed solids may be transferred to solids storage tank 140. Liquid remaining in the tank 110 then may be pumped to liquid/solid separation system 120. Rather than, or in addition to tank 110, the waste disposal system 100 may employ one or more automatically controlled strainers (not shown). Liquid in the liquid/solid separation system 120 is processed by passing the liquid through one or more centrifugal separation stages, or other separation stages. Each such stage may employ a two-phase separator (i.e., a separator that separates solids from liquids). In an aspect, air may be introduced to one or more of the two-phase separators to at least partially dry the separated solids. Following processing in liquid/solid separation system 120, solids are transferred to solids storage tank 140 and liquids are moved to a liquid processing/holding tank 130. While in tank 130, the liquid may be sampled for various characteristics including total suspended solids, clarity, pH, bacteria count, and other characteristics. If the liquid is acceptable for disposal, the liquid may be transferred for disposal (160) and optionally some or all liquid may be retained for recycling using wastewater recycling system 200, which includes liquid recycle 200A and water distribution 200B. After solids are stored in solids storage tank 140, the solids may be transferred to a disposal/recycle system 150. As may be expected, having the waste disposal system 100 as an integral element of a food (e.g., poultry) processing facility makes waste stream treatment and waste disposal more efficient and economical. Furthermore, government regulations mandate that food processing facilities be cleaned after each "shift" of food processing. Cleaning a food processing facility requires access to large quantities of "clean" water.

Figure 2B:
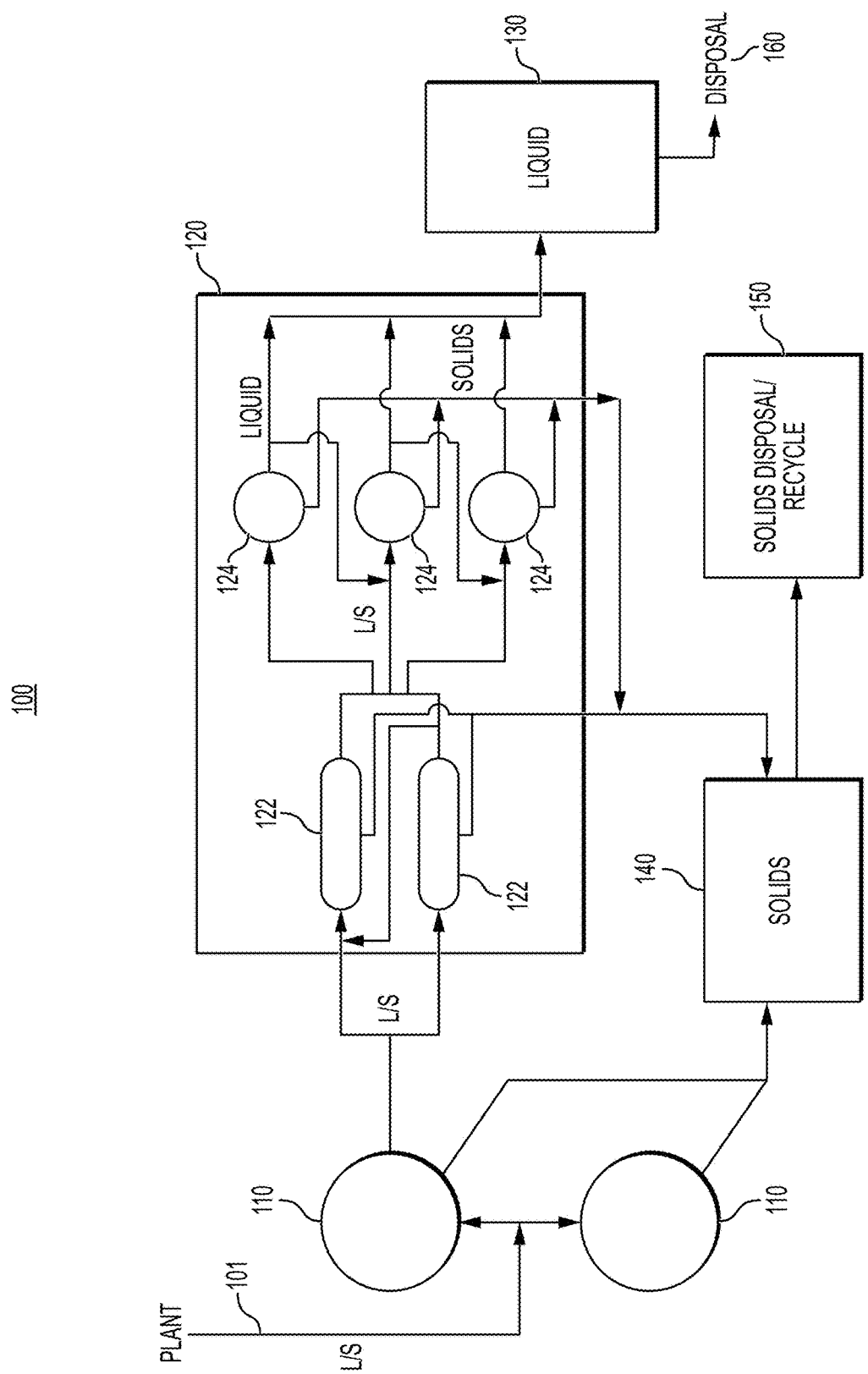

FIG. 2B is a top-down view of the system 100 showing tank, separation, and connection options. For example, the system 100 is shown to include two centrifugal decanters 122 and three centrifuges 124. The system 100 may be controlled through, for example, solenoid or motor-operated components, including rotating machinery such as pumps, and throttle and isolation valves (see FIG. 7D), such that the inputs to and outputs from the decanters 122 and the centrifuges 124 are arranged in series or in parallel. Furthermore, while two decanters 122 and three centrifuges are shown in FIG. 2B, more or fewer decanters 122 or the centrifuges 124 may be employed.

Figure 3A:
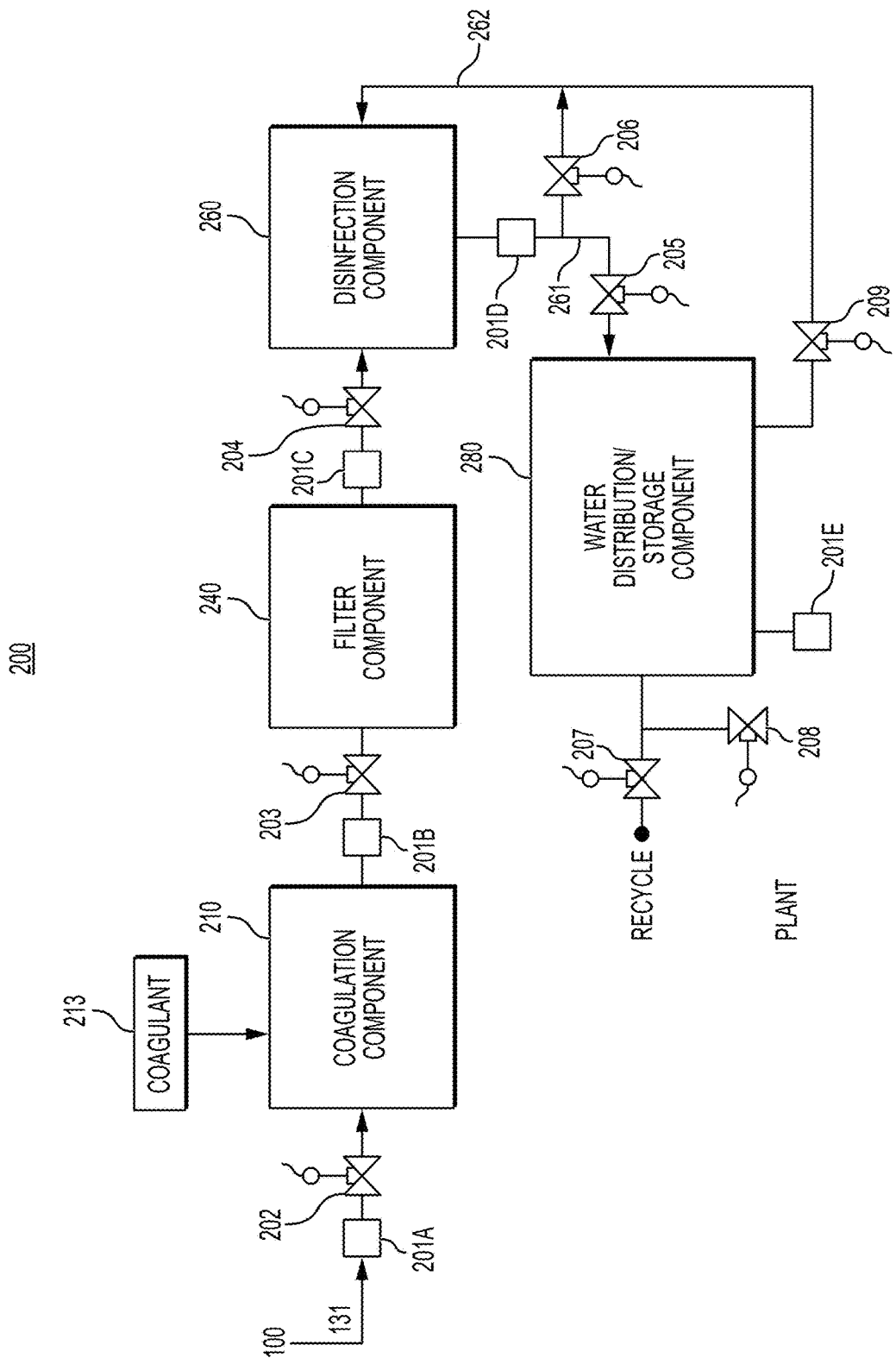
FIGS. 3A-7D illustrate example wastewater recycling systems and related components useable with the wastewater processing system of FIGS. 2A and 2B.

FIG. 3A illustrates example wastewater recycling system 200. System 200 includes coagulation component 210, filter component 240, disinfection component 260, and water distribution/storage component 280. Coagulation component 210 receives wastewater streams 131 from waste disposal system 100. The wastewater streams 131 may be sampled for contaminants, including solids such as total suspended solids (TSS) and other contaminants, bacterial count, pH, clarity, using an inline sampling and analysis component, inline sensor 201A. Use of inline sensor 201A is described in more detail with respect to FIGS. 8 and 8A. Also shown in FIG. 3A are a series of transfer, isolation, and flow control mechanisms (illustrated in FIG. 3A as valves 202-209, and shown in more detail in FIG. 3F) that control fluid flow into and out of the recycling system 200, and between components of the recycling system 200. The valves 202-209 may be servo controlled, for example, using servo motors coupled to the valves 202-209 and to the control system of FIG. 9. Some aspects of the valves 202-209 may be structured to efficiently throttle fluid flow while of the aspects may be structured to effectively isolate the connected components when required. Servo-motor control of the valves 202-209 allows for very fine control of, for example, valve throttling, opening, and closing. Alternately, some of the valves 202-209 may be solenoid operated, or operated by stepper motors. Not shown in FIG. 3A are components such as pumps (see an example pumps illustrated in FIGS. 7D and 16) to produce sufficient head to move fluids (i.e., the wastewater stream 131) through the recycling system 200. However, the pumps are designed to provide the motive force for the wastewater stream 131 while at the same time preventing damage to the recycling system 200 components. For example, the pumps may include a soft-start feature and/or variable speed control to prevent pressure surges in the recycling system 200. The type of pump used (e.g., centrifugal-see FIG. 16) will dictate certain operating procedures (for example, centrifugal pumps do not develop a suction when dry, so the pump impeller must be submerged in the wastewater stream 131 for the pump to start operating). Use of variable speed pumps allows finer control over flow rates, and reduces energy consumption. The pumps and their associated valves may be operated cooperatively to prevent water hammer on pump startup. The valves, pumps, and piping may be further configured with check valves and priming systems (not shown) to provide desired operation of recycling system 200.

Figure 3B:
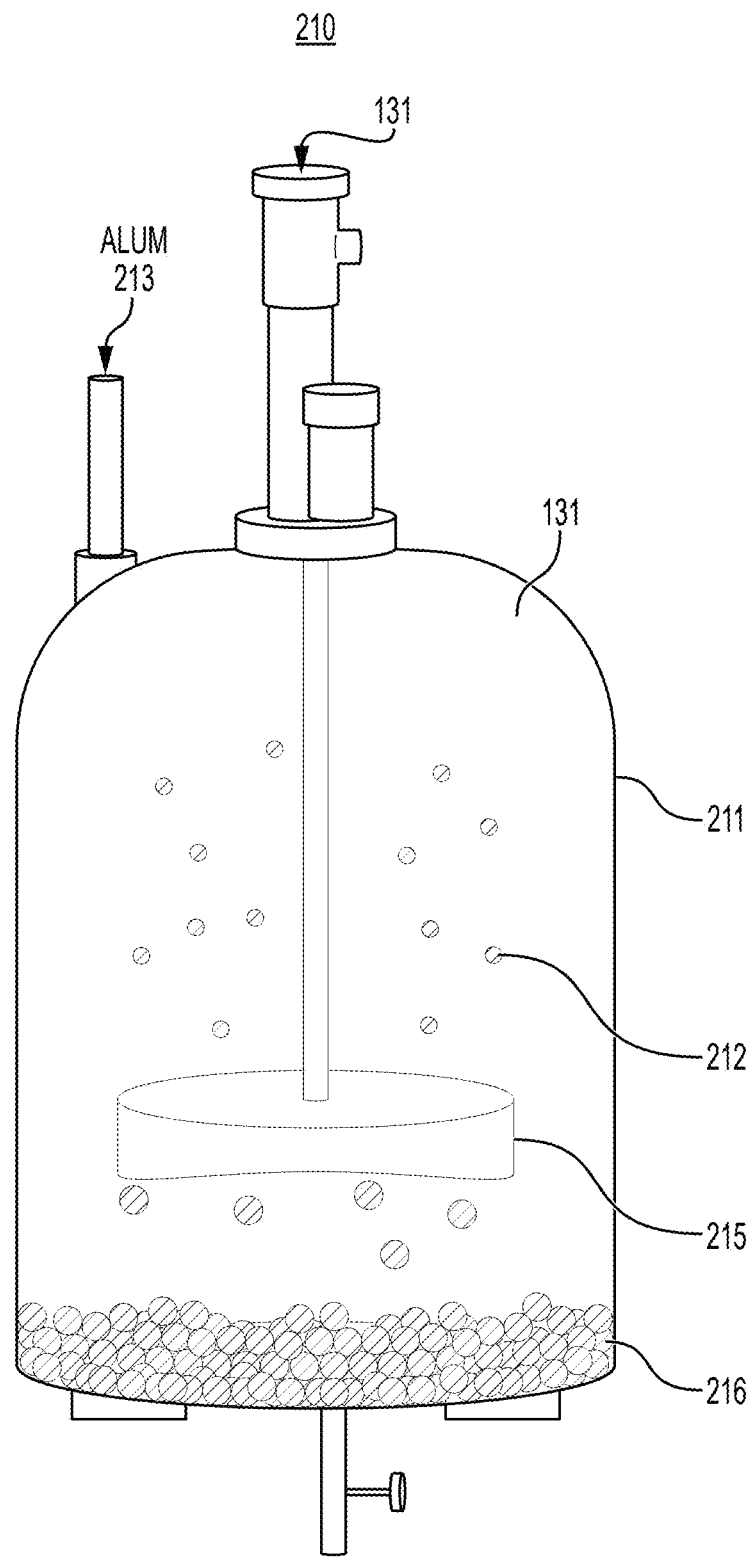
Figure 3C:
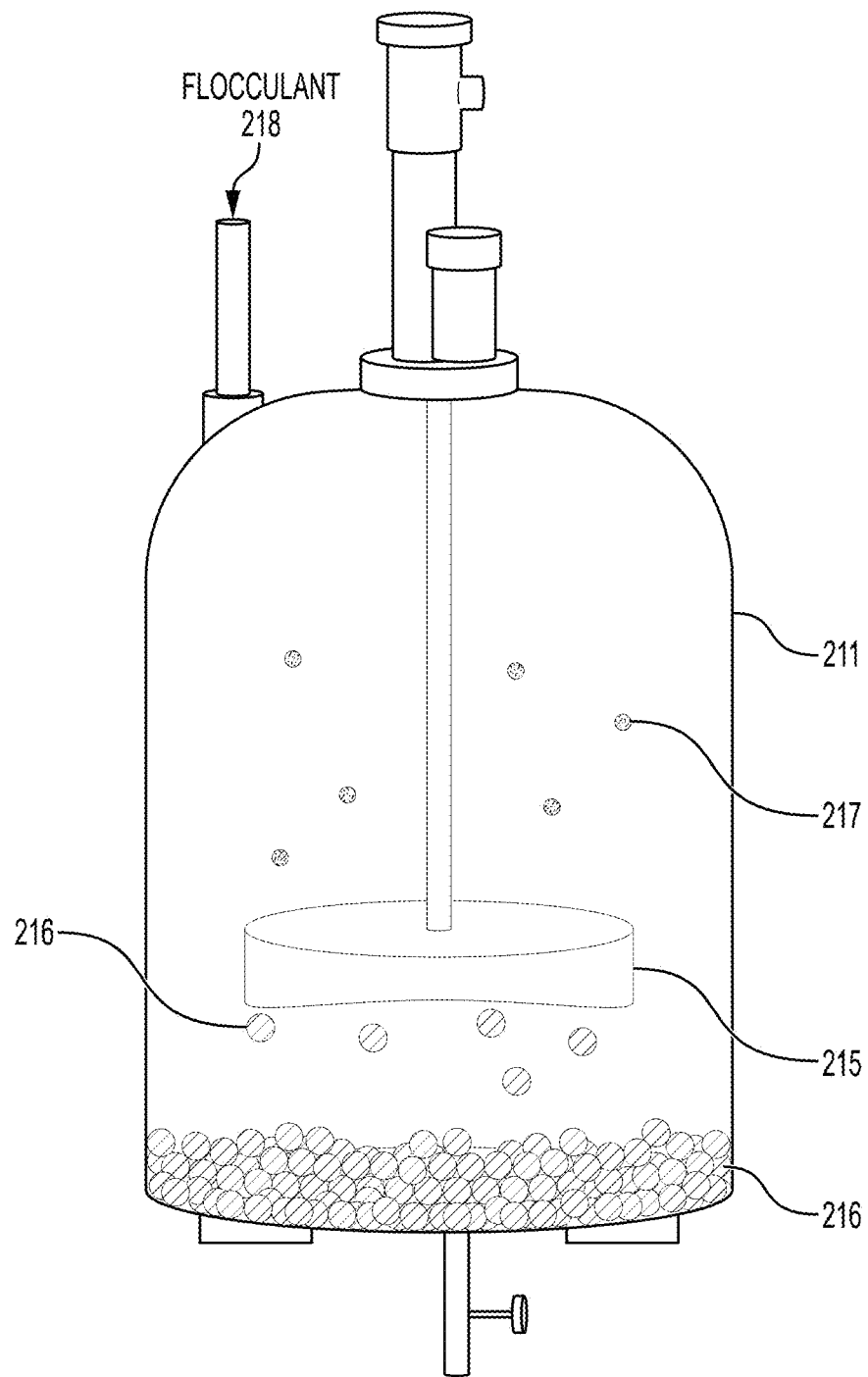
Figure 3D:
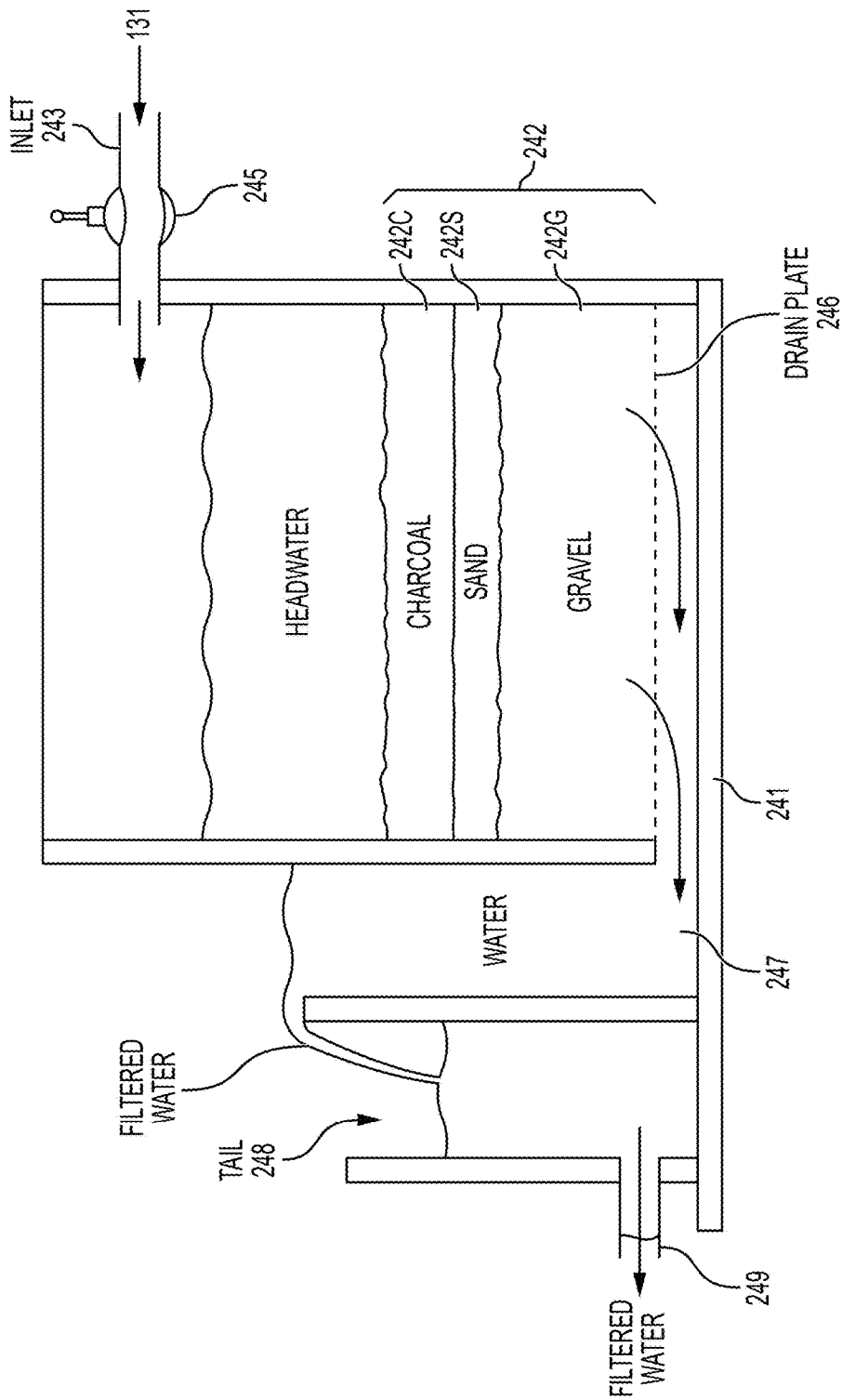

The coagulation component 210, shown in more detail in FIGS. 3B and 3C, receives coagulant 213 that, when introduced into the wastewater neutralizes charges of suspended particles, which causes the fine solid particle to agglomerate into larger, settleable particles that may be more readily removed in filter component 240. Filter component 240 may employ one or more mechanical filters that trap the agglomerated particles while allowing the wastewater stream to pass to disinfection component 260. Filter component 240 is shown in more detail in FIG. 3D. Disinfection component 260 may include one or more disinfection technologies, with application of each disinfection technology including one or more disinfection stages. For example, disinfection component 260 may include one or more ultraviolet disinfection technologies, reverse osmosis technologies, electro-chemical treatment technologies, and nano-bubble technologies, as well as other appropriate disinfection technologies. Examples of disinfection component 260 are shown in FIGS. 4A-7C. Disinfection component 260 may include an "in-component" sampling system (not shown) that samples wastewater stream 131 being processed within the disinfection component 260 prior to discharge of the disinfected water. Disinfection component 260 provides a fluid discharge stream 261 that may be routed to water distribution/storage component 280 after passing through inline sensor 201D, and assuming the sensor 201D provides desired or required parameter values for the fluid discharge stream. If the inline sensor 201D produces a reading that does not meet the desired or required values (e.g., values for potable water), a servo-motor control valve 205, implemented as an element of a transfer mechanism may remain shut or may shut, and servo-motor control valve 206, implemented as an element of a transfer mechanism may open to return the fluid stream 262 to the disinfection component 260 for further disinfection. Water distribution/storage component 280, described in more detail with respect to FIG. 3D, provides temporary storage for the potable water (or other grade water) produced by disinfection component 260 until the potable water is distributed through either valve 207 or valve 208. Some potable water may be distributed to a specific end user such as a municipal water system for use as "drinking" water, or may be returned to the MPP plant as food processing water or equipment disinfection water. While in storage in the water distribution/storage component 280, the potable water may be sampled by sensor 201E to ensure the stored potable water does not become contaminated. Any stored water that may become contaminated may be treated by, for example, addition of chemicals to the water distribution/storage component 280, or by returning the contaminated water to the disinfection component 260 through valve 209.

FIGS. 3B and 3C illustrate an example coagulant/flocculant component useable with the recycling system 200 of FIG. 3A. In FIG. 3B, a fluid (wastewater) in tank 211 is seen to include suspended solids 212 as well as large solid particles 216 that have settled to the tank bottom. A coagulant (Alum) 213 is added to the tank 211 and stirrer 215 is operated to mix the coagulant 213 and the suspended solids 212 to obtain a homogeneous mixture after which the stirrer 215 is stopped. The coagulant 213 causes the suspended solids to clump together into mini-flocs 217, which can be seen in FIG. 3B. However, some mini-flocs 217 remain suspended. Next, as can be seen in FIG. 3C, a flocculant 218 is added to the tank 211, the stirrer 215 operated and then stopped. The mini-flocks 217 will then form flocculants 218 and sink to the bottom of the tank 211, joining with the previously-precipitated/settled-out large solid particles 216. The thus-processed wastewater may be transferred to the next stage or component of the recycling system 200, namely the filter component 240.

FIG. 3D illustrates an example multi-layer, multi-media filter component useable with the recycling system 200 of FIG. 3A. FIG. 3D illustrates single stage, multi-layer, multi-media filter component 240. However, the recycling system 200 may employ multiple stages of the filter component 240. When multiple filter stages are used, the individual filter units may be connected in series or in parallel, or both. Thus, in an aspect, the recycling system 200 employs multiple filter components 240, with the multiple filter components configurable to support parallel or series filter operations. In FIG. 3D, filter component 240 includes a filter housing 241, which in turn includes raw water (i.e., wastewater from coagulant component 210) inlet 243 with a corresponding control (i.e., throttle) valve 245. The control valve 245 may be manually operated or may be computer-controlled using a servo-controlled motor. The housing further includes drain plate 246 (e.g., a mesh structure) that both supports filter media, and provides a drain path for wastewater stream 131 passing through the filter media, weir 247, tail 248, and discharge 249. The filter component 240 includes a multiple layer, multiple filter media 242 that includes a gravel layer 242G, a fine sand layer 242S over the gravel layer 242G, and a coarse coal layer 242C over the fine sand layer 242S. In operation, wastewater descends through the filter media 242 to the drain plate 246. The thus-filtered wastewater rises in the weir 247, spills over to the tail 248, and then is discharged 249 to the disinfection. component 260.

Figure 3E:
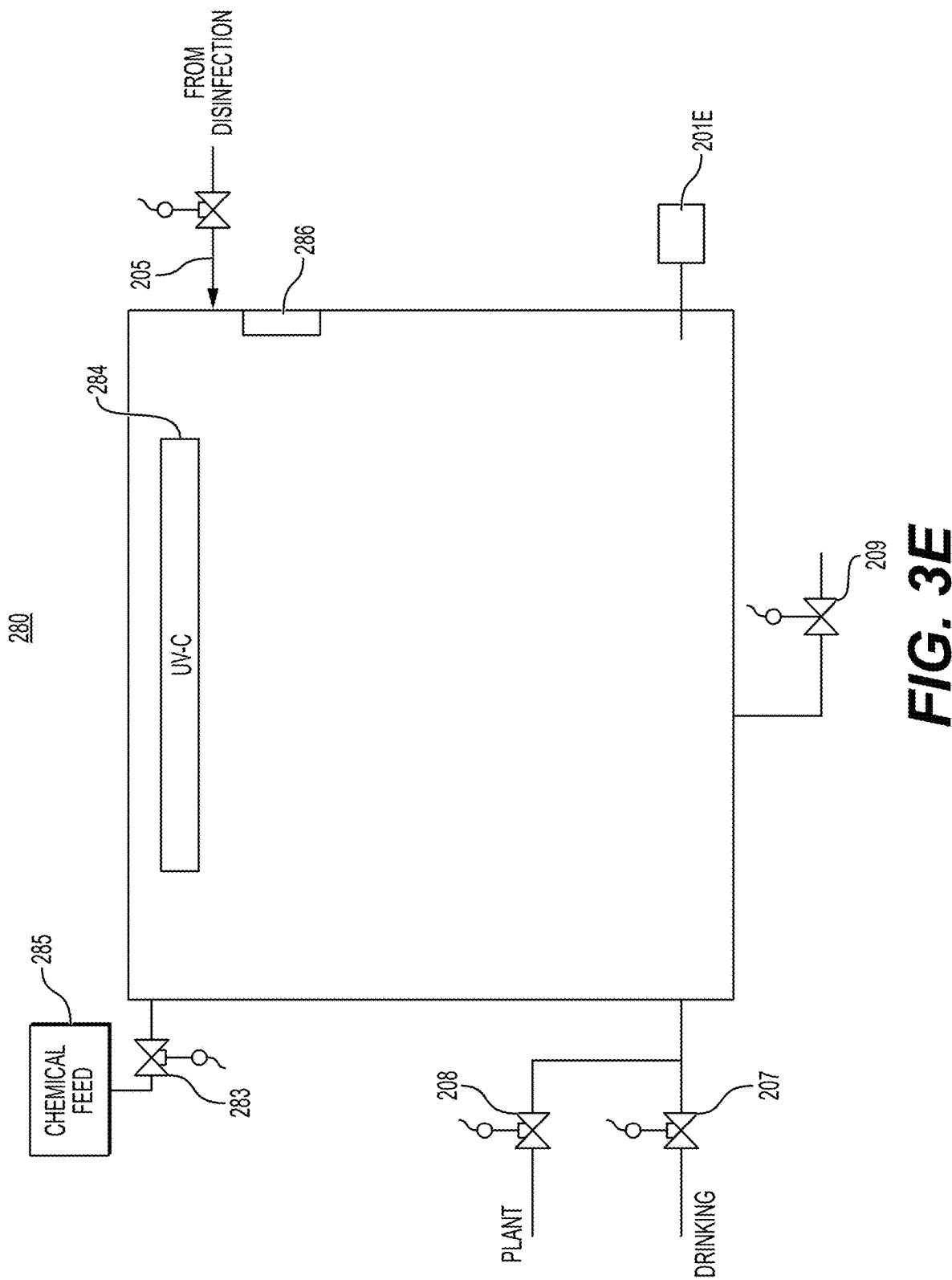

FIG. 3E illustrates an example distribution/storage component useable with the recycling system 200 of FIG. 3A. In FIG. 3E, distribution/storage component 280 receives processed water (potable water) from disinfection component 260 and stores and maintains the potable water for eventual distribution through transfer mechanisms 207 and 208. The distribution/storage component 280 includes mechanisms to ensure the water contained therein meets the standards and requirements for potable water. The mechanisms include a chemical feed system 285 with servo-motor controlled throttle valve 283 through which various chemicals may be added. The chemicals may be added by gravity feed, a conveyor system, or through a pressure mechanism. The mechanisms also include a UV-C component 284, which may be used to kill bacteria and pathogens in the potable water. Finally, the mechanisms include sampling and analysis components such as sensor 201E. The distribution/storage component 280 may include a stirrer (not shown) to circulate water and an aerator (not shown). The distribution/storage component 280 includes drain valve 287, which may be manual or servo-motor-controlled. Finally, the distribution/storage component 280 may include a float switch 286 that operates to prevent over-filling of the distribution/storage component 280.

Figure 3F:
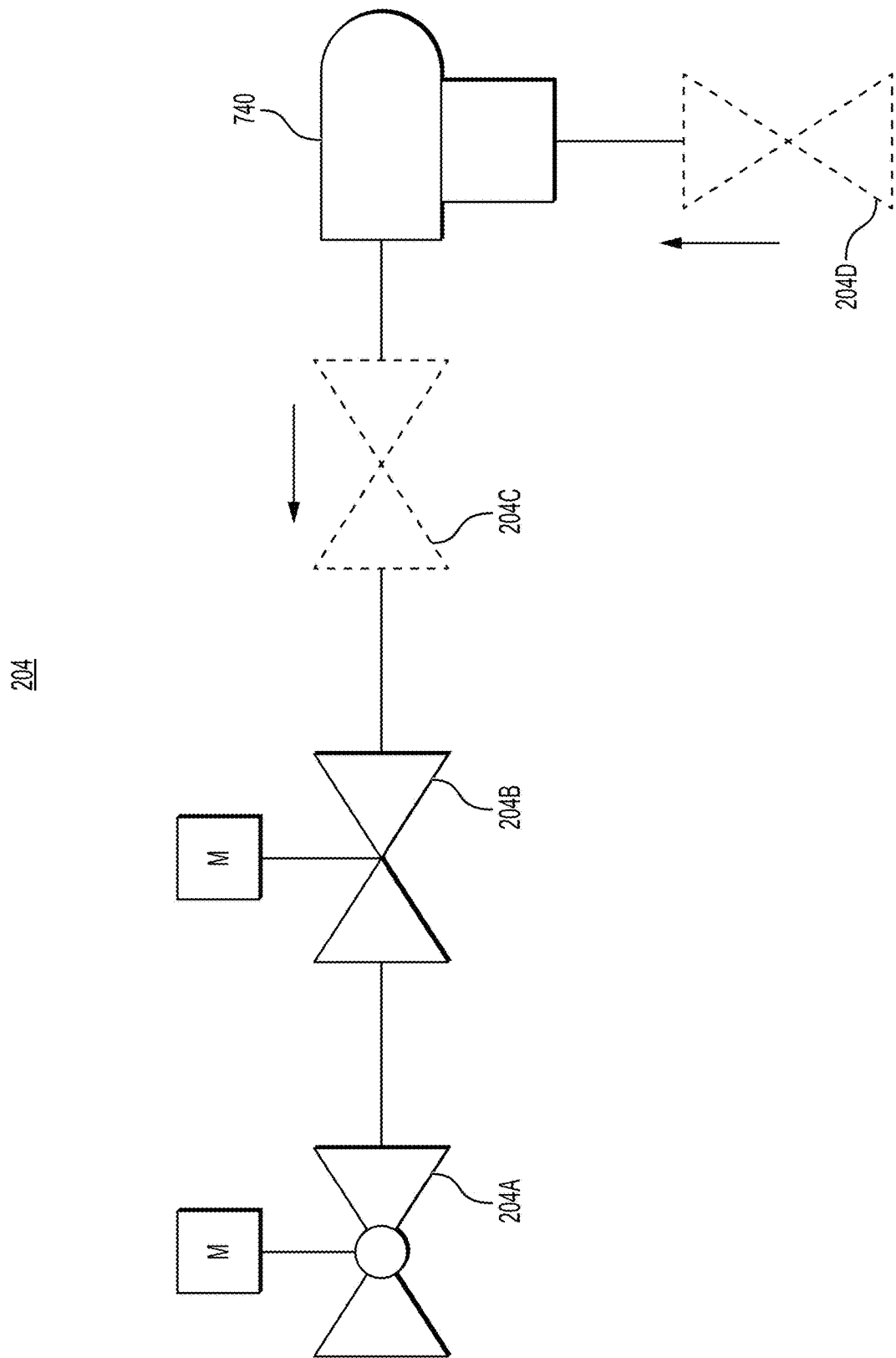

FIG. 3F illustrates an example wastewater transfer mechanism. As stated with respect to FIG. 3A, wastewater (and processed wastewater) transfer mechanisms may include one or more valves and may include an element that provides motive force for the wastewater stream 131. In FIG. 3F, transfer mechanism 204 is seen to include a centrifugal pump 740, a pump outlet isolation valve 204A, and a throttle valve 204B. The isolation valve 204A typically would be a gate valve, and the throttle valve 204B typically would be a globe valve. In some implementations, the isolation valve 204A is a dual-disc gate valve. Use of a dual disc gate valve allows the system 200 to implement mechanisms to monitor for leakage across a seat of an isolation valve. The isolation valve 204A and the throttle valve 204B are shown as servo-motor operated valves. However, other means for operating the isolation valve 204A and the throttle valve 204B may be employed, including manual operation, a manual override, or a local electrical override. Thus, each of the isolation valve 204A and the throttle valve 204B may operate in an automatic mode (i.e., computer-controlled), a manual-electric mode, or a manual mode. In addition to the isolation valve 204A and the throttle valve 204B, the transfer mechanism 204 may include a manual isolation valve (a gate valve) 204C at the pump discharge, and an isolation valve 204D (servo-motor controlled or manual controlled) at the pump suction. Furthermore, use of servo-motor control provides more precision when throttling the pump effluent (that is, a servo-motor-controlled globe provides finer flow control that is possible with either a solenoid operated valve (which typically has no flow control other than on or off/open or shut) or a stepper-motor-controlled valve (which opens and closes in "steps"). However, economics and other considerations may drive the selection of valve control.

Figure 4A:
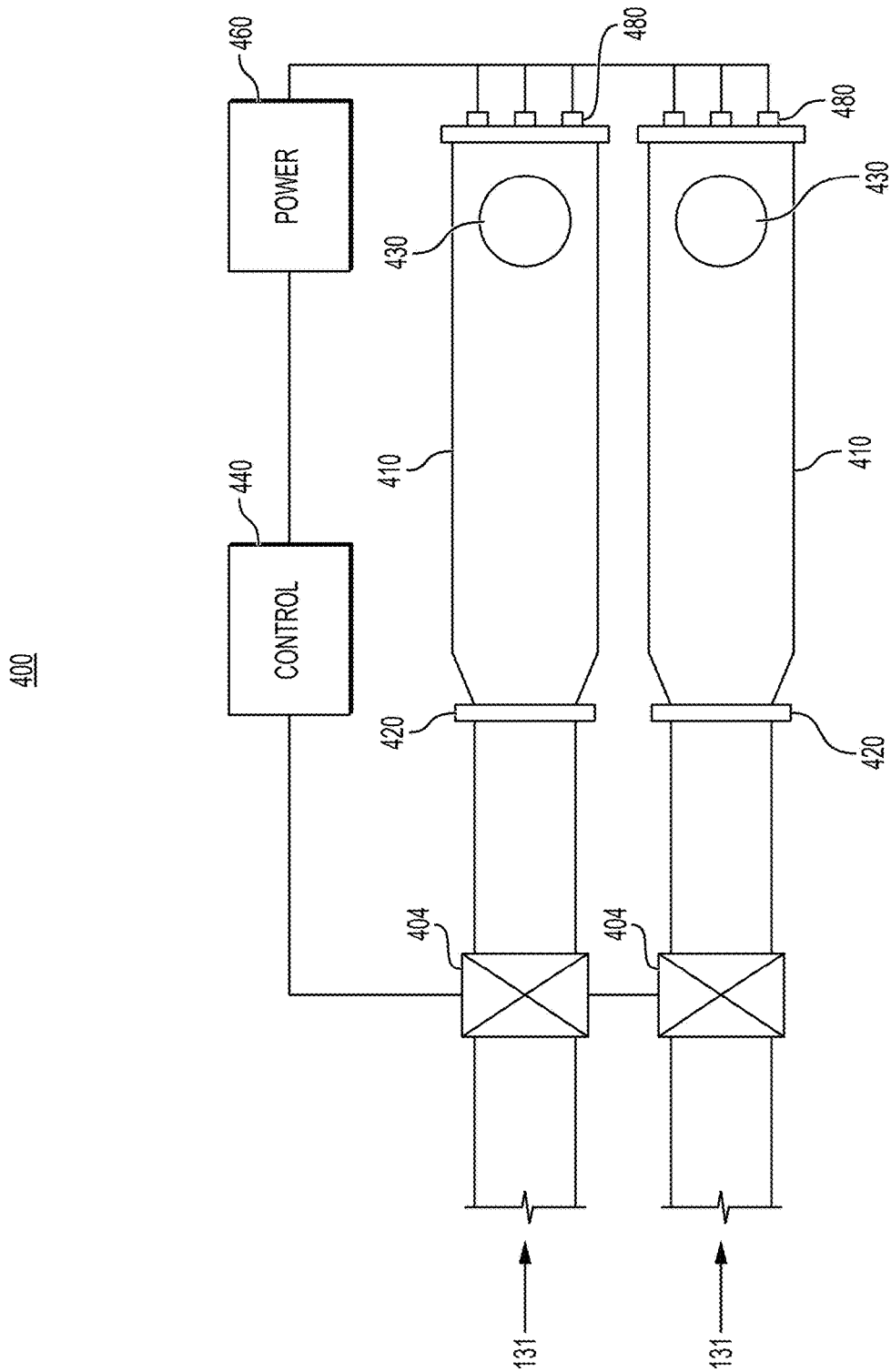
Figure 4B:
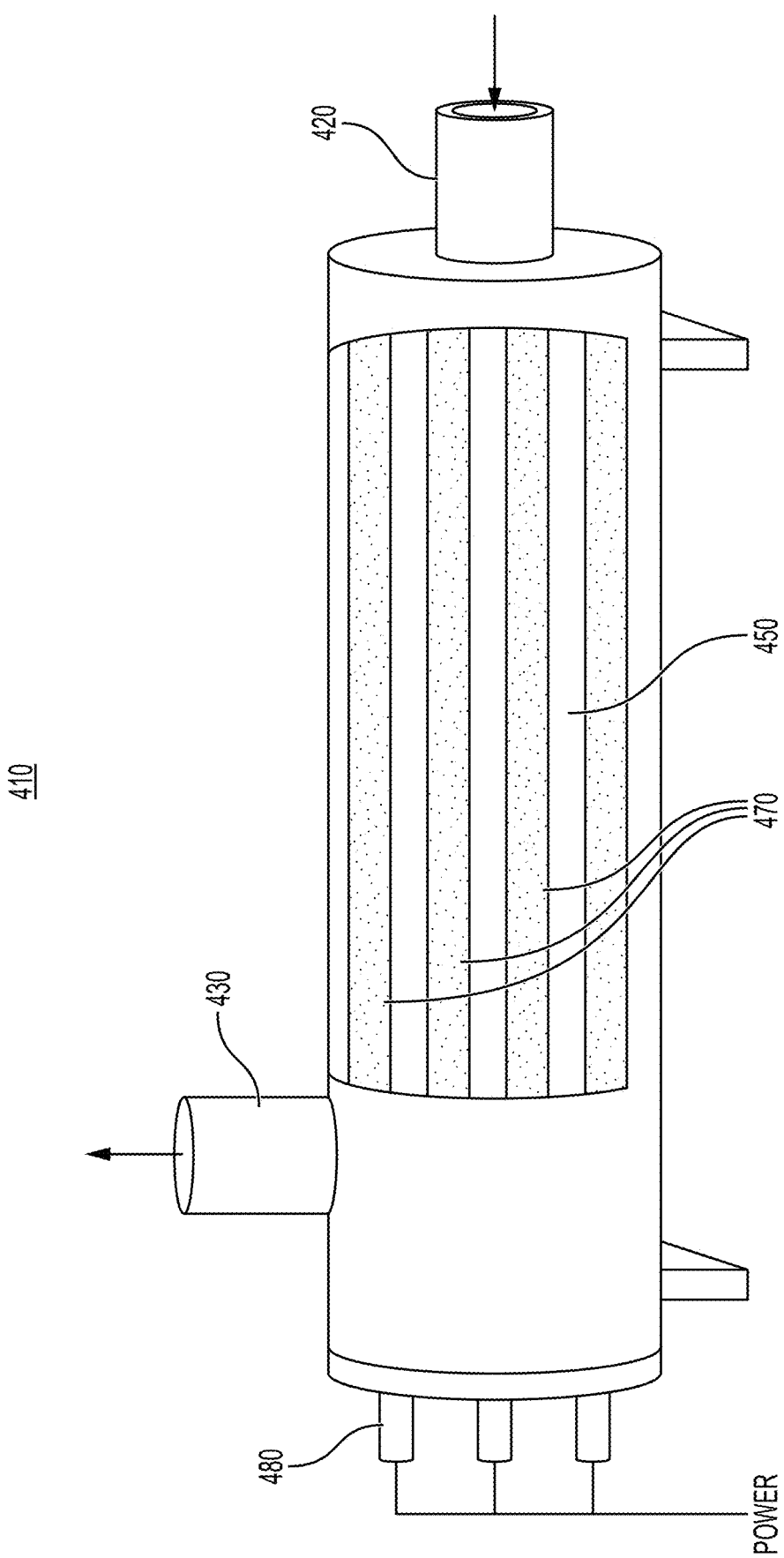

FIGS. 4A and 4B illustrate an example disinfection component that employs ultraviolet disinfection. Ultraviolet disinfection is effective at inactivating (killing) microorganisms such as bacteria, viruses, molds and pathogens without the use of chemicals. Ultraviolet light also is used for disinfection and removal of organic and inorganic contaminants, including chlorine, ozone and total organic carbon (TOC). Ultraviolet technology may be used where conventional chlorine disinfection cannot be applied. Key benefits of UV technology include: improved taste, color, pH or odor of water, elimination of storage, handling or transportation of toxic or corrosive chemicals, improved inactivation of a wide range of microorganisms including chlorine tolerant pathogens.

Ultraviolet light, such as ultraviolet C (UV-C; i.e., electromagnetic radiation or light having a wavelength from about 200 nm to about 280 nm, typically 254 nm), have microbial and bactericidal effects on air, liquids, and surfaces. For example, a wavelength set to 254 nm is effective at eliminating bacteria (e.g., *Naegleria fowleri*) in the following lifecycle stages: cyst, trophozoite, and flagellate. Other electromagnetic radiation wavelengths also may be effective for disinfecting, sanitizing, and/or sterilizing, including wavelengths from about 270 nm to about 320 nm.

In an example, ultraviolet light is generated by purpose-designed fluorescent light bulbs. In another example ultraviolet light is generated by an ultraviolet light emitting diode (LED) or LED array. In an aspect, the LED is flexible and capable of flush securement on non-planar surfaces. In some examples, a non-pulsed output is provided, with the intensity controlled by a current limiting resistor in series with the LED. Alternatively, the UV light can be transmitted using a laser. These ultraviolet sources can have a wavelength range of 100-400 nm. In some examples, a wavelength at 240-260 nm is preferred (i.e., for DNA absorption and/or bacteria/virus reduction), or at 365 nm (i.e., for water sterilization or treatment). Alternatively, the UV-C sources may scan in any suitable wavelength range that facilitates disinfection. Moreover, the UV-C sources may be used for sanitation, and/or sterilization of hardware (e.g., tank interiors) of the recycling systems. In an example, single or multiple sensors may be used be used to monitor temperature, power, pH, and/or other parameters needed to determine if the processed water is safe for human consumption. The UV-C treatment time may be automated, and transfer of the wastewater to be treated may be automated.

FIG. 4A is a top-down view of an ultraviolet, C-band (UV-C) disinfection component 400. The disinfection component 400 may be incorporated into the wastewater recycling system 200 of FIG. 3A (e.g., as component 260), and wastewater recycling system 200 in turn may be appended to the waste disposal system 100 of FIGS. 2A and 2B. Alternatively, the recycling system 200, including the disinfection component 400 may be provided and operated as a standalone system. The disinfection component 400 includes two, parallel-configured, UV-C vessels 410, each of which receives wastewater stream 131 through servo-motor control (throttle) valves 404 at inlet 420 and discharge treated water at outlet 430. The UV-C vessels 410 are configured to house UV-C light emitting devices that receive electrical power through connectors 480 from power supply 460 under control of controller 440. The UV-C vessels 410 are shown in more detail in FIG. 4B.

FIG. 4B is a cutaway perspective view of a UV-C vessel 410, showing the vessel interior 450 with UV-C tubes 470 running most of the length of the UV-C vessel 410. The UV-C tubes 470 terminate in electrical connectors 480, which receive power from power supply 460 (FIG. 4A).

The UV-C vessels 410 of FIG. 4A are shown in a parallel configuration that makes servicing one of the vessels possible while operating the other vessel. Alternately, the UV-C vessels 410 could be arranged in series, or may be piped for series/parallel operation as dictated by the wastewater stream 131. In addition, the disinfection component 400 could include more or less than two UV-C vessels 410.

Figure 5:
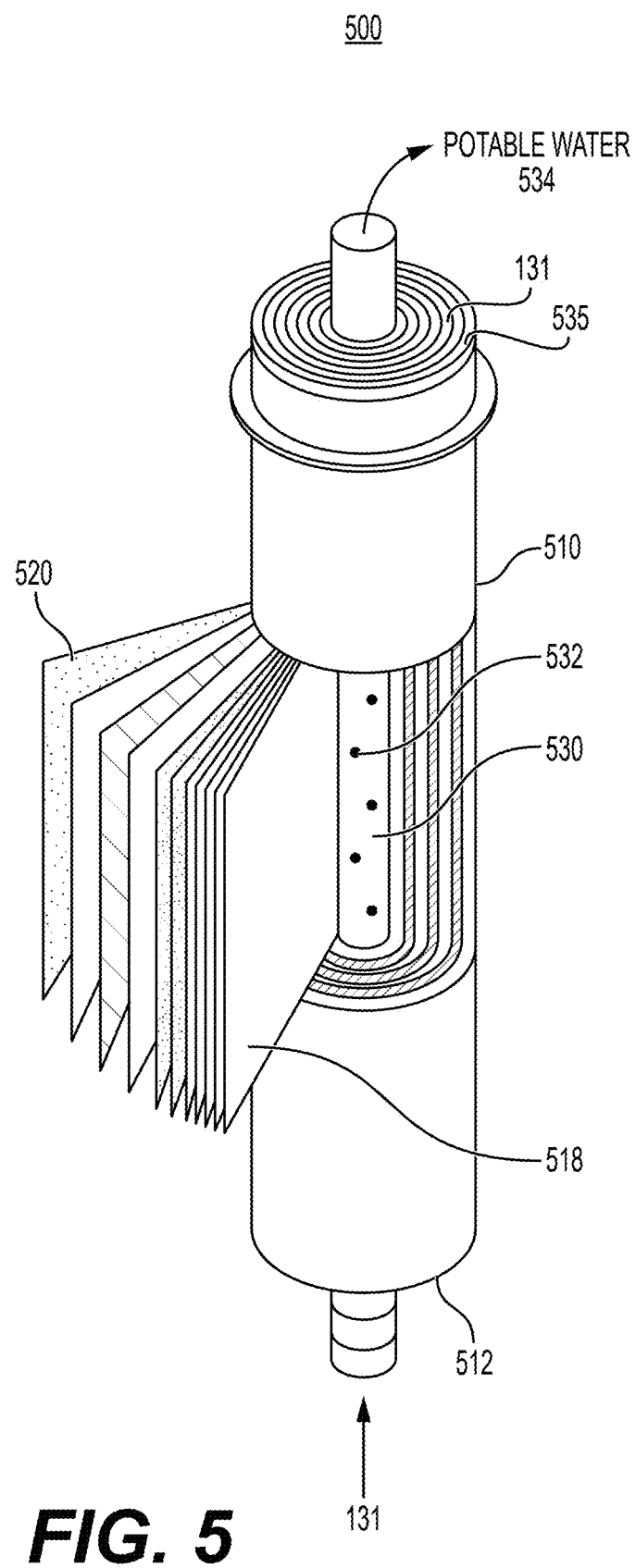

FIG. 5 illustrates an example disinfection component that employs reverse osmosis (RO) disinfection. While many forms of reverse osmosis are possible, FIG. 5 illustrates an RO component 500 that includes RO vessel 510, which in turn includes multiple cylindrical membranes 520, each of which is formed from multiple layers of flat sheets 518 that are rolled around center tube 530, creating a cylindrical void between the rolled sheets 518 and the inner wall of the RO vessel 510. Center tube 530 is perforated with holes 532 to allow the flow of waste water through the center tube 530. In operation, wastewater stream 131 enters open end 512 and moves through the folded and stacked layers, of sheets 518, and into center tube 530. Potable water exits the center tube at 534, where the potable water is collected and sent to storage. Water not traversing the layered sheets 518 and entering the center tube 530 exits the RO vessel 510 through outer openings 535. The RO component 500 may include many cylindrical RO vessels arranged in a parallel configuration, a series configuration, or a switchable parallel/series configuration.

Figure 6:
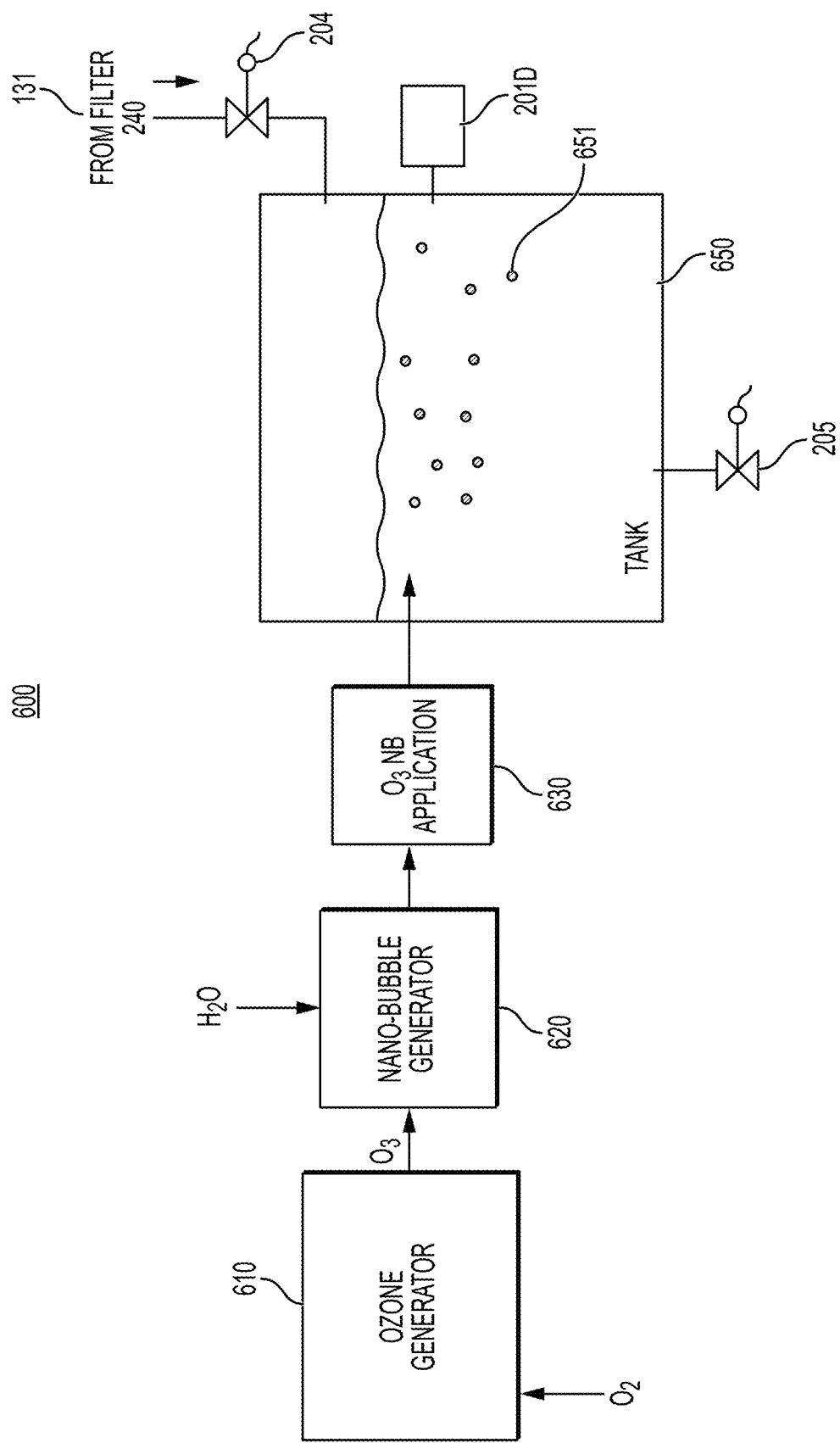

FIG. 6 illustrates an example disinfection component that employs nanobubble technology. Possibly because of their large surface area-to-volume ratio (i.e., a large gas-liquid interfacial area), which results in a low rising velocity, and because of their resistance to coalescence, nanobubbles are highly stable and can exist in water for several months. Besides high stability, nanobubbles possess properties such as a high negative zeta potential, low buoyancy, and the ability to generate radicals (nanobubble collapse provides an oxidation capability), all of which make nanobubbles potentially suitable for disinfection applications, including to disinfect wastewater streams produced by MPP facilities. In an example, the nanobubbles are formed from ozone ($O_3$). Ozone is a good choice for a nanobubble disinfectant because ozone is a powerful oxidant that effectively and efficiently inactivates pathogenic microorganisms including bacteria, viruses, protozoa and endospores. Furthermore, ozone in an aqueous solution decomposes to form oxygen, leaving no harmful residue. However, ozone is an unstable trioxygen molecule and therefore ozone must be generated on-site.

In FIG. 6, ozone nanobubble disinfection component 600 includes an ozone generator 610, an ozone nanobubble generator 620, an ozone nanobubble applicator 630, and a process tank 650 configured to hold wastewater effluent from an MPP facility. The process tank 650 is instrumented (sensor 201D) to measure conditions of the wastewater stream 131 being disinfected and to monitor progress toward disinfection. In operation, after tank 650 has received filtered wastewater stream 131, the ozone generator 610 produces ozone ($O_3$) from input oxygen ($O_2$). The ozone is then provided to a nanobubble generator 620, which receives the ozone in a liquid (water) environment and initiates one or more cavitation actions to produce nano-scale ozone bubbles 651. The nano-scale ozone bubbles 651, in the water environment, then are fed by way of ozone nanobubble applicator 630 into the tank 650 below the water line. The nano-scale ozone bubbles 651 are slow to rise, but will collapse, and the collapses provide oxidative events, which effectively renders inert many possible pathogens and microorganisms. The sensor 201D is configured to measure pathogen activity in the tank 650.

Although the disinfection component 600 is described as using ozone, other gases may be substituted for ozone.

Certain chemical disinfection regimes, including chlorination, while effective in killing microorganisms, may produce toxic by-products and may create a hazardous workspace. These by-products include trihalomethanes, chloroform, and haloacetic acids. Chlorine treatment also may leave a residual odor or flavor when used to produce potable water. These negative effects may be sufficient to preclude chlorination for potable water production. However, other chemical regimes, and particularly electro-chemical disinfection (ECD) regimes may be practical in a potable water production process. The efficacy of the electro-chemical disinfection (ECD) relies on the generation of disinfectants, and on the oxidation power of the disinfectants, at an electrode surface-layer of an anode or in bulk electrolytes. For example, in a chlorine-free environment, ECD produces hydroxyl radicals by the oxidation of water on the surface of an anode. Anode material may affect the rate of oxidation, with boron doped diamond (BDD) anodes being particularly effective.

Figure 7A:
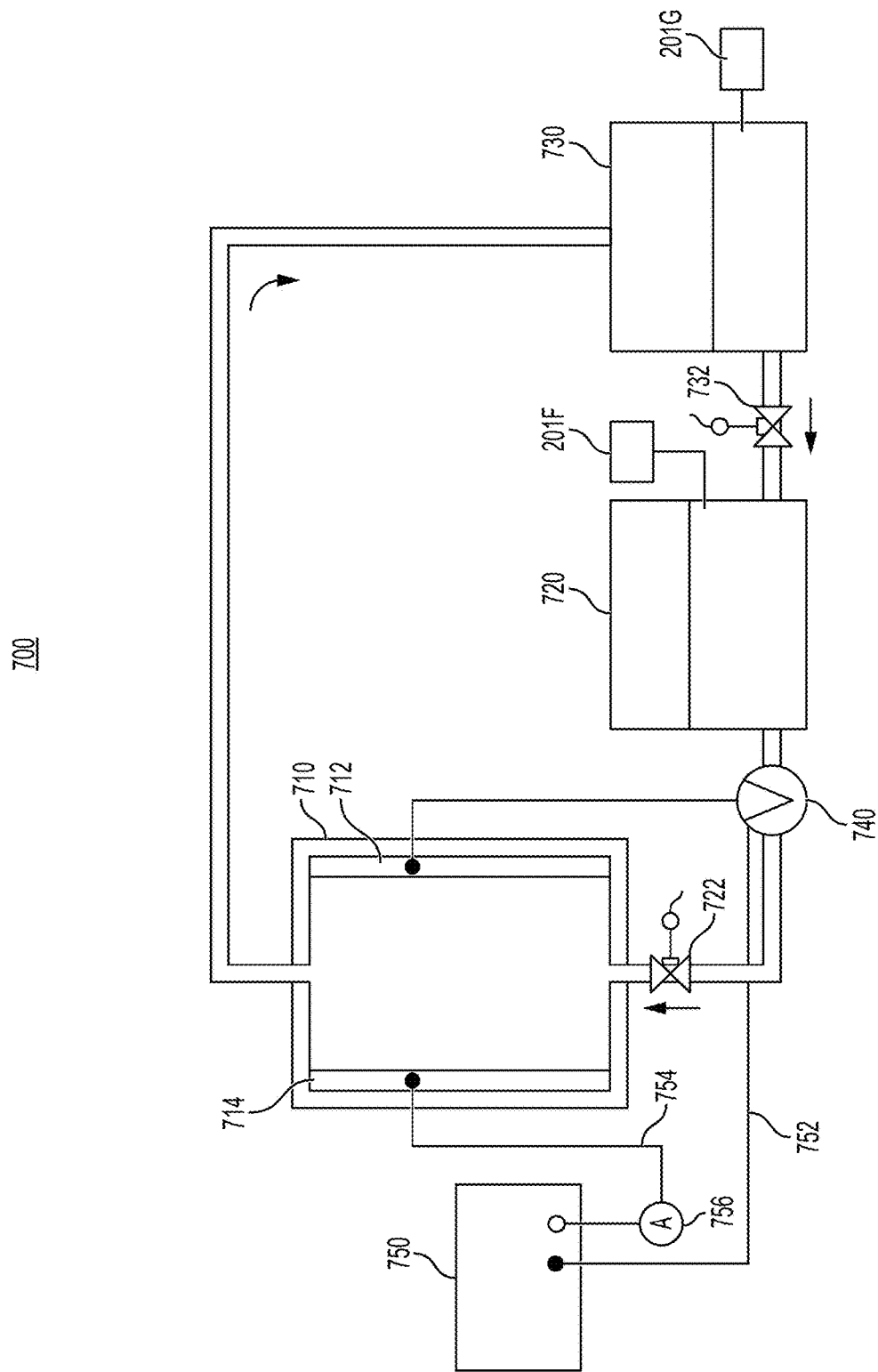

FIG. 7A illustrates an example electro-chemical disinfection (ECD) component that employs ion exchange disinfection technology. The ECD component relies on electrocatalytic materials and the use of electric current to inactivate or render inert waterborne pathogens. Electro-chemical disinfection can be scaled to accommodate the working environment of a facility requiring disinfecting. In an aspect, the ECD component of FIG. 7A, as noted, may employ boron doped diamond anodes to generate powerful oxidants for eliminating and controlling waterborne pathogens in non-potable water to make it suitable as drinking water. In FIG. 7A, ECD component 700 includes an electrochemical cell 710, and a supply tank 720 containing water with one or more pathogens or microorganisms that must be killed to make the water potable. The supply tank 720 may be provided with water that has been filtered and flocculated to remove all or most solids. Thus, the ECD component 700 may process wastewater provided as the effluent of filter component 240 (see FIG. 3A), or a similar filter. The ECD component 700 may include drain tank 730, which receives effluent from the electrochemical cell 710. A pump 740 provides water from the supply tank 720 to the electro-chemical cell 710 via valve 722, from the electrochemical cell 710 to the drain tank 730, and, as needed, from the drain tank 730 via valve 732 to the supply tank 720, forming a continuous loop ECD flow. The electrochemical cell 710 includes anode 712 and cathode 714. The anode 712 may be boron doped diamond (BDD) material and the cathode 714 may be aluminum (Al), for example. The anode 712 and the cathode 714 receive electrical power from power supply 750 over power lines 752 and 754, respectively. The ECD component 700 further includes isolation/flow control (throttle) valves (see, e.g., FIG. 3F), which may be servo-motor controlled, ammeter 756, and sensor 201F and sensor 201G.

Figure 7B:
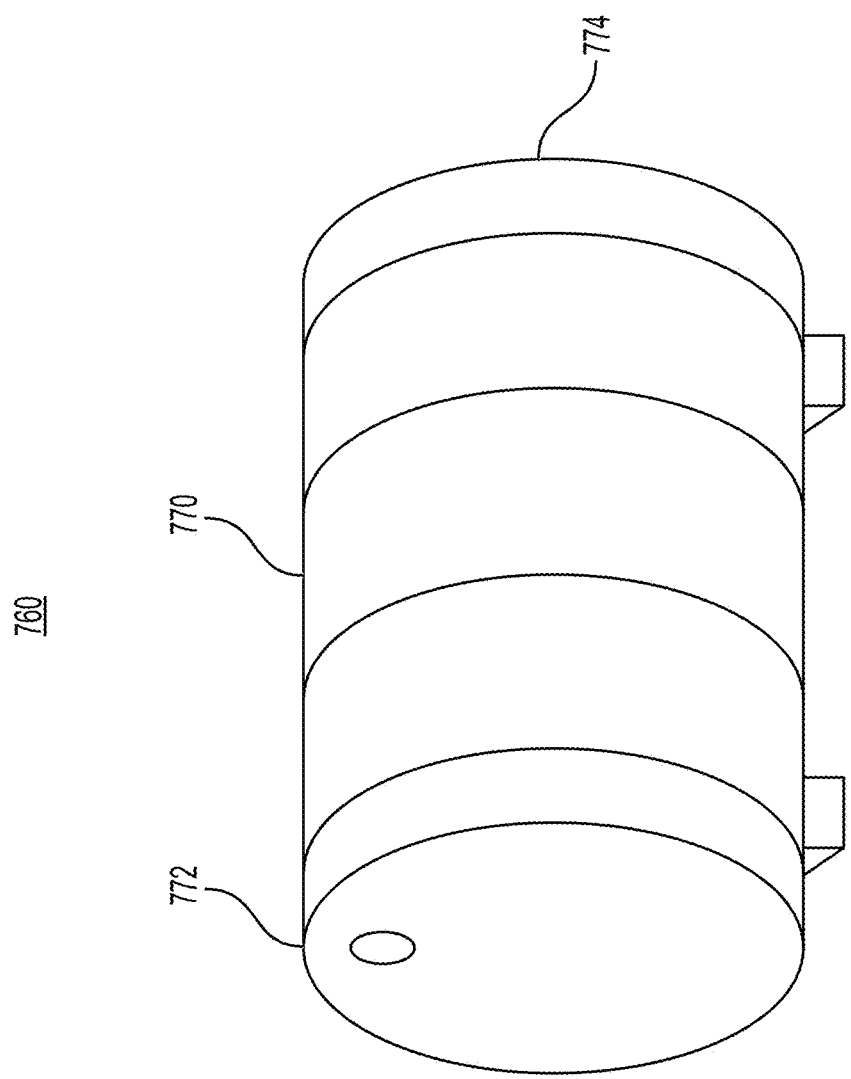
Figure 7C:
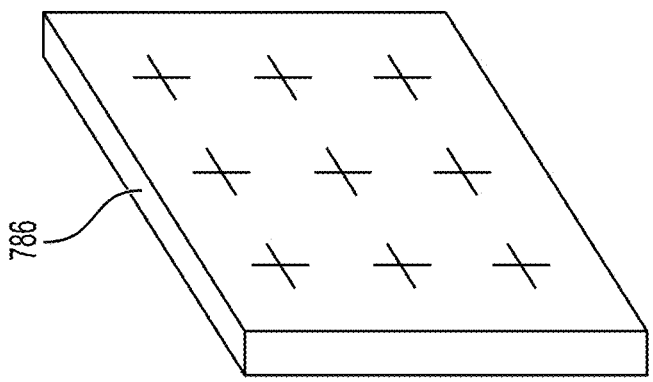
Figure 7C:
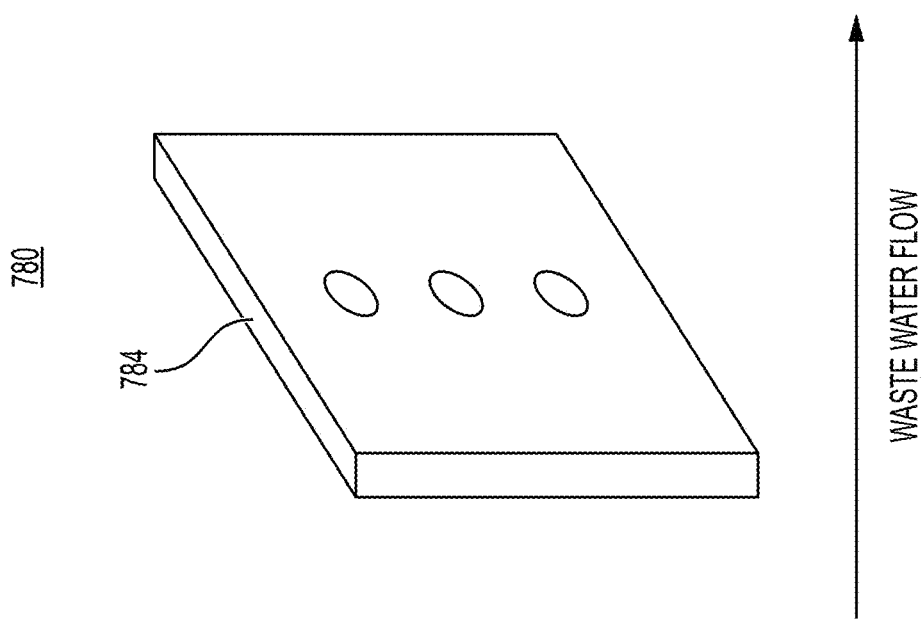
Figure 7C:
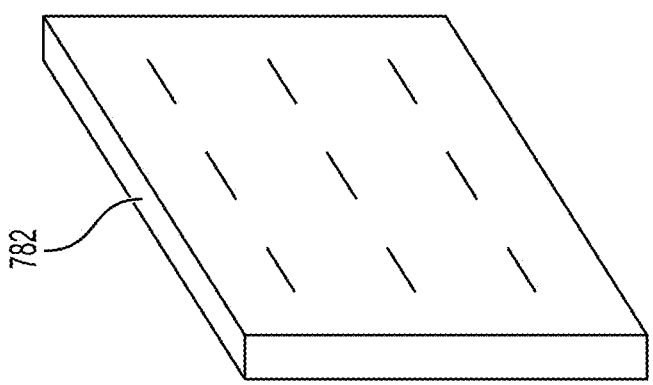

FIGS. 7B and 7C illustrate an alternate arrangement of an electro-chemical cell useable in the ECD system 700. In FIG. 7B, filter-press reactor 760 replaces the electrochemical cell 710 of FIG. 7A. Filter-press reactor 760 includes housing 770 having intake end 772 and outlet end 774. The filter-press reactor 760 may include multiple layer or cells. FIG. 7C is an exploded view of an individual cell. In FIG. 7C, cell 780 includes Al cathode 782, perforated bipolar aluminum (Al) electrode 784, and BDD anode 786.

FIGS. 3B-7C illustrate various disinfection components that may be used with the wastewater recycling system of FIG. 3A. Although FIGS. 3B-7C illustrate these components as standalone mechanisms, the various components can be combined in whole or in part to meet the disinfection needs of a particular MPP facility. Furthermore, variations on each of these components are possible, and would be understood to be covered by the components explicitly disclosed herein. Finally, other disinfection systems are possibly useable with the wastewater recycling system of FIG. 3A. Moreover, the disinfection components' operations may be adjusted to increase or decrease the degree of disinfection required for specific recycling end uses.

Figure 7D:
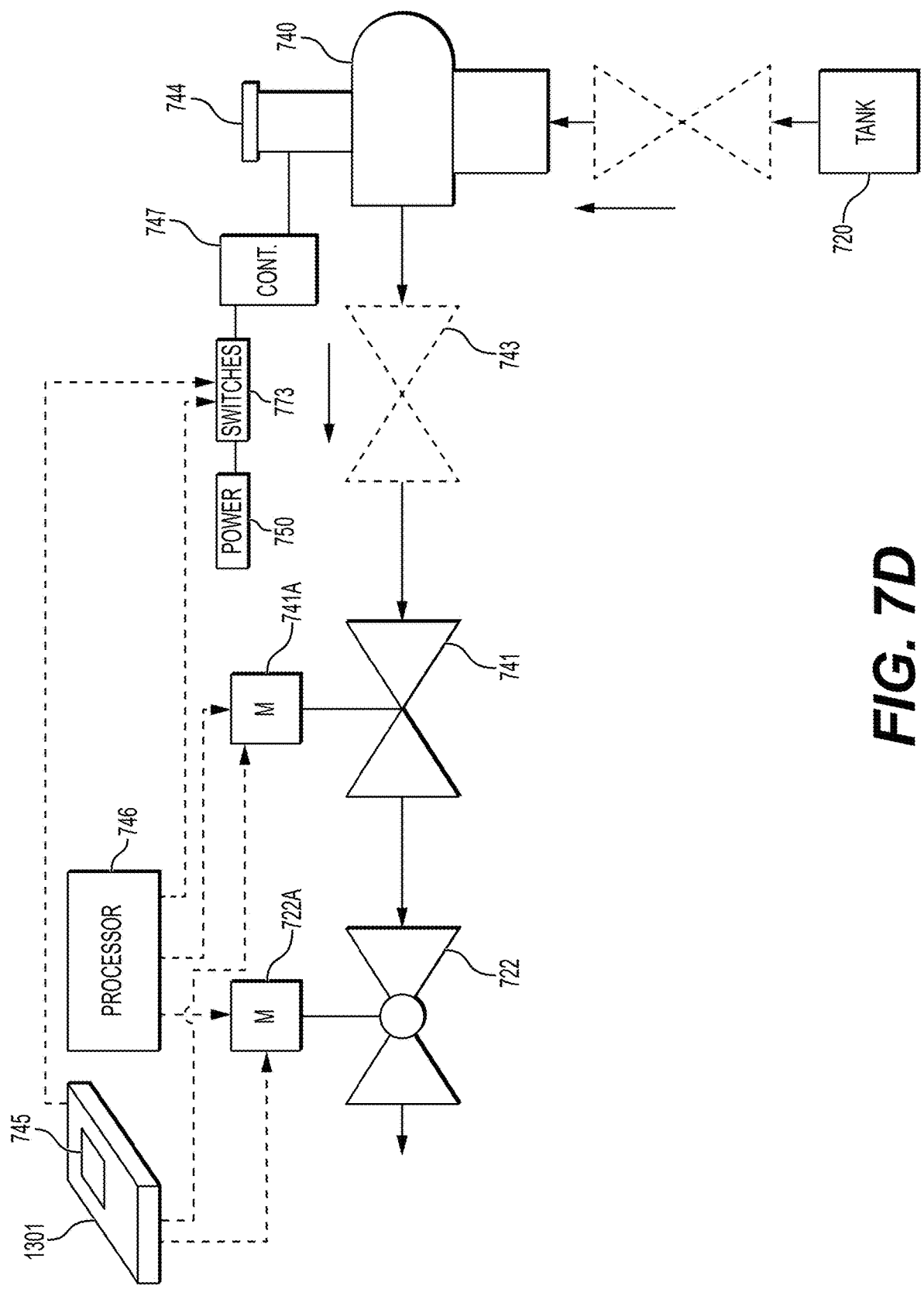

FIG. 7D illustrates an example implementation of processor or computer-based control of one or more components of the systems 100 and 200. In FIG. 7D, the illustrated example implementation pertains to the electro-chemical disinfection (ECD) component 700 of FIG. 7A. As illustrated, a fluid path from tank 720 to electro-chemical cell 710 includes centrifugal pump 740 powered through pump motor 744, manual isolation valve 743 at the pump discharge, servo-motor 741A operated isolation valve 741, and servo-motor 722A operated throttle valve 722. The pump motor 744, and hence the pump 740, may be started and stopped manually using manually-operated switches 773 connected to electrical power supply 750. However, the pump motor 744 also may be started and stopped under command of a suitable control program 745 executed by or through computing device 1301. Computing device 1301 is an edge computing device; such an edge computing device processes data close to where is the data are generated rather than sending data to a data center or cloud-based processor. Use of this edge computing architecture reduces latency, improves response times, and reduces bandwidth usage by performing computations locally. Implemented in the wastewater recycling system 200, the computing devices process sensor data in real time to make decisions about wastewater treatment operations, which as noted, reduces latency, enhances reliability, and lowers data transmission costs. Alternately, the pump motor 744 and hence the pump 740 may be started and stopped directly though remote operation signals from processor 746. The pump motor 744 may be a variable speed motor, and the speed of pump motor 744, and hence pump 740, also may be controlled through the computing device 1301 or directly by the processor 746. FIG. 7D illustrates in dashed lines, control signal paths from the processor 746 on the one hand, and from the computing device 1301 on the other, to the pump motor controller 747 and to controllers for each of the valves 722 and 741.

Figure 8:
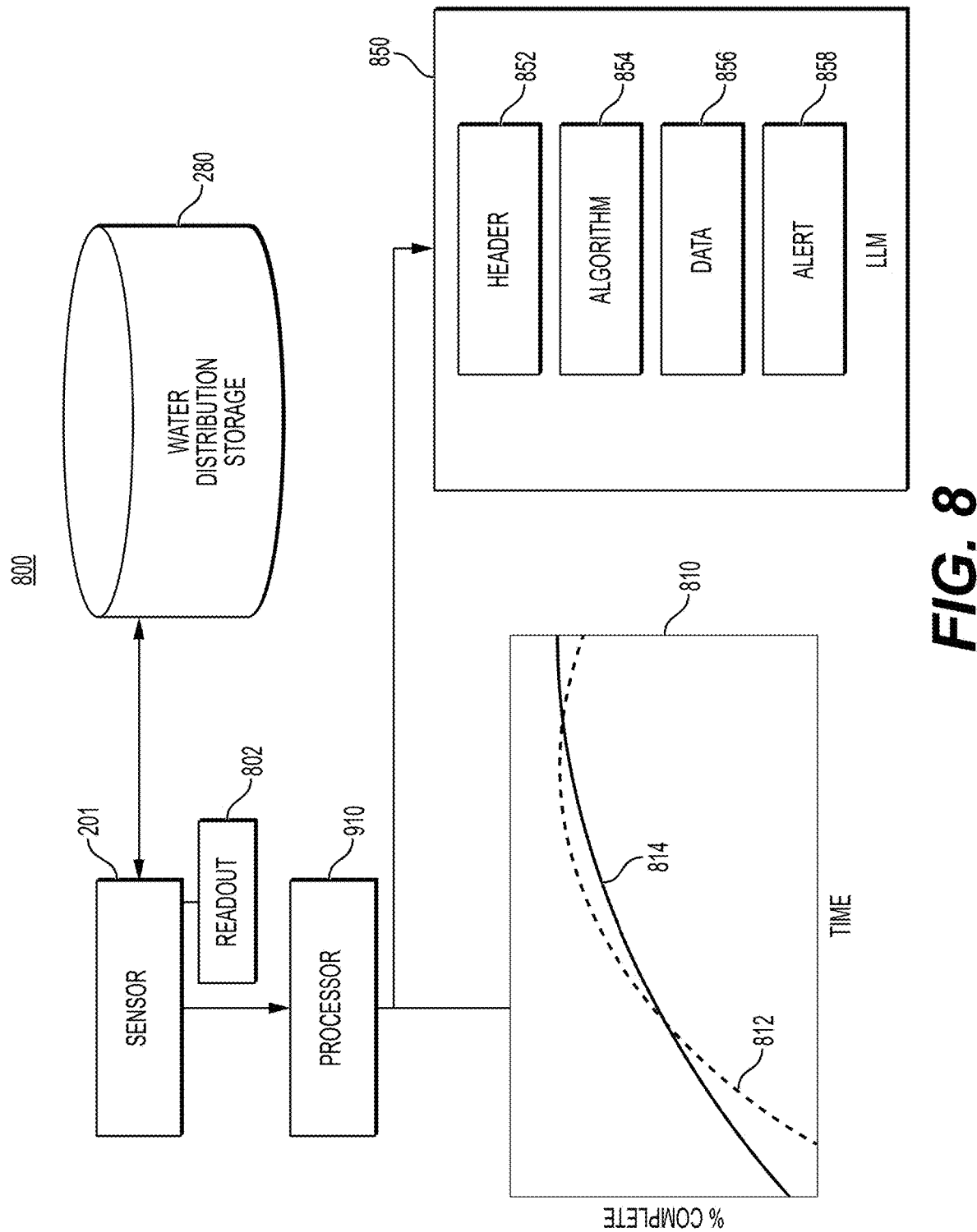
FIG. 8 illustrates an inline sampling and analysis system that may be instantiated in the systems of FIGS. 2A-7D.
Figure 8A:
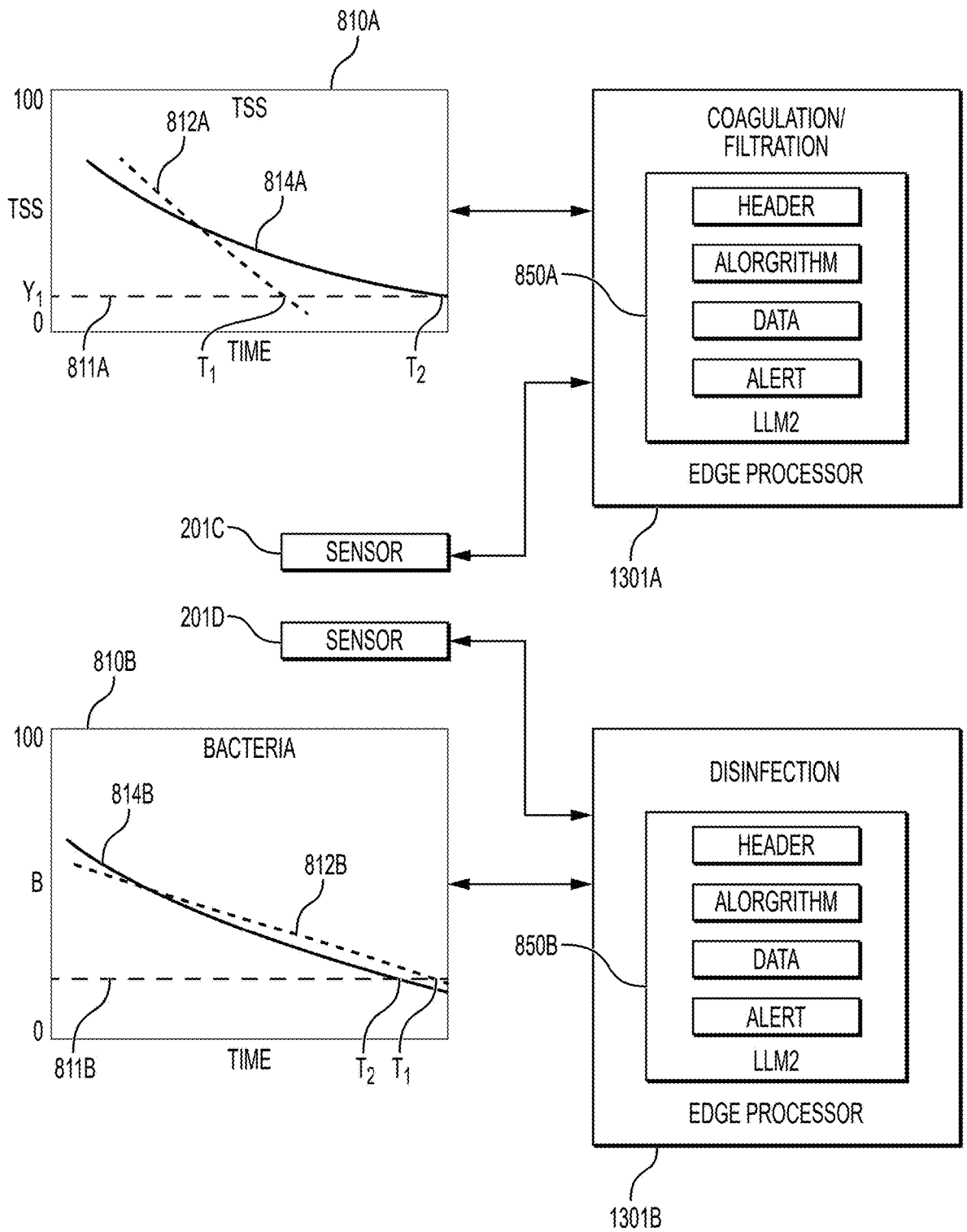
FIG. 8A illustrates an example deployment of a large language model-based control program in the wastewater recycling system of FIG. 3A.
Figure 9:
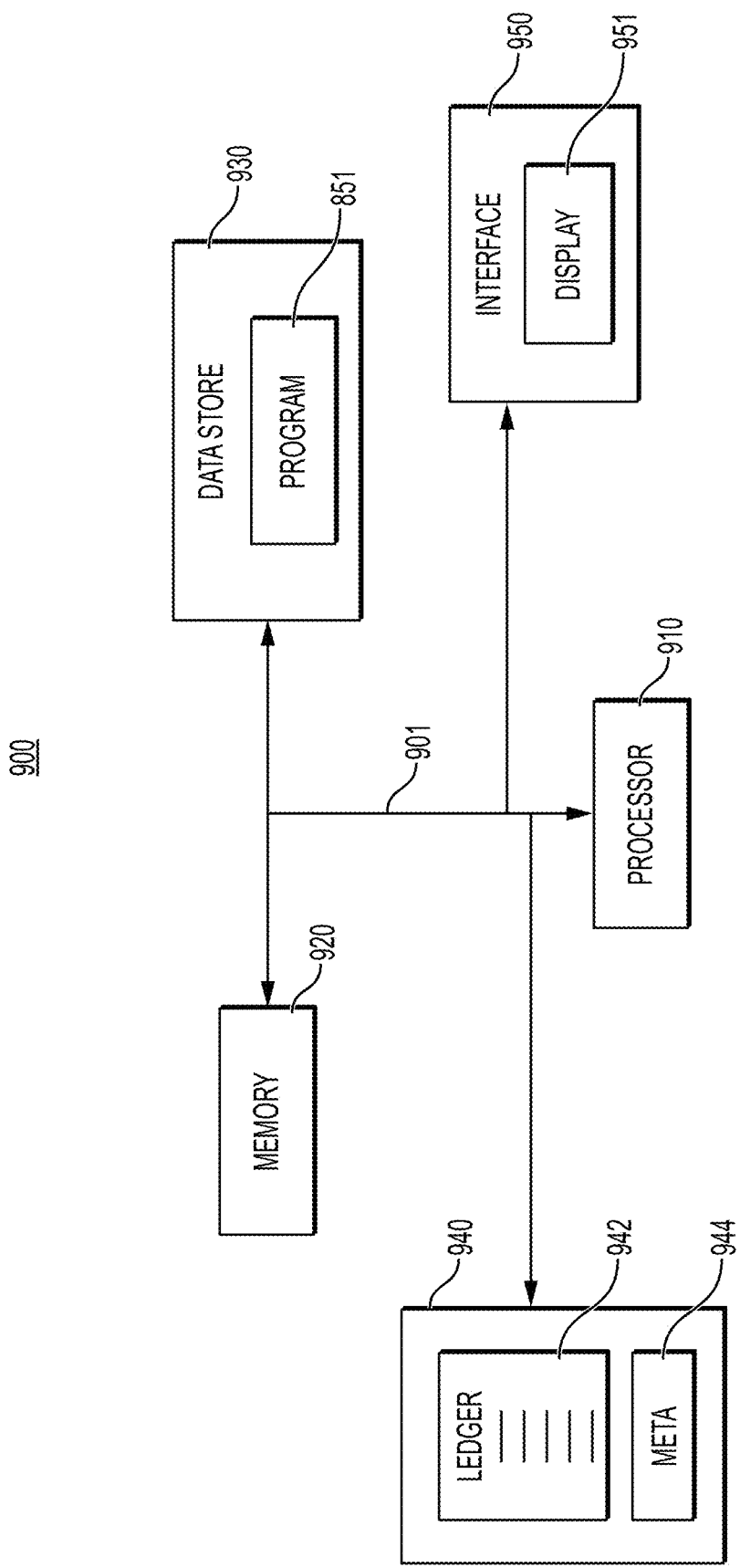
FIG. 9 illustrates an example computer processing system that may be used to control operations of the example wastewater recycling systems of FIGS. 3A-8.

FIGS. 8 and 8A illustrate, respectively, an example sampling an analysis system 800, and a corresponding example component control program 860. FIG. 9 illustrates a processor system 900 that cooperates with the system 800 and the component control program 860 to monitor, and in some aspects control, operations of the wastewater recycling system 200. Central to the systems and control programs are (deterministic programming that provides real-time responses (machine control instructions) when needed, and (2) machine learning models including a large language model (LLM) that provides prompted responses or suggestions that ultimately may be invoked as machine control instructions. However, use of LLMs is most appropriate in situations in which trends in system performance may be sensed, analyzed, and evaluated (in some aspects, according to preset rules) as a preliminary step to generating a query (or prompt) for application to the LLM. In summary, the herein disclosed control program 860 may be best suited to taking deterministic actions, such as stopping a rotating machine. When monitored data from operation of the system 200 shows a "drift" or "slow divergence" from historical norms for system operation, a prompted LLM may be useful for recommending machine control actions. As noted herein, the control program 860 may generate an appropriately formatted query for application to the LLM. The LLM may be instantiated on either a central processor system or one or more local processor units, or both the central processor system and one or more local control units.

In an aspect, the processor system of FIG. 9 includes a large language model (LLM) that may be executed to optimize wastewater treatment and recycling of the wastewater recycling system 200. The LLM is able to process and analyze data, and moreover, may be combined with specialized industrial control systems and machine learning models for direct operational control and optimization of the wastewater recycling system through: (1) Interpretation and reporting in which the LLM helps operators interpret sensor data, generate summaries, and create actionable reports based on daily operations; execution of the LLM may identify patterns in performance data or flag unusual readings. (2) Preventive maintenance in which the LLM is combined with other machine learning models to analyze historical sensor data, and LLM generate insights as to when certain equipment might need maintenance, thereby helping reduce downtime and increasing operational efficiency. (3) Process optimization in which the LLM is executed to analyze data and process documents, through which the LLM may provide suggested operational adjustments. For example, the LLM may recommend adjusting chemical inputs, aeration levels, or sludge recycling rates to improve overall system efficiency based on past data or industry standards. (4) Decision support and training in which the LLM executes to assist plant operators by offering step-by-step guidance for complex procedures or emergencies. The LLM also may be used to create training materials and simulate various scenarios for training purposes. (5) Real-Time communication in which the LLM provides an interface between operators and the wastewater recycling system, responding to queries using a natural language processor. (5) Documentation and compliance in which the LLM generates and manages compliance documentation, helping ensure that wastewater recycling operations are documented and comply with environmental regulations. For autonomous or semi-autonomous operation of the wastewater recycling system, the LLM may be executed in conjunction with specialized process control algorithms or other models that support time-sensitive decisions based on real-time sensor data and that respond to the physical variables of the wastewater recycling system.

FIG. 8 illustrates an example sampling and analysis system useable by the waste processing system 100 of FIGS. 2A and 2B and the recycling system 200 of FIGS. 3A-7D. In FIG. 8, sampling and analysis system 800 includes a sensor 201 coupled to a component of the recycling system 200. For example, the sensor 201 could be coupled to the water distribution/storage component 280 The sensor 201 is coupled to readout 802 and may provide a visual or audible display through the readout 802. The sensor 201 provides sensed parameter values to processor 910 (see FIG. 9). The processor 910 is configured to compare (see graph 810) sensed parameter values to expected parameter values and optionally to apply that data to a large language model, LLM 850.

The LLM 850 is an example implementation of a large language model in the recycling system 200 of FIG. 3A, and is executed to control operation of specific system components. In an aspect, the LLM 850, at least after a period of unsupervised training (if implemented) may be "walled off" from data sources outside the recycling system 200. To obtain data from external sources that may be relevant to operation of the recycling system 200, the recycling system 200 may include a data intake module that receives and filters incoming data, whether the data are streaming or received in batch modes. FIG. 9 illustrates such a data intake module (i.e., module 950).

As noted above, direct control of physical processes requires models that can handle real-time data and dynamic system behaviors. The LLM 850 may execute to analyze textual, numerical, graphical, and image data from sensors and logs, summarize wastewater recycling system performance, and identify potential issues. In an aspect, the LLM may issue alerts to, or otherwise or flag, anomalies in system behavior. The LLM 850 processes historical data and operational guidelines, and may make recommendations for process adjustments, maintenance schedules, or emergency responses. The LLM 850 includes a natural (e.g., human) language interface or processor and may "converse" with system operators, including responding to operator natural language queries. The natural language interface may include a voice recognition/translation function allowing operators to speak to the LLM 850 and to receive back oral and "text" responses. The LLM 850 cooperates with other machine learning models that may be incorporated into the processor system 900 shown in FIG. 9. Some of these other machine learning models may forecast recycling system behaviors, such as influent load variations or equipment failures, enabling proactive (i.e., anticipatory) adjustments and preventive maintenance. Other machine learning models may be used to manage complex, time-varying processes in wastewater treatment operations.

Figure 11:
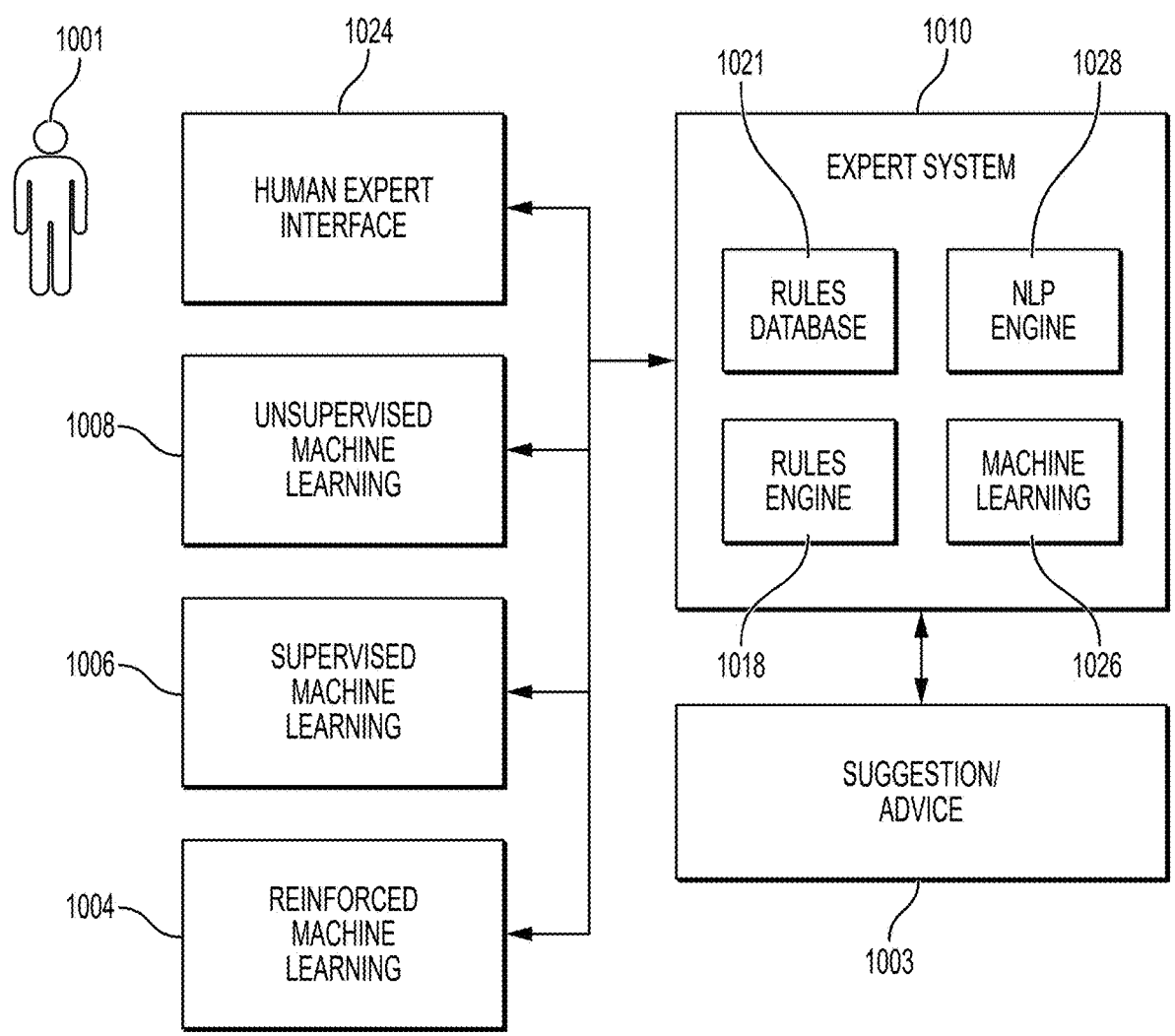
FIG. 11 illustrates aspects of an example large language model that may be trained and executed using the example computer processing system of FIG. 9.

In FIG. 8, and with reference to FIGS. 9 and 11, LLM 850, which has been trained using the system 1000 of FIG. 11 and its components, is seen, conceptually, to access a block header of the distributed ledger 942 of FIG. 9. LLM 850 also may access alert module 858, which may be implemented as an algorithm 854 (e.g., a smart contract) such that when certain event data 856 stored as a result of the sensor readout operation dictates, the algorithm 854 is executed by processor 910 to provide visual and/or audible indications of a potential problem with, or otherwise, a current status of, the waste processing operation. In FIG. 8, events/data (represented generally as computed progress curve 812) (e.g., progress curves of sensor readouts for pH, total dissolved solids, bacteria count, temperature, oxygen content, viscosity, and/or any parameter indicative of the operation of the recycling system 200 and progress, or percentage completion of the operation) may cause a code snippet or algorithm 854 to be executed by the processor 910, to compare the computed progress curve 812 to expected value curve 814 as an indication of the rate of reaction/reaction progress toward completion of the overall wastewater recycling operation, or some segment of the overall operation. In FIG. 8, this comparison is provided for illustration purposes as graph 810 with computed progress curve 812 (i.e., events/data) and expected value curve 814. The graph 810 may be displayed visually to operational personnel monitoring wastewater recycling operations. The LLM 850 causes retention of the data from which actual, or computed value curve 812 is formed. If the algorithm 854 indicates a sufficient divergence between the computed value curve 812 and the expected value curve 814, the algorithm 854 may execute to provide an alert, which may be stored in a block of immutable ledger 942 (FIG. 9) referenced by header 852, and which may be used to notify operational personnel as to the condition of the recycling system 200. The algorithm 854 also may signal and store data in the immutable ledger 942 when the wastewater recycling operation reaches a defined endpoint. The stored data of operation completion may include a unique batch identifier or serial number. The unique batch identifier or serial number may be used as part of the organization's environmental records, and may be associated with a batch of potable water produced by operation of the recycling system 200 of FIG. 3A. Either automatically as part of algorithm 854 or another algorithm, or manually under control of operational personnel, a potential block of the immutable ledger 942 may be validated, multicast to selected entities, and added to the immutable ledger 942, eventually making the added block immutable.

FIG. 8A illustrates an example deployment of a large language model in the wastewater recycling system 200 of FIG. 3A. In FIG. 8A, edge processor (see example architecture in FIG. 17C) 1301A is associated with both coagulation component 210 and filter component 240, and edge processor 1301B is associated with disinfection component 260. One goal of the coagulation process and the filter process is to reduce total suspended solids (TSS) to a level that is consistent with potable water standards, that is, either less than the TSS level, or low enough that any residual suspended solids remaining in the wastewater stream 131 may be removed by other components of the system 200. Thus, the edge processor 1301A receives inputs from sensors 201B and 201C of FIG. 3A. In FIG. 8A, considering, for ease of illustration only sensor 201C as providing a controlling signal to edge processor 1301A, and referring to display 810A, line 811A represents the maximum allowable TSS value, and line 814A represents an ideal or historical curve of TSS reduction (ending at time T2) by the combined coagulation component 210 and the filter component 240. Line 812A represents the actual TSS value from the start of coagulation, and proceeds at least until the limit of line 811A is reached. Assuming the TSS value at the output of the coagulation component 210 is represented by the left-most point of line 812A, the edge processor 1301A might compute that, unless some change is made to the current TSS removal operation, the final TSS value will exceed the limit represented by line 811A. Accordingly, the edge processor 1301A may employ LLM 850A (i.e., LLM2) to recommend actions to be taken within the limits of the system 200, and more specifically, the filter component 240, to achieve the required TSS level. To employ the LLM 850A, the edge processor 1301A executes a control program to generate a query and then to apply the query to the LLM 850A. In return, the LLM 850 responds with suggested corrective action. For example, the LLM 850 might suggest multiple passes through a portion of the filter media of filter component 240, or switching from parallel flow to series flow, The edge processor 1301A then validates the suggestion and provides instructions to the filter component 240 to comply with the validate suggestion. The process of generating queries and validating suggestions is disclosed in more detail with respect to FIG. 11A.

Figure 17A:
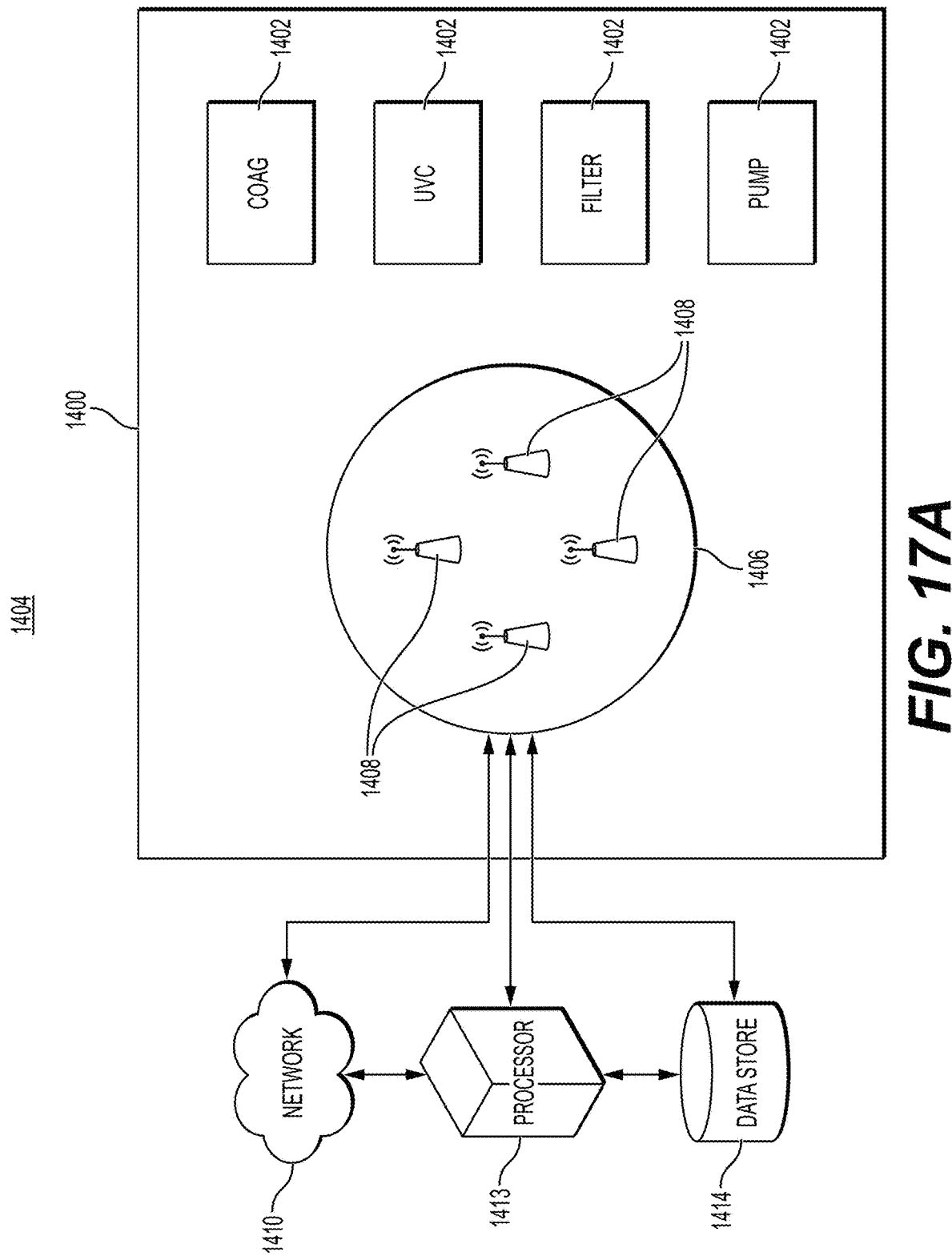
FIGS. 17A-17C illustrate example information and control systems.
Figure 17B:
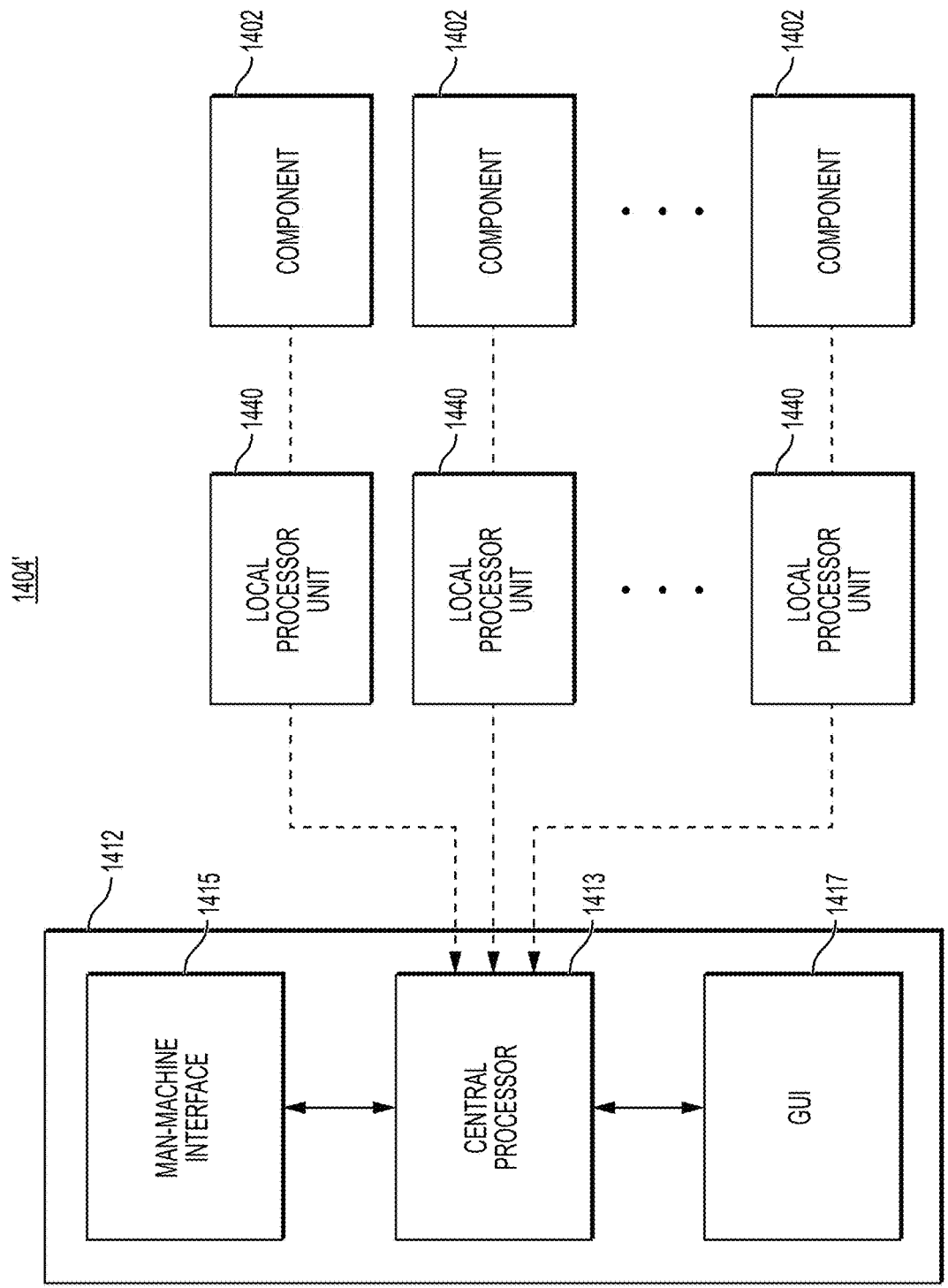

FIG. 8A also illustrates execution of a processing routine by disinfection edge processor 1301B (i.e., a local processor unit as shown in FIG. 17B). Edge processor 1301B receives sensor readings from sensor 201D, the sensor readings indicating a concentration of bacteria in the wastewater. Graph 810B display bacteria concentration on a scale of 0 to 100 with a maxim allowable concentration represented by line 811B. Curve 814B represents a latest expected bacteria concentration decrease from operation of disinfection component 260 (FIG. 3A), which results in bacteria concentration below the allowable limit at time T2. Curve 812B represents the current bacteria concentration with a projected traversal of the limit of line 811B at time T1. In order to achieve at least the same performance as historical disinfection operations, the edge processor 1301B may employ LLM 850B to provide a recommendation or suggestion for altering an on-going operation of the disinfection component 260 in a manner similar to that employed by edge processor 1301A, namely generate a query to apply to the LLM 850A, receive a response to the query, validate the response, format the validate response to apply to a control program for the disinfection component 260, and apply the formatted response to elements of the disinfection component 260. As an example, and in response to a properly formatter prompt, the LLM 850B may recommend or suggest changing the UV wavelength UV-C disinfection component 400 of FIG. 4A. Note that the edge processor 1301B may execute a recommendation to change operating frequency automatically; however, the edge processor 1301B may be constrained from automatic execution of certain recommendations such as when the recommendations involve a change beyond a specified or pre-programmed amount. As a further example, the edge processor 1301B may be constrained from changing UV-C frequency in more than a pre-programmed step. In another aspect, the LLM 850B may be constrained from offering recommendations that, for example, exceed the safe operating parameters of a disinfection component or other component, or that exceed the capability of the component.

The system 100 of FIGS. 2A and 2B, as well as the wastewater recycling system 200 of FIGS. 3A-3F, the disinfection components of FIGS. 4A-7D, and the system 800 of FIG. 8, may be controlled using different mechanical, electrical, and computer (processor) options. A mostly remote operation may be made possible using properly and specially programmed processors. FIG. 9 illustrates a processor system that allows partial and/or essentially fully remote operation of the recycling system 200 as well as fully remote operation of the disinfection components of FIGS. 4A-7D from a central platform or through a network of edge computing devices such as shown in FIG. 8A. In FIG. 9, processor system 900 includes one or more processors 910, memory 920, data store 930, which is, or which includes, non-transitory, computer-readable storage media having encoded thereon a control program 851 for controlling operation of the recycling system 200. Also shown in FIG. 9 is distributed ledger system 940 implementing immutable ledger (e.g., a blockchain) 942. Individual entries in the immutable ledger 942 may reference metadata 944 associated with the entries. Certain entries in the immutable ledger 942 may employ smart contracts, or similar programming. The smart contracts may include programming that is executable to operate components of the recycling system 200 and to receive and store data from operation of the recycling system 200. The smart contracts, in conjunction with other data obtained during operation of the recycling system 200, may be used to guarantee the provenance and quality of potable water produced by the recycling system 200. In an aspect, the control program 851 may include a large language model (e.g., LLM 850) that learns the operational requirements of the recycling system 200 and is used to automate or partially automate system operation. Data intake and interface module 950 provides a machine-machine and a man-machine interface to allow experts and operators to interact with the recycling system 200, to receive (including over display 951) data and information related to system operation, to train the large language model (LLM 850), and to take manual or semi-automatic control of the recycling system 200. The components of the processor system 900 communicate over information and data bus 901. The processor 910 may communicate with the recycling system 200 using wired or wireless communications.

As noted above, the control program 851 is LLM-based. In an aspect, the control program 851, rather than the LLM itself, generates the queries needed to implement the LLM. These queries, which may be referred to as prompts, are code snippets (i.e., machine instructions) that may be generated based on a variety of factors including the relevant context or operation state of the wastewater recycling system 200 and/or its individual components. Note that generating the queries includes extracting and formatting sensor data. That is, the control program 851 may include a sensor interface layer that collects and preprocesses data (e.g., normalizing, scaling, and validity checking the data). The control program 851, or a separate sensor signal processor (see FIG. 17C) may "condition" data received from a sensor so that other aspects of the control program 851 may use the conditioned data to generate a query. The separate sensor signal processor or the control program 851 also may perform analog-digital conversion, or a similar operation, on the received sensor data. The control program 851 then invokes a context builder (query or prompt generation module) that assembles recent sensor readings (as converted, system state (e.g., last control action), and operational goals or constraints (e.g., "minimize TSS, keep bacterial count below XX"). Finally, the control program 851 formats the query as natural language or structured JSON/text.

With a query so generated, the control program 851 sends the query to the LLM (e.g., LLM 850), which returns a response to the control program 851. The control program parses the LLM response, converts the parsed LLM response into machine-executable control actions, and applies the control actions to appropriate components of the wastewater recycling system 200. In an example, a processor may apply the control actions to actuators associated with coagulant component 210 of FIG. 3B, with the control actions causing the actuators to add a specified amount of flocculants to the coagulant component 210.

Figure 16:
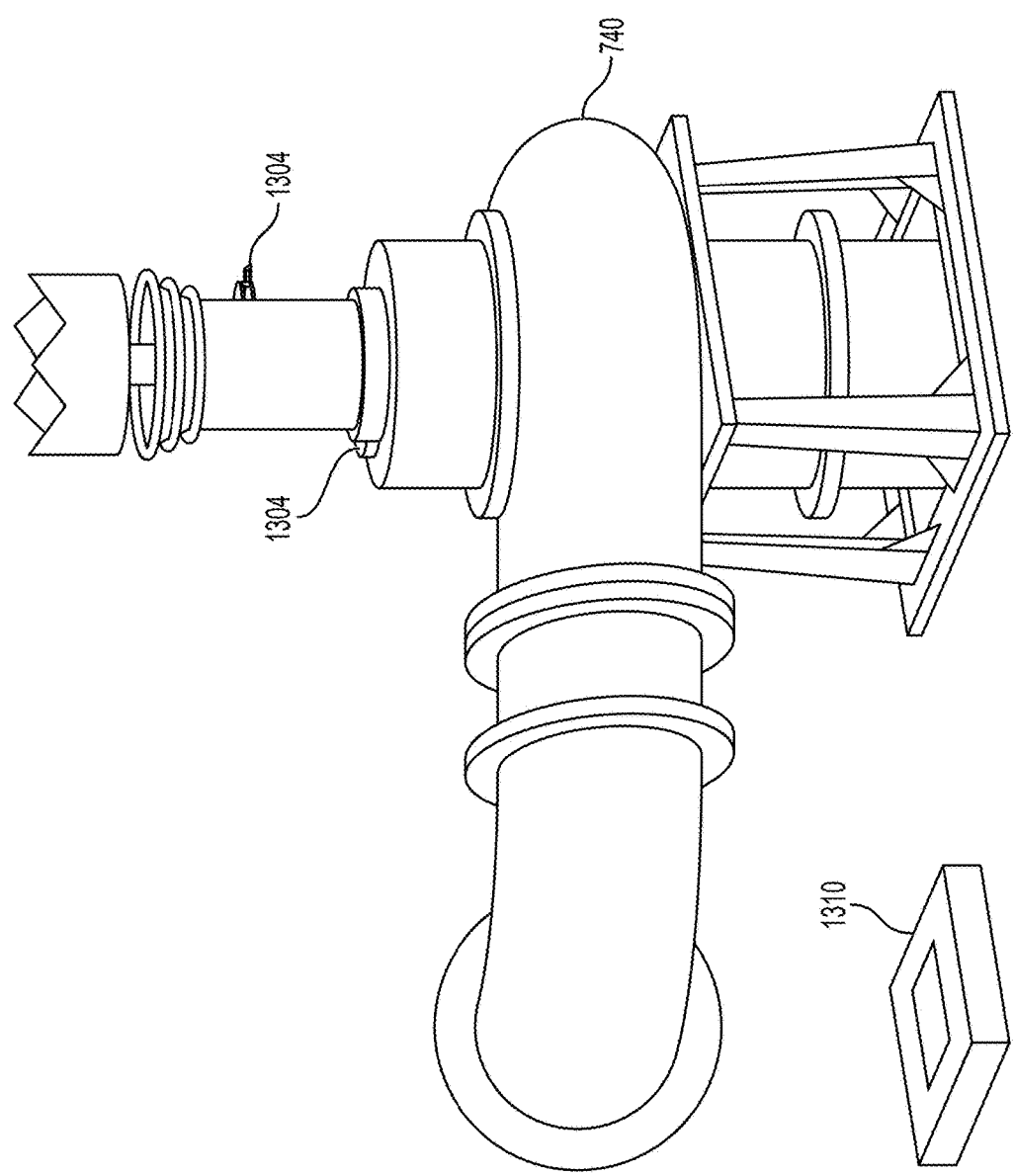
FIG. 16 illustrates an example rotating machine configured with sensors to monitor and report machine operation.

In an aspect, the control program 851 may implement hard limits, either in the query generation process, or post query generation but before query application so that the LLM 850 cannot trigger unsafe states such as a rotational speed beyond name plate data or a safety limit for rotating equipment such as pump 740 of FIG. 16. The above-described LLM implementation means the LLM acts as a reasoning core, not a full controller, and the control program 851 acts as a control agent, thereby limiting potentially damaging actions that could occur using the LLM as a control agent.

Figure 10:
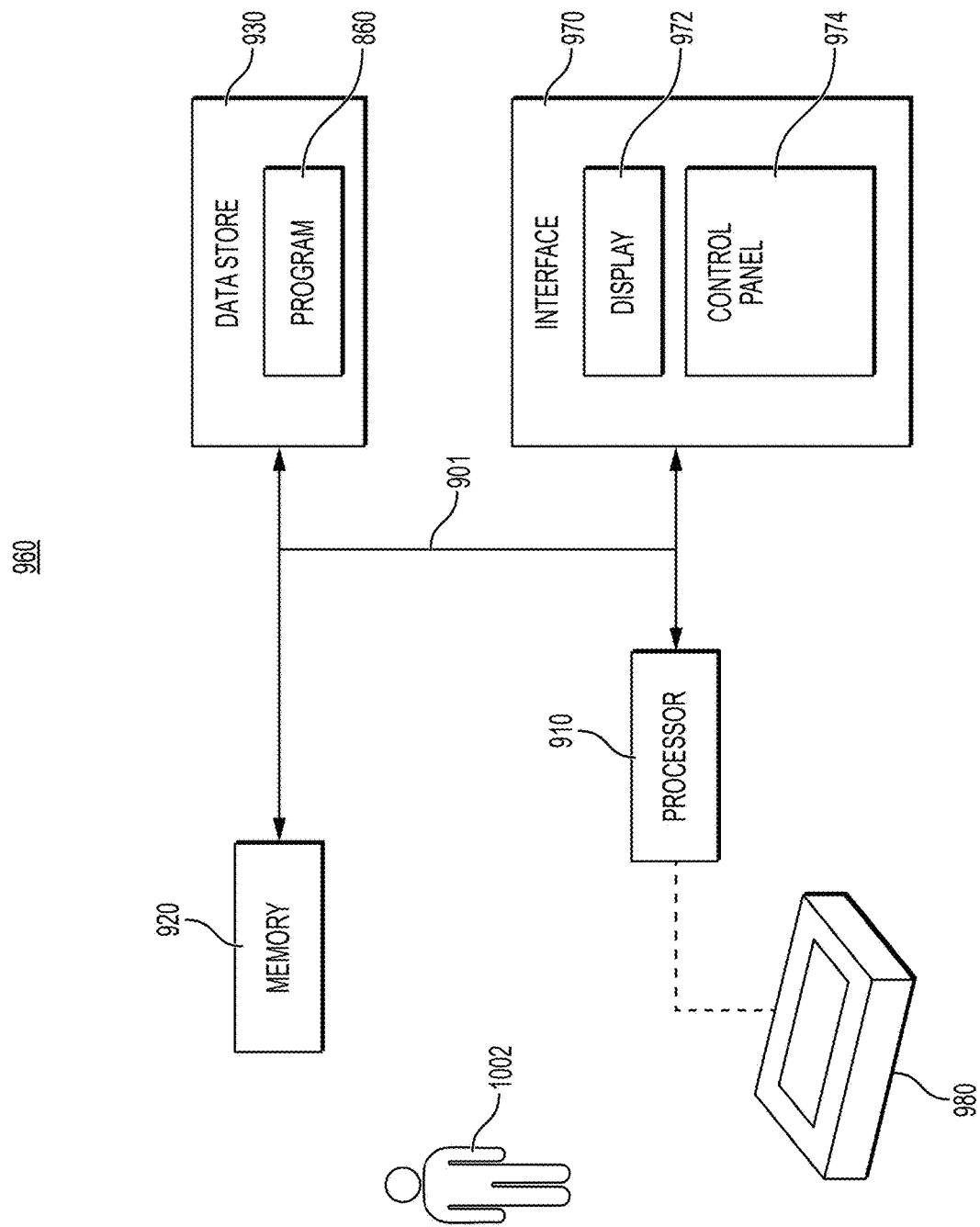
FIG. 10 illustrates an alternate control system that may be used to control operations of the of the example wastewater recycling system of FIGS. 3A-8.

As an alternative to the control system of FIG. 9, FIG. 10 illustrates another processing and control system for the recycling system 200. In FIG. 10, system 960 includes processor 910 in communication with memory 920, data store 930, and interface 970. Data store 930 includes control program 860, stored on a non-transitory, computer-readable storage medium as machine executable code. Interface 970 includes display 972 and control panel 974 (which may be a "soft key" panel). An operator 1002 may control operation of the recycling system 200 through activation of various soft keys on control panel 974. For example, operator 1002 may start and stop machines, control machine operation (e.g., adjust rpm), operate solenoid operated valves, and conduct operations. The control program 860 (see FIG. 8), in addition to communicating between panel 974 and the recycling system 200, may activate automatic controls in certain situations. Finally, operator 1002 may use portable computing device 980 to control operations of select components of the wastewater recycling system 200, to receive signals from components of the wastewater system 200, and to interact with the LLM 850 (FIG. 8) and other artificial intelligence mechanisms implemented in the wastewater recycling system 200. Use of portable computing devices such as device 980 is disclosed elsewhere herein, including with respect to FIGS. 17A-18.

FIG. 11 illustrates examples of components that interact with, train, and receive alerts from the large language model 850 of FIG. 8. In FIG. 11, system 1000 utilizes a human expert interface 1024 (e.g., a graphical user interface (GUI)). A human expert 1001 may operate and receive information through the human expert interface 1024. The human expert interface 1024 may be operated to implement various actions, including operating a natural language processor (NLP), which is part of NLP engine 1028. System 1000 includes an unsupervised machine-learning module 1008. The unsupervised machine-learning module 1008 that may be used to allow the NLP engine 1028 and the large language model to learn new words/phrases; learn new machine data and sensor data patterns; etc. System 1000 includes supervised machine-learning module 1006. The supervised machine-learning module 1006 may refine words/phrases, implement NLP models, etc. System 1000 includes reinforcement machine-learning module 1004. The reinforcement machine-learning module 1004 may refine words/phrases, implement NLP models, and determine claim patterns, for example.

Large language model components of system 1000 also include expert system 1010. Expert system 1010 may be used to initially train, and then re-train, the large language model. Expert system 1010 includes NLP engine 1028, rules database 1021, rules engine 1018, and machine learning engine 1026. Finally, the expert system 1010, using, for example, the NLP engine 1028, may generate suggestions and alerts 1003 related to operation of the wastewater recycling system 200 of FIG. 3A.

FIG. 11A illustrates an example code sequence executable by a processor of the example wastewater recycling system 200 to generate a query answerable by the large language model 850A of FIG. 8A. In FIG. 11A, code sequence 1003A includes a query directing the LLM 850A to recommend control actions (e.g., add flocculant) for the coagulation component 210 of FIGS. 3B and 3C to reduce total suspended solids (TSS) to less than 10 mg/L. The processor 910, or alternatively a local processor unit 880i, then applies the code sequence 1003A to the LLM 850A to generate either a control action to alter operation of the coagulant component 210 or advice or alerts to a human operator 1002 (see FIG. 11) as to the action to be taken to achieve the desired TSS value. In an aspect, the control system 1000 may maintain a library of queries or prompts to be called by a central processor or local processors and applied by these processors to LLM 850A. Furthermore, the control system 1000 may generate new queries or prompts as circumstances demand and may revise existing queries or prompts when necessary.

Figure 12:
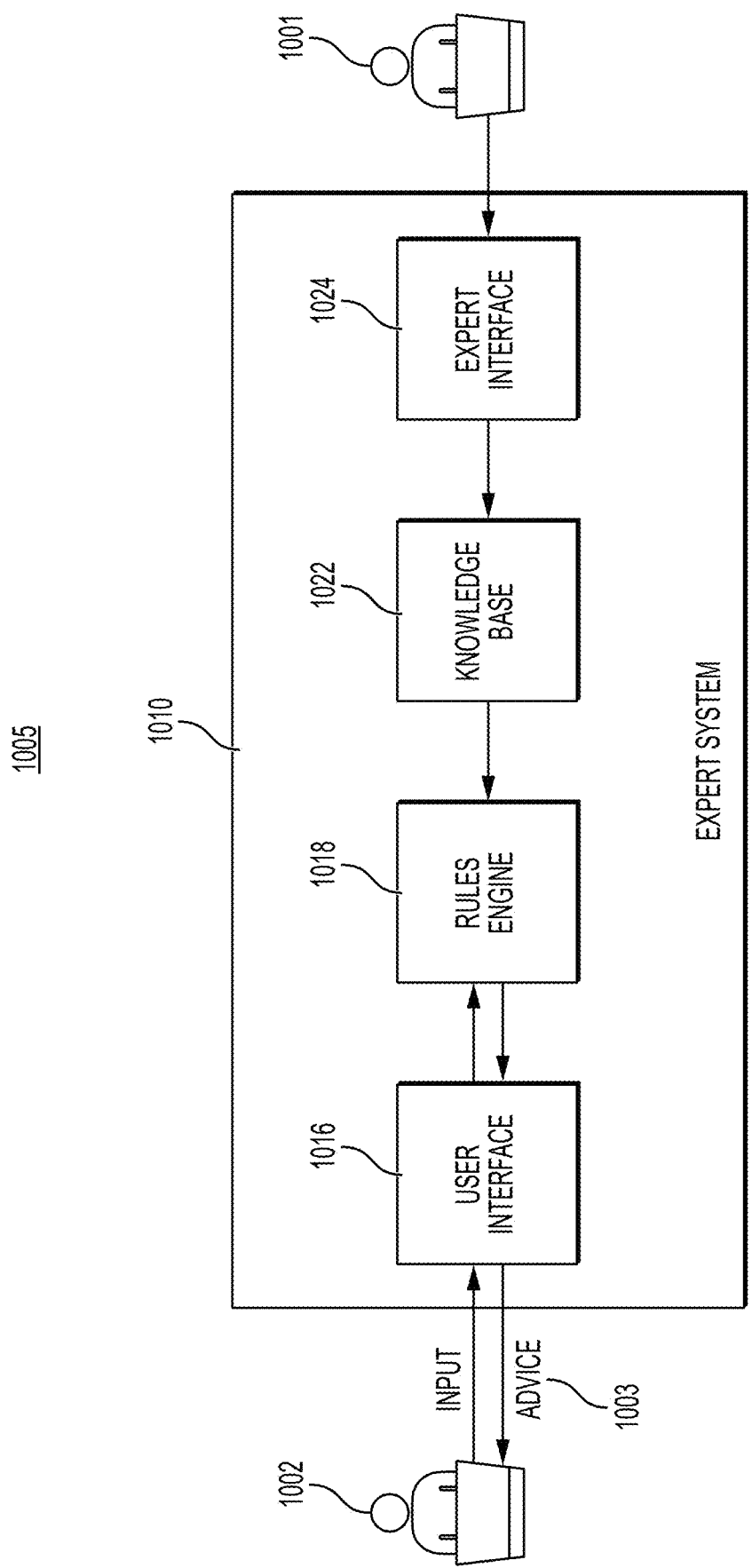
FIG. 12 illustrates an example chart showing transmission of expert information through an expert interface to a user.

FIG. 12 presents an example chart 1005 illustrating transmission of expert information through expert interface 1024 to operator 1002 by way of user interface 1016. As can be seen in FIG. 12, an expert 1001 interacts with expert system 1010 using expert interface 1024. As an example, expert 1001 may use expert interface 1024 to annotate, comment on, correct, or add insights to components of knowledge base 1022. In this example, the expert 1001 may comment on anomalous readings or data the expert 1001 detects during a most recent operation of the MPP wastewater recycling system 200 of FIG. 3A, where the most recent operation is recorded in the knowledge base 1022. The expert system 1010, and particularly the NLP engine 1028 and machine learning engine 1026 may apply the comments, according to rules engine 1018, to indicate to the operator 1002, through user interface 1016, a need or suggestion to modify an operational aspect of the system 200 in a future operation. For example, the expert system 1010 may interpret or analyze expert-provided comments directed to the difficulty or the inability of the system 200 to achieve desired or required levels of microbiologic activity as an indication that components of the disinfection component 260 should be operated in series rather than in parallel, even though parallel operations result in higher throughput. Alternatively, the expert system 1010 could interpret or analyze the same expert-provided comments as suggesting the microbial sensors (e.g., sensor 201D) require maintenance or replacement or that sampling frequency and subsequent analysis should be increased in order to more expeditiously detect trends.

Figure 13:
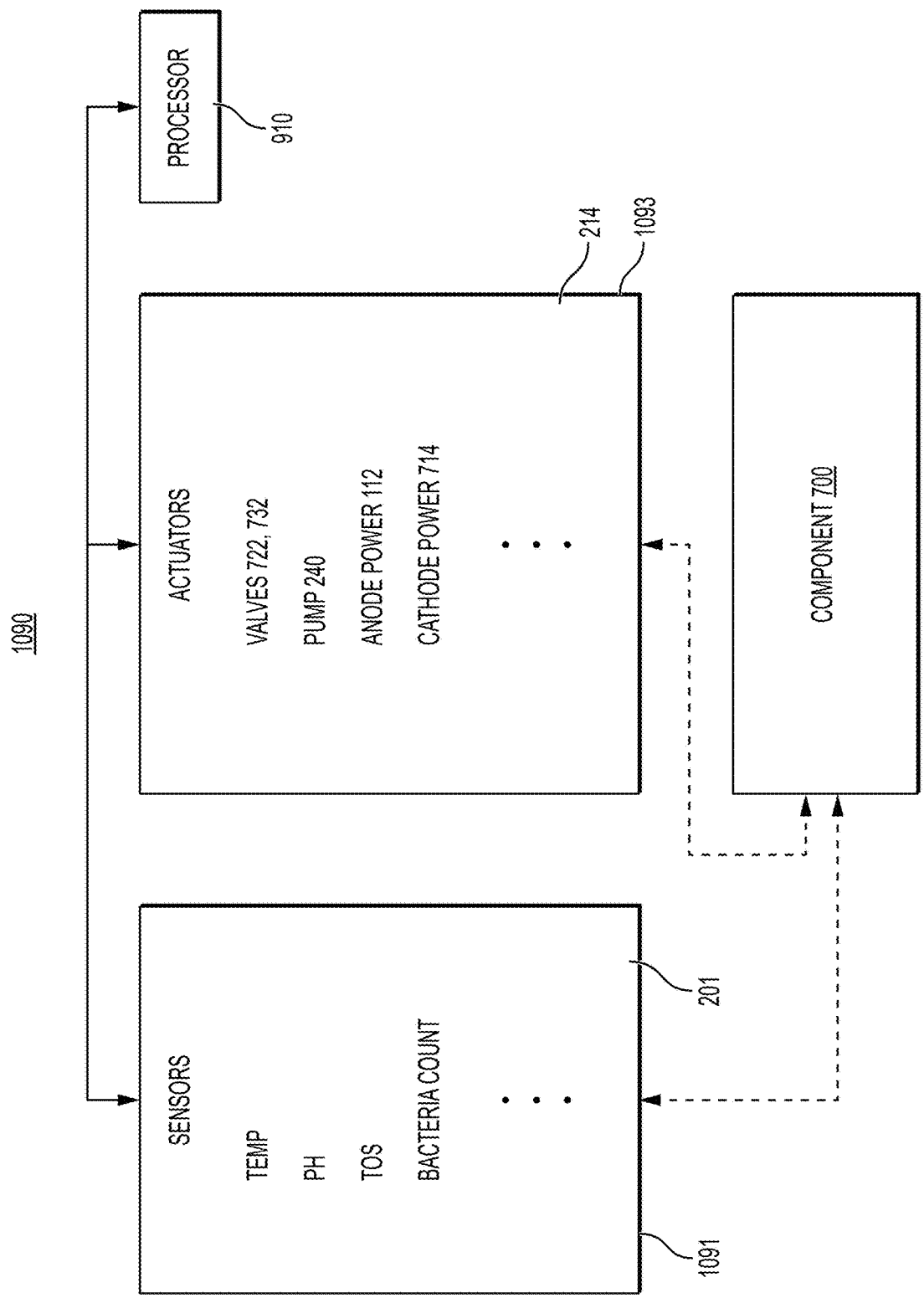
FIG. 13 illustrates an example actuator/sensor system and corresponding components operable in the wastewater recycling systems of FIGS. 3A-9.

FIG. 13 illustrates an example actuator/sensor system that may be employed with the systems of FIG. 3A-7D. In FIG. 13, actuator/sensor system 1090 includes actuator subsystem 1093 including actuators 214, and sensor subsystem 1091, including sensors 201. Actuators 214 may include solenoid operators for isolation or diversion valves, switches for operating servo-motor isolation (gate) valves and throttle (globe) valves, switches for operating heaters, mixers, aerators, conveyors or other material supply devices, augers, screens and strainers, and other components. The sensors 201 may include sensors for monitoring fluid temperature, pH, clarity, TSS, bacteriological count, and other fluid characteristics of relevance to operation of the recycling system 200. The actuator/sensor system 1090 may include components for remote, automated sampling of wastewater streams 131. Such sampling components may include inline pH meters, turbidity monitors, and other sampling components.

Figure 14:
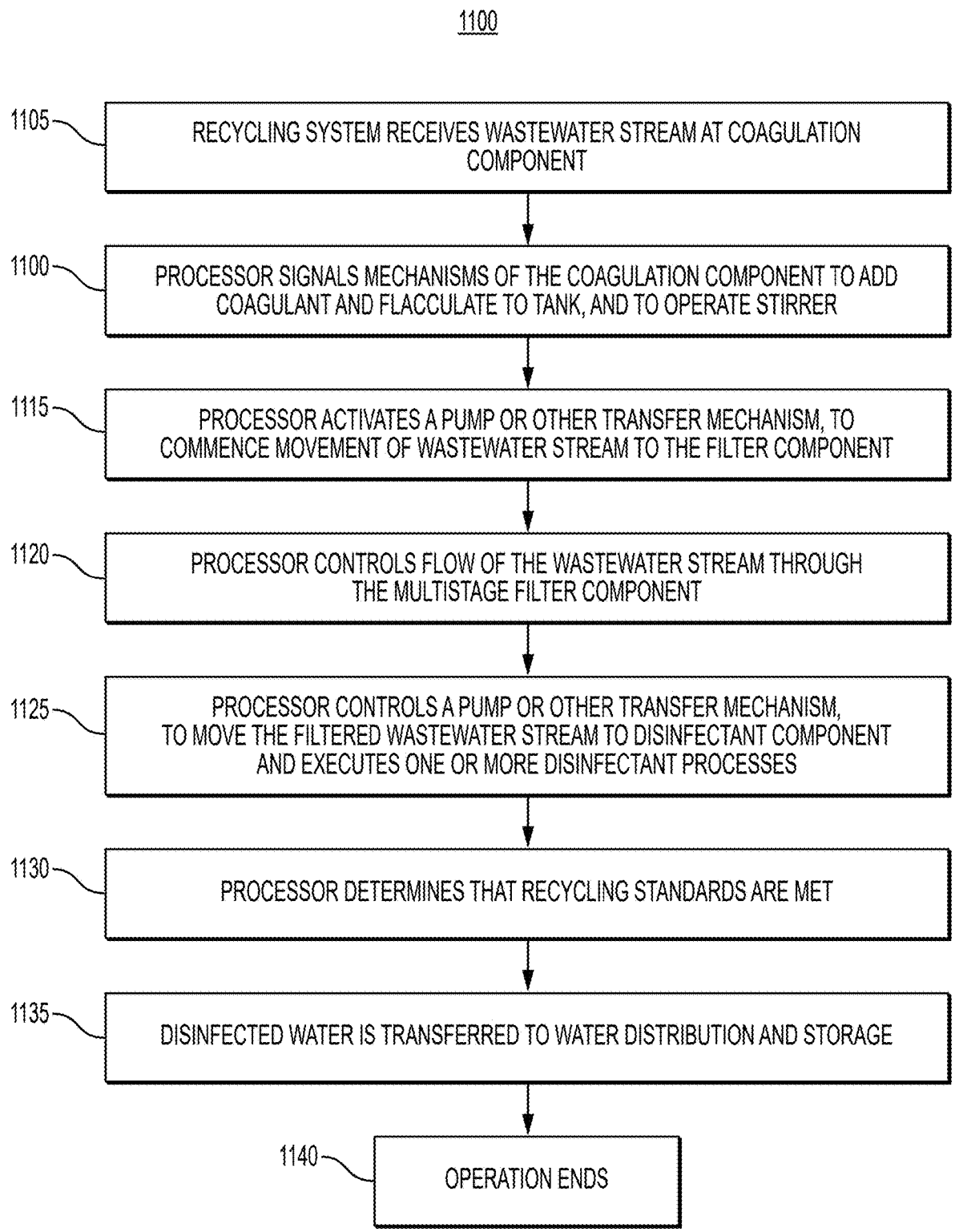
FIGS. 14 and 15 are flowcharts illustrating example operations of the example wastewater recycling systems and components of FIGS. 3A-13.

FIG. 14 is a flow chart illustrating an example operation of the recycling system 200 of FIG. 3A. In FIG. 14, operation 1100 begins at block 1105 with the recycling system 200 receiving at coagulation component 210, the wastewater stream 131, which may contain some amount of residual solids, including small fines in suspension. Such small fines may not be sufficiently dense as to precipitate out of the wastewater contained in the tank 211 of coagulation component 210. At block 1110, processor 910 signals mechanisms of the coagulation component to add coagulant and flocculate to the tank 211, and to operate stirrer 215. These additions and stirring operations may continue until, based on sensor readings, the solids in the wastewater stream 131 have been removed sufficiently. Alternately, under control of the LLM 850, the operation of block 1110 may continue for a time determined by application of the LLM 850. Following block 1110, operation 1100 moves to block 1115, and the processor 910 activates a pump or other transfer mechanism, to commence movement of wastewater stream 131 to the filter component 240. In block 1120, the processor 910 controls flow of the wastewater stream 131 through the multistage filter component 240. For example, the processor 910 may control flow through more or fewer stages of the filter component 240 based on sensed parameter values at the outlet of the coagulation component 210. Alternately, or in addition, the processor 910 may control flow to pass through coarser or finer filters based on the sensed parameter values. Flow control may be based on application of the LLM 850 using learned behavior that optimizes particle filtration. Following the filtering operation, operation 1100 moves to block 1125, and the processor 910 controls a pump (not shown) or other transfer mechanism, to move the filtered wastewater stream 131 to the disinfection component 260. In block 1125, the processor 910, executes the LLM 850 to complete one or more disinfection processes (i.e., more than one disinfection technology, or multiple stages of the same disinfection technology) depending on the sensed parameter values in the filtered wastewater stream 131 at the initiation of disinfection operations, and subsequent sampling and analysis after each stage. The operation of block 1125 may continue until the processed wastewater meets the potable water standards and requirements, or until a time limit is reached. A time limit may be imposed for the event that the wastewater stream 131 is too slowly approaching the requirements and standards for potable water, in which case, the processed water may not be sent to the distribution and storage component 280. In block 1125, if the potable water standards and requirements are met, the now disinfected water is transferred, block 1130, to the water distribution and storage component 280. Operation 1100 then ends.

Figure 15:
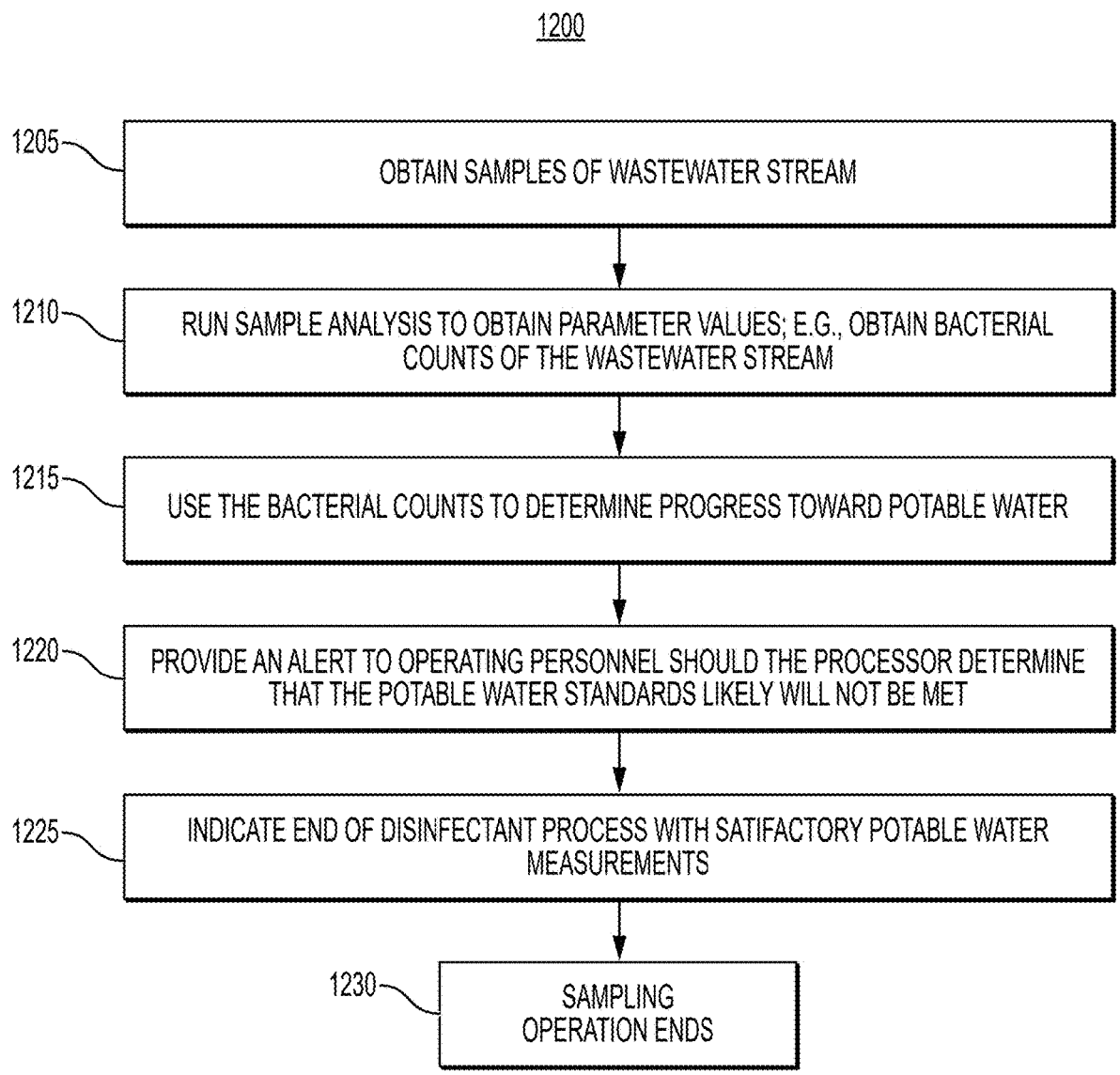

FIG. 15 is a flowchart illustrating wastewater stream sampling operation 1200. Such sampling may be implemented in part by the components of FIG. 12, in cooperation with processor 910 of FIG. 9 and the large language model (LLM) 850 of FIG. 8. In FIG. 15, operation 1200 begins in block 1205 when samples of the wastewater stream 131 are obtained and, in block 1210, when the samples are analyzed. For example, the recycling system 200 may be configured to automatically obtain bacterial counts of the wastewater stream 131 after each operation of FIG. 14. Moreover, the LLM 850 may use the bacterial counts to determine progress toward potable water using a process similar to that behind graph 810 of FIG. 8, and may provide an alert to operating personnel should the processor determine that the potable water standards likely will not be met. When the disinfection operations of FIG. 14 are complete, operation 1200 moves to block 1220 and ends.

FIG. 16 illustrates an example rotating machine configured with sensors to monitor and report machine operation. In FIG. 16, centrifugal pump 740 (see FIG. 7A) is instrumented with sensors 1304 that may, for example, measure vibration and temperature. Associated with the sensors 1304 is user interface 1310, which may be implemented as a tablet or portable computing device. The interface 1310 may include a processor, data collectors (e.g., software modules), a sensor-collector communications link, which may be wired or wireless, a display driver, and other modules and components that allow the data collectors to receive, store, analyze, and transmit sensor data (analyzed or raw) to a host platform. The data collectors may be implemented as components of a data collection system associated with the MPP wastewater recycling system 200. The interface 1310 may provide control functions to allow a user to control operations of the pump 740. The data collectors may receive sensor data continuously or periodically, depending on the sensor supply the data. Functions of the data collectors are described with respect to FIGS. 17A-17C.

An aspect of the MPP wastewater recycling system 200 of FIG. 3A is a data collection system that receives and processes inputs from sensors that monitor operation of the system 200. In an aspect, the data collection system may include a plurality of fixed and/or mobile data collectors that communicate with the sensors to receive monitored data and in turn, provide the received sensor data to one or more processors. In an example, some data collectors and sensors may be combined into one unit. In another example, some sensors and corresponding data collectors may be separate components. In yet another example, a single data collector may receive data inputs from multiple sensors. For example, a single pH data collector may receive pH data from multiple (or all) pH sensors in the system 200. In another example, individual data collectors operate together to determine sensors from which to process output data. In an aspect, only sensors that are associated with currently operating machinery (e.g., pumps) of the system 200 are used for data collection. In still another example, individual data collectors may be structured to receive data from a plurality of different sensor types. In one implementation, some or all data collectors communicate wirelessly with individual sensors. In another implementation, some data collectors communicate with individual sensors over wired networks. In an implementation, the data collectors pull data from the sensors. In another implementation, the sensors push data to the data collectors. The data collection system may include a machine learning component that receives output data from the sensors and learns received output data patterns indicative of a state of the MMP wastewater recycling system 200. In an example, the data collection system may alter operation of the sensors, or an aspect thereof, based on learned received output data patterns. In an example, the machine learning component is trained with a model that enables data pattern recognition. In an aspect, the machine learning component includes a deep learning module in which input data is fed to the circuit with no or minimal seeding and the machine learning component learns based on output feedback. The data collector may acquire various parameters to evaluate the state of the MPP wastewater recycling system 200, e.g., speed of operation, heat generation, vibration, and conformity with expected or desired water purity standards. The data collection system may employ a neural net under supervision by one or more "experts" to intelligently manage the data collectors.

FIG. 17A illustrates example information and control system 1404 that, among other functions, collects data from sensors in environment 1400, e.g., from sensors affiliated with one or more components 1402 of a MPP wastewater recycling system such as the wastewater recycling system 200 of FIG. 3A. The information and control system 1404 includes a group 1406 of sensors 1408, a network 1410, a (central) processor 1413, and a database or data store 1414. Each sensor 1408 may receive data from one or more components 1402 and may be coupled to other elements of the information and control system 1404. The components 1402 can be any form of machinery or component in the environment 1400. Examples of such components 1402 include pumps, separators, clarifiers, distilling units, filters, settling tanks, and similar machinery and components used in the MPP wastewater recycling system 200 of FIG. 3A. For example, the information and control system 1404 executes various data collection operations in the environment 1400. These operations may include analyzing sensor data, altering sampling frequency, and making recommendations for system operation based on received sensor data. For example, the information and control system 1404 may determine that sampling frequency from one or more sensors, or types of sensors, should be increased or may be decreased. In an aspect, such a selection operation may be based on receiving data indicative of environmental conditions near a specific component associated with a single or a series of received sensor data inputs, comparing the environmental conditions of the target with past environmental conditions near the specific component or another component similar to the specific component, and, based on the comparison, changing sensor inputs to be analyzed and a frequency of the sampling.

In FIG. 17A, processor 1413 may be a central computing platform that executes various programs such as the LLM 850 of FIG. 8, and other routines necessary for the safe and efficient operation of the wastewater recycling system 200 of FIG. 3A. As illustrated, processor 1413 may directly communicate with the sensors 1408. Processor 1413 similarly may directly communicate (bi-directionally) with actuators (not shown in FIG. 17A) affiliated with components of the wastewater recycling system such as actuators associated with operation of servo-motor controlled valves, pumps, such as pump 740 of FIG. 16, and other remotely-operable components. For example, the processor 1413 may signal a throttle valve to open to a 50% open value and may receive, in return, a signal from the valve that the valve is open to the desired 50% value. Accordingly, through this bidirectional control, as well as by receipt of sensor values, the processor 1413, executing the LLM 850 and other routines, may be used to implement fully automatic control or semi-automatic operational control of the wastewater recycling system 200.

FIG. 17B illustrates an alternate implementation of an information and control system. In FIG. 17B, information and control system 1404' includes processor platform 1412, which in turn includes central processor 1413, man-machine interface 1415, and (human) graphical user interface 1417. The central processor 1413 communicates with components 1402 through intermediary computing platforms, which may be small, local computing platforms (i.e., edge processors), purpose built/supplied either to communicate between the central processor 1413 and the components, or to perform specific information collection and distribution tasks, specific data analysis tasks, and specific component control tasks. As an example, a local processor unit 1440 may be in wireless communication with distribution components such as those shown in FIG. 7D, including valves 722 and 741, and pump 740, and the local processor unit 1440, which is similar to the computing device 1301 shown in FIG. 7D, may provide control signals (see, e.g., FIG. 8A) to operate the valves 722 and 741, and the pump 740, may receive feedback signals from the valves 722 and 741, and the pump 740, and additionally, may receive sensor outputs from sensors such as the sensors 1304 shown in FIG. 16. Furthermore, the local processor unit 1440 may execute software routines to analyze performance of its connected components based on the feedback signals and the sensor outputs.

Figure 17C:
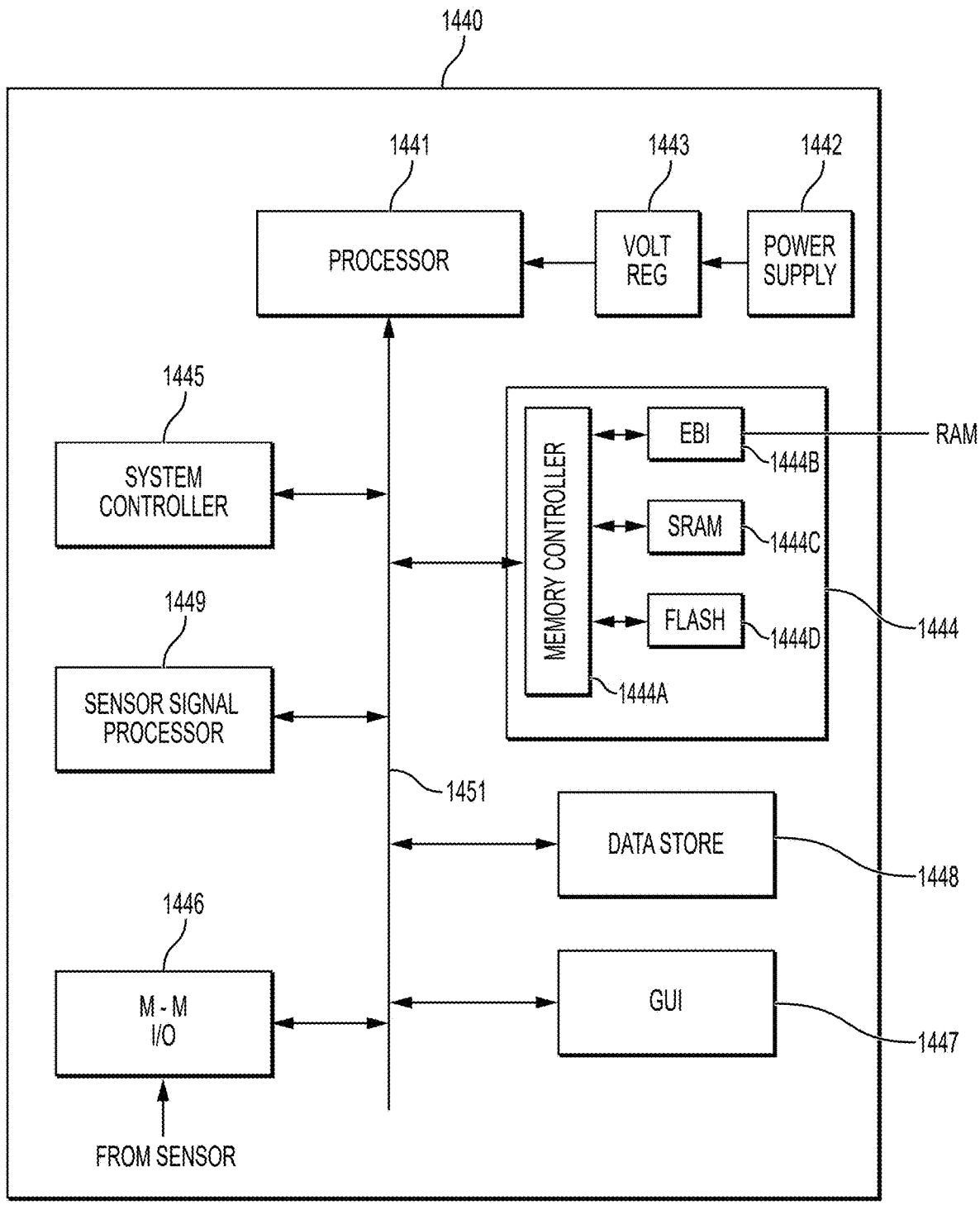

FIG. 17C illustrates an example local processor unit 1440 that may be implemented in the wastewater recycling system 200. In an aspect, the local processor unit 1440 may be purpose-built for a specific potable water production system, or purpose built for individual components of the potable water production system. Thus, while FIG. 17C illustrates an example local processor unit 1440, specific configurations of elements in a local processor unit 1440 may differ from those illustrated in FIG. 17C. One such possible difference is a specific component control program to be executed by a processor of the local processor unit 1440. As can be seen in FIG. 17C, local processor unit 1440 includes a processor 1441, a power supply 1442, voltage regulator 1443, memory 1444, system controller 1445, machine-machine interface 1446, human graphical user interface (GUI) 1447, data store 1448, which includes a non-transitory, computer-readable storage medium (see FIG. 17D), signal processor 1449, and signal and power bus 1451. The power supply 1442 may be a plug-in device and/or a wireless rechargeable battery or other suitable power supply. The voltage regulator 1443 conditions power to voltages suitable for components of the local processor unit 1440. Memory 1444 includes memory controller 1444A, and memory (storage) devices 1444B-1444C. The data store 1448 includes a data log 1448B for storing sensor data and other data related to operation of the wastewater recycling system 200, and storage medium 1448A includes programs and instructions for communicating with, operating, and controlling specific components of the wastewater recycling system 200, and programs for analyzing data received from the specific components. The storage medium 1448A also includes programs and instructions for communicating with the computing platform 1412 of FIG. 17B. The machine-machine interface 1446 enables communications with the computing platform 1412 and the specific components. The GUI 1447 enables man-machine communications, including visual, audio, and text-based information from the local processor unit 1440, and text and audio communication from the user.

Figure 17D:
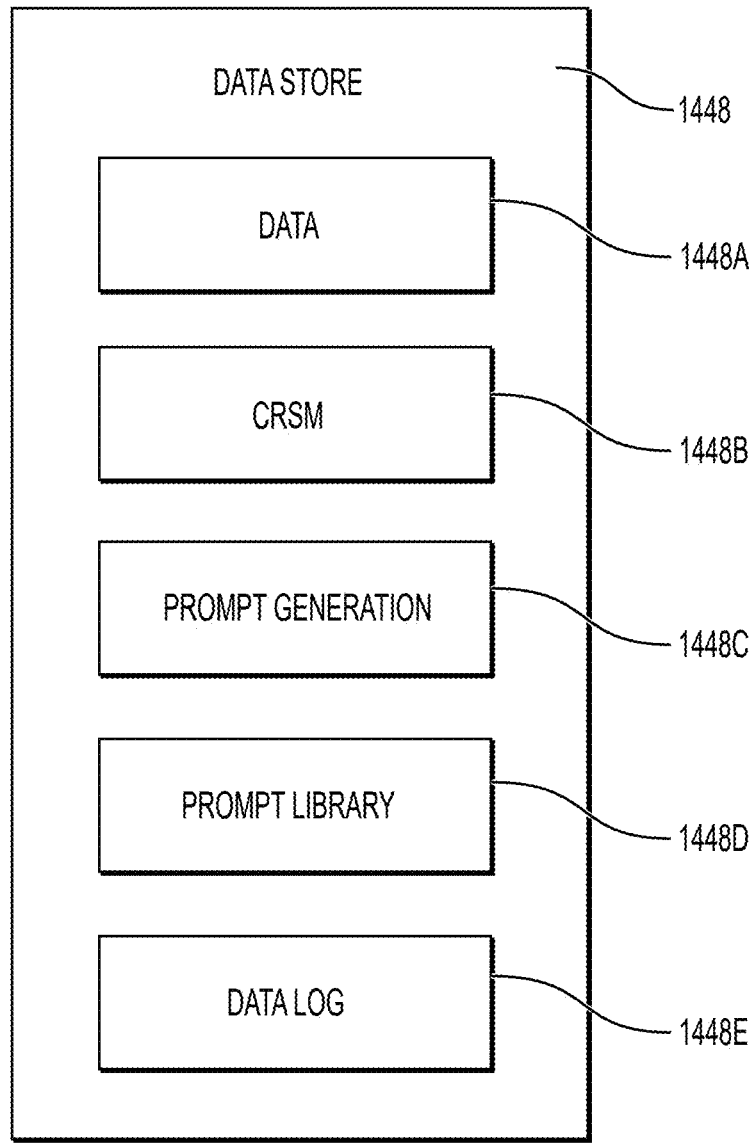
FIG. 17D illustrates an example data store supporting operation of a local processor unit.

FIG. 17D illustrates an example data store supporting operation of a local processor unit 1440. In FIG. 17D, data store 1448 includes database 1448A for storing data associated with a specific local processor unit as well as relevant data associated with the larger wastewater recycling system. The data store 1448 further includes a non-transitory, computer-readable storage medium 1448B, prompt generation program 1448C, prompt library 1448D, and data log 1448E. The storage medium 1448B includes a control program and a large language model that are executed by processor 1441 of FIG. 17C. The processor 1441 executes the control program to (1) automatically or semi-automatically control operation of an associated component or components of the wastewater recycling system 200, including controlling operations of sensors 201i, valves 202i, and components such as the ultraviolet disinfection components in FIGS. 4A and 4B; (2) generate, in cooperation with prompt generation program 1448C, prompts to present to a locally-established and maintained large language model (LLM) (i.e., an LLM stored in storage medium 1448B); (3) apply the prompt to the LLM; (4) receive a response to the prompt from the LLM; (5) validate the response in terms of its correct application to the system 200 component in issue (i.e., determine that the response does not violate any operational requirements, controls, or rules for operating the component in issue (e.g., UV-C components 400 of FIG. 4A), or that otherwise would pose a safety risk to the system 200 operators or a risk of damage to the components; (6) using the thus-validated response, formulating operating instructions in accordance with the control program to alter operation of the component in issue; (7) apply the operating instructions to the component in issue; and (8) log the prompt in the prompt and the response in the prompt library 1448D, and the validated response and the operating instructions in the data log, along with the state of the component in issue and associated sensor readings. Thus, in this aspect, the LLM is locally stored, controlled, and prompted, and corresponding instructions are locally generated and applied. However, a record of these data, events, and actions may be sent from the local control unit to a central processor platform and stored therein.

In an alternative aspect, generation of prompts and use of LLMs may occur at the central processor platform.

In one example, the signal processor 1449 may receive via machine-machine interface 1446, data from sensors such as the sensors 1408 shown in FIG. 17A, and may convert the received sensor data into a format that is compatible with processor 1441. A sensor 1408 may "sense" a condition of a monitored component 1402. For example, a sensor 1408 may sample parameter values for pressure (or differential pressure), current, rpm, or torque at a rotary component such as pump 740 of FIG. 16. The parameter values may be sensed continuously or periodically. The sensed parameters may be analog signals, such a rotation speed at x revolutions per minute. The signal processor 1449 may convert the sensed analog parameter value into a digital value. The signal processor then may provide the digital value, along with a digital time stamp and an identification (ID) of the sensor to the processor 1441. For continuous analog values, the signal processor 1449 may sample the continuous analog signal to produce discrete values that then are digitized. To reduce processing load on the processor 1441, the signal processor 1449 may quantize the discrete values.

Figure 18:
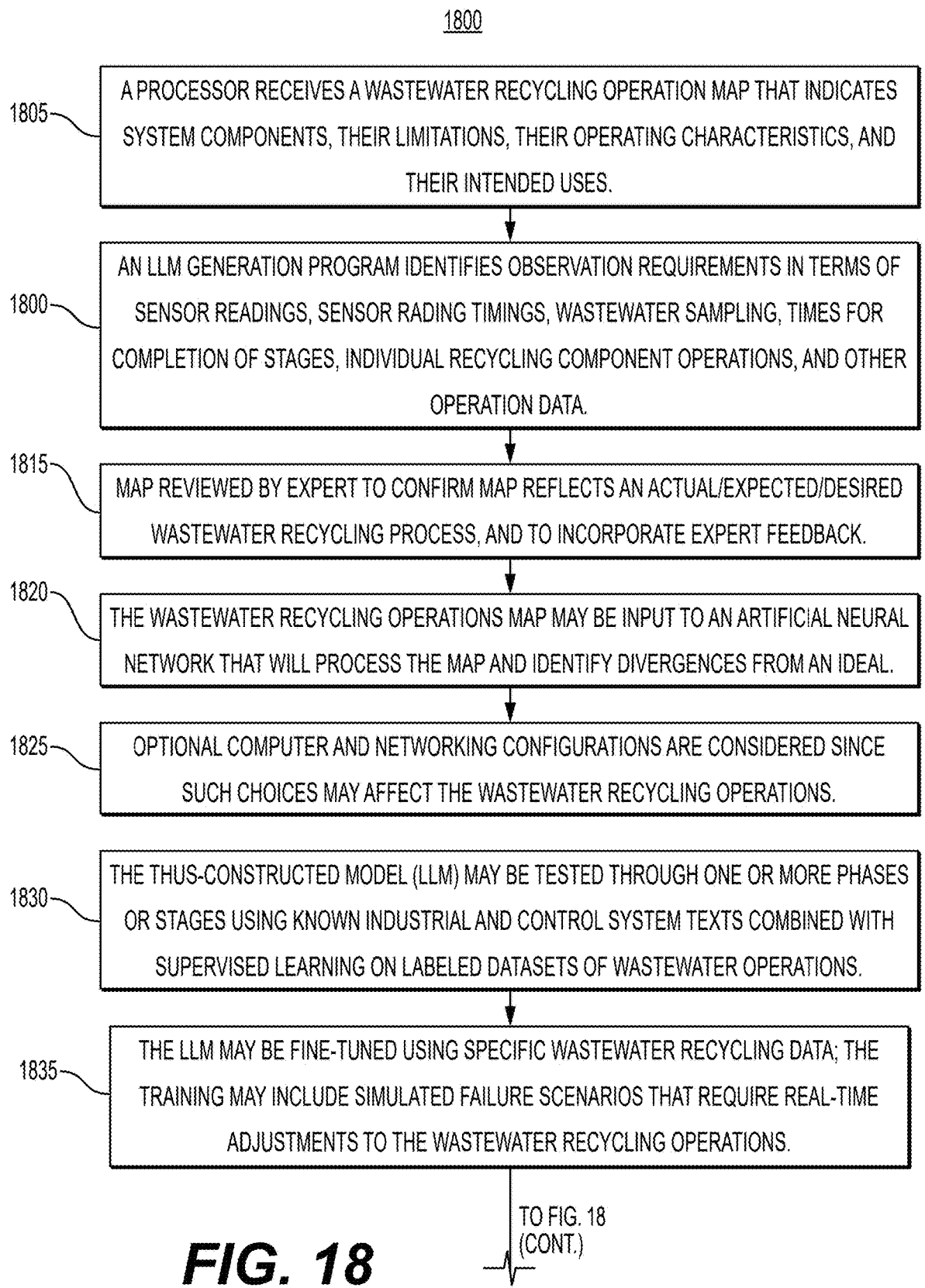
FIG. 18 illustrates features and operations for generating, training, and employing a large language model for controlling the herein disclosed wastewater recycling systems and their components.
Figure 18:
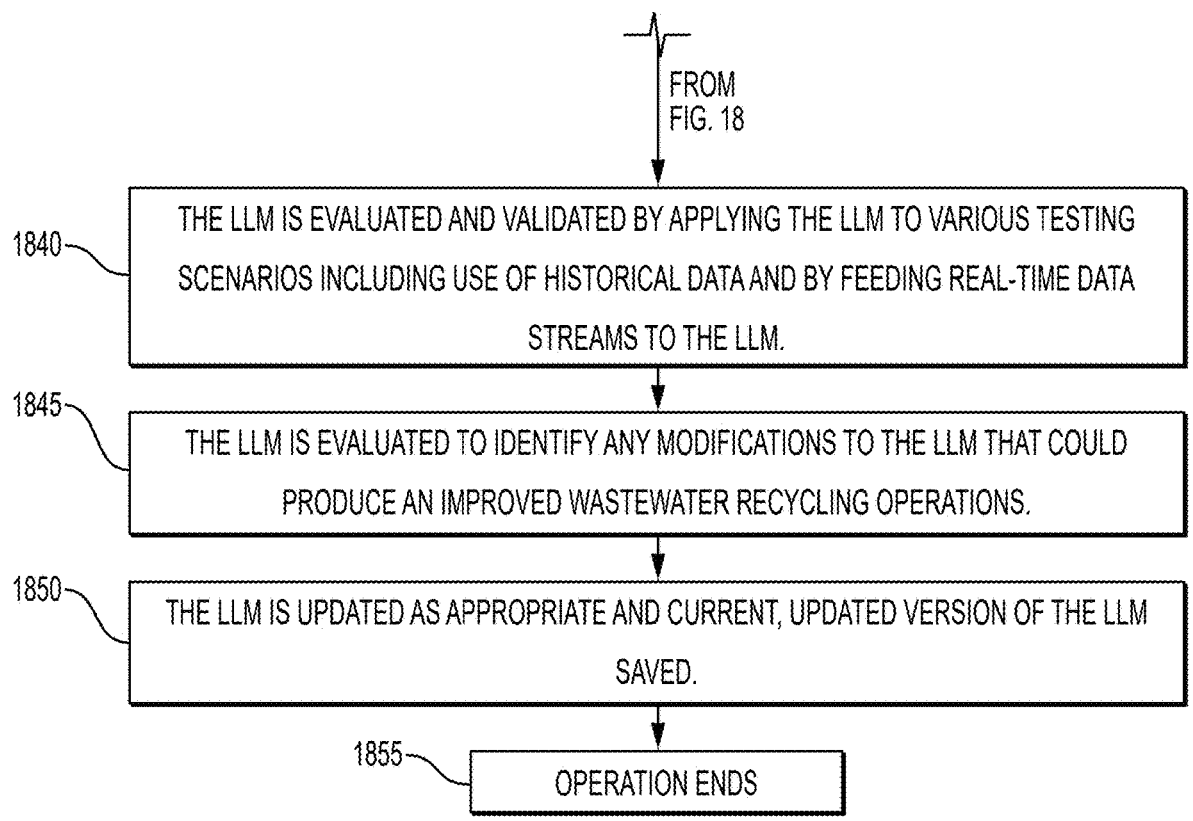

FIG. 18 is a flowchart illustrating an example process 1800 for generating a large language model that may be used as an element of a program for automatic or semi-automatic control of wastewater recycling using the systems and components disclosed herein. In block 1805, a processor receives an operation map of a wastewater recycling operation. The map indicates system components, their limitations, their operating characteristics, and their intended uses in the wastewater recycling process. The map further includes existing sensors, or in the absence of sensors, a need for additional sensors. The map identifies which recycling components are required, and which, if any recycling components are optional. In block 1810, and with reference to historical observations, if available, an LLM generation program identifies observation requirements in terms of sensor readings, sensor reading timings, wastewater sampling, times for completion of stages, individual recycling component operations, and other observation data. For example, the observation requirements/points include model inputs such as sensor data (flow rates, pH, turbidity, chemical concentrations, temperature, pressure, etc.); control signals for machinery (pumps, valves, filters, aeration components, chemical dosers); and historical data and expert knowledge. The observation requirements also indicate required model outputs such as control commands (pump speed, valve position, chemical dosing); real-time diagnostics and alerts; performance predictions and optimization/efficiency strategies. These expected observation points provide an initial metric by which to judge the effectiveness and efficiency of the wastewater recycling operations. These expected observation points also provide data as to required operation of recycling components at each stage of the wastewater recycling operation. In optional block 1815, the completed map may be reviewed by an expert to confirm the map reflects an actual/expected/desired wastewater recycling process, and to incorporate expert feedback. Alternately, or in addition to optional block 1815, in block 1820 the operation map (i.e., a model of the wastewater recycling operation) may be input to an artificial neural network that will process the map and identify divergences from an ideal map considering the information identified in blocks 1805 and 1810. In block 1825, optional computer and networking options are considered since such choices may affect the wastewater recycling operations. These options include selecting available hardware and networking infrastructures, and is not adequate for the intended wastewater recycling operations identifying additional hardware or substitute hardware devices and networks. For example, the wastewater recycling operation may be optimized by using edge computing devices (e.g., the local processor units 1440 of FIG. 17B) for real-time data processing as close to the components as possible. Furthermore, sensors and actuators (see, e.g., FIG. 13) may be directly connected to these local processor units 1440 in a manner similar the illustrated networking of FIGS. 17B and 17C. However, aa large capacity processor/server may be used to train and retrain the LLM. Furthermore, the networks of FIGS. 17B and 17C may be established in a manner that provides a reliable IoT (Internet of Things) network with data redundancy. In block 1830, the thus-constructed model (LLM) may be tested through one or more phases or stages. For example, the LLM may be trained on known industrial and control system texts to develop domain awareness but using supervised learning on labeled datasets of wastewater operations. Next, in block 1835, the LLM may be fine-tuned using specific wastewater recycling data. Furthermore, the training may include simulated failure scenarios that require real-time adjustments to the wastewater recycling operation. In block 1840, the LLM is evaluated and validated by applying the LLM to various testing scenarios including use of historical data and by feeding real-time data streams to the LLM. The testing validates the accuracy of control actions, system response to critical situations, and comparison to rule-based control. In block 1845, the LLM may be evaluated to identify any modifications to the LLM that could produce an improved wastewater recycling operation. In block 1850, the LLM is updated as appropriate and a current, updated version of the LLM is saved. Process 1800 then ends, block 1855.

The preceding disclosure refers to flowcharts and accompanying descriptions to illustrate the system, component, and device examples represented in the Figures. The disclosed devices, components, and systems contemplate using or implementing any suitable technique for performing the steps illustrated. Thus, the flowcharts of FIGS. 14, 15 and 18 are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A system for processing wastewater streams to produce potable water, comprising:
    a first component configured for removal of suspended solids from a wastewater stream, the first component comprising:
        one or more first sensors and a first water flow control mechanism,
        a coagulation component comprising a coagulant addition mechanism operated under control of a processor, the coagulation component configured to produce coagulated solids from suspended solids in the wastewater stream, and
        a filtration component configured to receive the wastewater stream from the coagulation component and to remove coagulated solids via a multi-layer, multimedia filter comprising at least a gravel layer, a sand layer, and a coal layer;
    a second component comprises a disinfection component configured to receive effluent wastewater from the first component, and further configured to disinfect the effluent wastewater, the disinfection component comprising one or more second sensors and a second water flow control mechanism;
    a third component comprising a potable water storage and distribution component configured to receive disinfected water from the second component, and further configured to store and distribute the disinfected water as potable water and to maintain a required water quality for the stored potable water, the potable water storage and distribution component comprising one or more third sensors and a third water flow control mechanism; and
    a processing system comprising a computing device network and a plurality of purpose built and programmed local processor units, wherein each of the first component, the second component, and the third component is in signal communication with one or more local processor units dedicated to that component, wherein each local processor unit comprises a non-transitory computer-readable storage medium having encoded thereon, a trained, large language model (LLM) and a control program, wherein each local processor unit executes the control program to query the LLM, and wherein each local processor unit executes the LLM by applying a query to the LLM and receiving in return a suggestion, generated by the LLM, as to a provision of control signals to the first component, the second component, and the third component.

2. The system of claim 1 for processing wastewater streams, wherein the disinfection component comprises one or more of a reverse osmosis component a UV-C vessel, an ozone nanobubble component, and an electrochemical disinfection component.

3. The system of claim 1 for processing wastewater streams, wherein the disinfection component comprises two parallel UV-C vessels and a feedback loop for real-time microbial count sampling.

4. The system of claim 1 further comprising:
    an LLM-based control system comprising a non-transitory computer-readable medium encoded with instructions executable by one or more processors to:
        receive sensor data from the coagulation component, the filtration component, the disinfection component, and the water storage component;
        execute the LLM to analyze the sensor data; and
        generate control signals to operate valves, pumps, and treatment units based on outputs of the LLM.

5. The system of claim 4 for processing wastewater streams, wherein one or more processors generate queries for submission to the LLM, the queries configured to constrain operation of the LLM to produce suggested responses for controlling operations of the first, second, and third components.

6. The system of claim 5 for processing wastewater streams, wherein a first local processing unit is installed at the coagulation component, a second local processor unit is installed at the filtration component, a third local processor unit is installed at a disinfection component, and a fourth local processor unit is installed at the potable water storage and distribution component.

7. The system of claim 6 for processing wastewater streams, wherein each local processor unit comprises a sensor signal processor configured to convert received sensor signals to values and formats compatible with a processor of the local processor unit.

8. The system of claim 7 for processing wastewater streams, wherein the sensor signals are analog signals and the sensor signal processor converts the analog signals to digital signals.

9. The system of claim 4 for processing wastewater streams, wherein the one or more processors are instantiated at a central processor station.

10. The system of claim 1 for processing wastewater streams from meat and poultry processing plants.

11. A method of producing potable water from an industrial wastewater stream, comprising:
   receiving the wastewater stream at a coagulation stage and introducing a coagulant and a flocculant to form flocculations;
   filtering coagulated and flocculated wastewater at a filtering stage comprising a multi-media filter comprising gravel, sand, and coal;
   disinfecting filtered water at a disinfection stage using at least one of ultraviolet light, reverse osmosis, electrochemical oxidation, and ozone nanobubble generation;
   storing disinfected water at a storage stage in a distribution tank configured to maintain potable water quality; and
   at a distributed computing network, comprising a plurality of edge processors, one or more edge processors instantiated at each stage, each edge processor at each stage configured to execute machine instructions specific to its associated stage, the method further comprising one or more edge processors:
      monitoring wastewater characteristics using sensors located at each stage, and
      executing a trained large language model (LLM) to:
         receive sensor data;
         determine needed adjustments to operating parameters; and
         provide suggested control equipment setting changes for one or more stages.

12. The method of producing potable water of claim 11, further comprising at the distributed computing network:
   receiving sensed data from the sensors;
   based on the received sensed data, generating a query for application to the LLM, the query directing the LLM to generate the suggested control equipment changes for the one or more stages;
   validating the suggested control equipment changes for the one or more stages; and
   applying validated control equipment changes to components of the one or more stages.

13. The method of producing potable water of claim 12, wherein the query limits a range or control equipment changes to be generated by the LLM.

14. The method of producing potable water of claim 13, wherein each edge processor executes machine instructions to:
   receive the sensed data;
   convert the sensed data into parameter values and formats compatible with sensor data analysis; and
   analyze converted sensed data to determine a need to query the LLM.

\* \* \* \* \*